(12) United States Patent
Fujii et al.

(10) Patent No.: US 6,972,883 B2
(45) Date of Patent: Dec. 6, 2005

(54) VIBRATION MIRROR, OPTICAL SCANNING DEVICE, AND IMAGE FORMING USING THE SAME, METHOD FOR MAKING THE SAME, AND METHOD FOR SCANNING IMAGE

(75) Inventors: Mitsumi Fujii, Iwate-ken (JP); Yukito Satoh, Miyagi-ken (JP); Tomohiro Nakajima, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 93 days.

(21) Appl. No.: 10/367,706

(22) Filed: Feb. 19, 2003

(65) Prior Publication Data

US 2003/0227538 A1     Dec. 11, 2003

(30) Foreign Application Priority Data

Feb. 15, 2002  (JP) ............................. 2002-039279
Mar. 4, 2002   (JP) ............................. 2002-057428
Apr. 26, 2002  (JP) ............................. 2002-125750

(51) Int. Cl.⁷ ............................................. G02B 26/08
(52) U.S. Cl. .................... 359/224; 359/198; 359/199; 347/259; 347/260
(58) Field of Search ................ 359/198–200, 359/223, 224, 290–292, 298; 310/309

(56) References Cited

U.S. PATENT DOCUMENTS

| | | | |
|---|---|---|---|
| 4,317,611 A * | 3/1982 | Petersen ..................... 359/214 |
| 5,304,357 A | 4/1994 | Sato et al. |
| 5,629,790 A * | 5/1997 | Neukermans et al. ........ 359/198 |
| 5,763,775 A | 6/1998 | Sato et al. |
| 5,793,073 A | 8/1998 | Kaminishi et al. |
| 5,852,239 A | 12/1998 | Sato et al. |
| 5,983,700 A | 11/1999 | Yamaguchi et al. |
| 6,118,166 A | 9/2000 | Shoji et al. |
| 6,203,673 B1 | 3/2001 | Shoji et al. |
| 6,331,052 B1 | 12/2001 | Murai et al. |
| 6,352,333 B1 | 3/2002 | Matsumoto et al. |
| 6,509,995 B1 | 1/2003 | Suzuki et al. |

FOREIGN PATENT DOCUMENTS

| | | |
|---|---|---|
| JP | 7-92409 | 4/1995 |
| JP | 2924200 | 5/1999 |
| JP | 3011144 | 12/1999 |
| JP | 2001-513223 | 8/2001 |

* cited by examiner

*Primary Examiner*—James Phan
(74) *Attorney, Agent, or Firm*—Oblon, Spivak, McClelland, Maier & Neustadt, P.C.

(57) ABSTRACT

A vibration mirror is reciprocatively vibrated by an electrostatic force to reflect an incident light beam. The vibration mirror comprises a reflection means for reflecting the incident light beam; a reflection means holding substrate for holding the reflection means; a torsional rotation shaft comprising rod members rotatably supporting two ends of the reflection means holding substrate; movable electrodes formed on side faces of the reflection means holding substrate supported; a first substrate for supporting the reflection means supporting substrate via the torsional rotation shaft; first fixed electrodes formed on the first substrate so as to face the movable electrodes; a first electrically insulating and separating means formed on the first substrate to electrically insulate and separate the movable electrodes from the first fixed electrodes; and a second substrate overlaid on the first substrate with an insulating layer therebetween so as to be electrically insulated from and overlapped to adhere onto the first substrate.

15 Claims, 39 Drawing Sheets

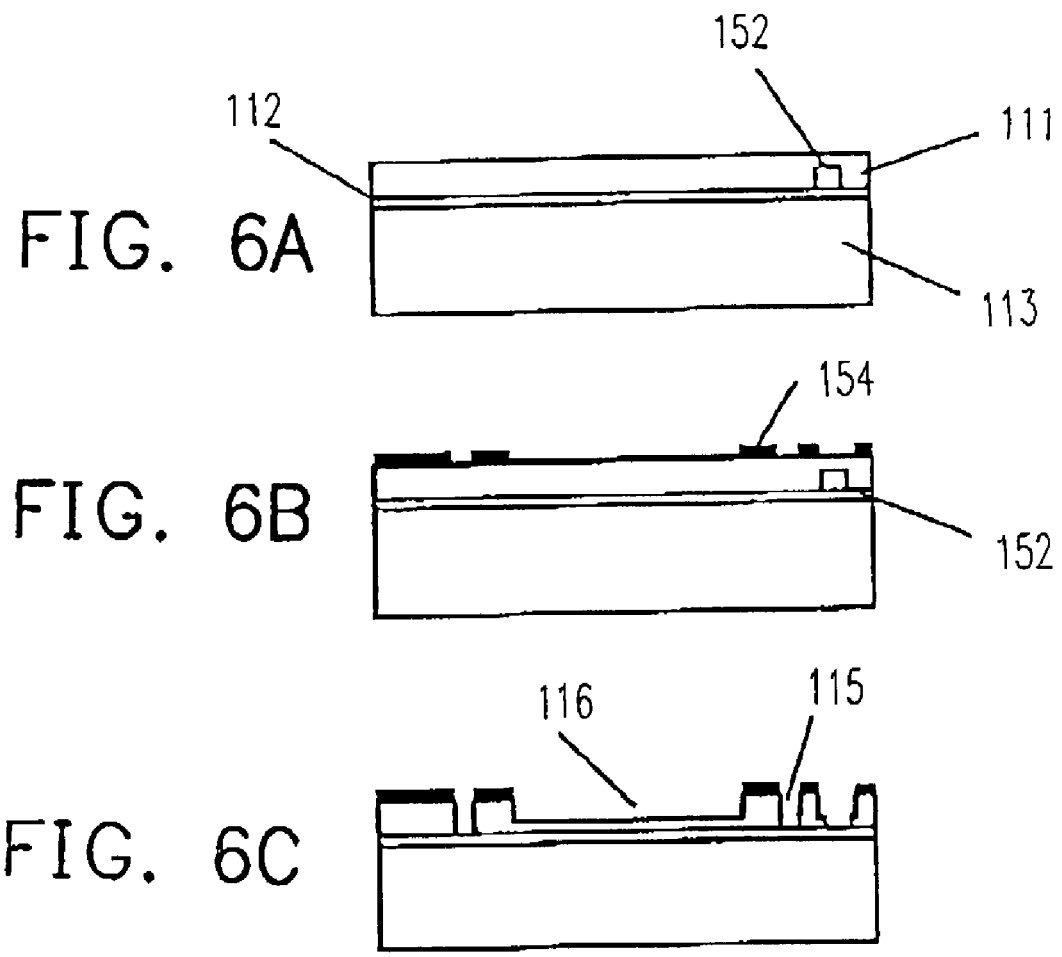

US 6,972,883 B2

VIBRATION MIRROR, OPTICAL SCANNING DEVICE, AND IMAGE FORMING USING THE SAME, METHOD FOR MAKING THE SAME, AND METHOD FOR SCANNING IMAGE

CROSS-REFERENCE TO RELATED APPLICATION

This application claims the priority benefit of Japanese applications, under serial nos. 2002-039279, filed on Feb. 15, 2002; 2002-125750, filed on Apr. 26, 2002; 2002-057428, filed on Mar. 4, 2002.

BACKGROUND OF THE INVENTION

1. Field of the Invention

This invention relates in general to an optical scanning device, a scanning control device for controlling the optical device, a program used by a computer for executing a scanning control, a positioning mechanism for positing the optical scanning device within an image forming device, an optical scanning unit with a plurality of optical scanning devices, and an image forming device or a read device using the optical scanning device. In particular, the invention relates to a vibration mirror used for the optical scanning device and a method for making the vibration mirror.

2. Description of the Related Art

In a conventional optical scanning device, a mirror substrate, which is formed by a thin film that is supported by two rods, is reciprocatively vibrated using the two rods as a torsional rotation axis by an electrostatic attraction between electrodes disposed at a location opposite to the mirror substrate.

In comparison with a conventional optical scanning device with rotation of polygon mirrors using motors, the described optical scanning device, which is formed with a so-called micro-machining technology, can be wholly constructed by a simple semiconductor process, and therefore, the optical scanning device can be easily made very small, the manufacturing cost can be reduced, and an uneven accuracy due to plural faces with a single reverse inclined surface does not exists. Furthermore, an effect capable of corresponding to a high speed for the reciprocation scanning can be expected. Therefore, a device, in which an image device where an optical writing is performed by a electro-photographic process to form an image, or a reading device where an optical scanning is performed to read an image is installed, is proposed and disclosed.

As the torsional vibration type optical scanning device with an electrostatic driving ability, several disclosures are known. For example, in Japanese Patent No. 2924200, the rod is made into a S shape and its rigidity is thus reduced, so that a small driving force and a large vibrational angle are obtained. Also, in the Japanese Laid Open Application No. 7-92409, the thickness of the rod is thinner than a frame substrate. In Japanese Patent No. 3011144, fixed electrodes are arranged at a location not overlapped with the vibrational direction of the mirrors.

Through etching an SOI substrate by dry etching is a widely known method to form a fundamental shape of the vibration mirror that is made by the micro-machining technology, for example, a disclosure taught by Japanese Patent Publication 2001-513223. In this method, an etching mask is formed on a first silicon substrate of the SOI substrate, and then a through etching process for the first silicon substrate is performed to shape the movable mirrors and the torsion rods. Afterwards, a region of a second substrate including the through region is removed by etching, or a region comprising the through region of the second substrate is removed by etching to form the etching mask on the first substrate of the SOI substrate, so that the first substrate is through etched to form the shapes of the movable mirrors and the torsion rods. The dry etching for the first silicon substrate usually uses high density plasma etching with an etching gas of $SF_6$. At this time, an oxide film with a large etching ration to silicon is widely used, and a portion of the oxide film mask formed with a uniform thickness is removed by etching to form a through region. In this method, a fundamental shape can be formed by bringing out the movable mirror as the reflection means holding means and the rod profile as the torsional rotation shaft by penetrating the substrate. However, the thickness of the movable mirror made by the above manner is entirely uniform, and if the thickness of the first silicon substrate of the SOI substrate is directly used as the thickness of the movable mirror, the momentum of inertia of the movable mirror is large and the vibration angle is large, so that a large driving torque is required.

FIG. 54 is a vertical cross-sectional front view showing a conventional vibration mirror 900 and FIG. 55 is a perspective view. The vibration mirror 900 comprises a substrate 905, movable electrodes 904 disposed at the substrate 905, fixed electrodes 906 disposed opposite to the movable electrodes 904. A rotation axis composed of two rods 903a, 903b that are used to support a mirror substrate 902 having a mirror 901 thereon is formed in the substrate 905. Using the rotation axis 903 composed of the two rods 903a, 903b, and the mirror substrate 902 is reciprocatively vibrated by the electrostatic attraction between the movable electrodes 904 and the fixed electrodes 906. In this way, the mirror 901 rotates to change the reflection direction of an incident light to perform the optical scanning.

The magnitude of a vibration angle θ of the mirror substrate 902 is tiny only under the action of the electrostatic driving torque ($T_1$) as shown in FIG. 56. The mirror substrate 902 is driven by a driving pulse that is equivalent to a mechanical resonant frequency of movable parts, i.e., a vibration state. The vibration angle θ of the mirror substrate 902 with the mirror 901 under the resonant state is expressed as θ=(Tq/I)·K, wherein Tq is an electrostatic torque acted onto the mirror substrate 902 with the mirror 901, I is an inertial moment of the mirror substrate 902 with the mirror 901, and K is a constant determined by the rotation axis 903 composed of the two rods 903a, 903b.

Namely, it is a method that when the vibration angle θ of the mirror 901 on the mirror substrate 902 gets large, the electrostatic torque Tq gets large but the inertial moment I gets small. In particular, when vibration mirror is used in an optical writing device such as a laser printer using a elec-trophotographic process, it is require to have a mirror on a mirror substrate, wherein the mirror has a reflection plane defined by a beam shape formed on a photosensitive surface. When the mirror face gets large, the mirror substrate also becomes large so that the inertial moment of the mirror cannot be small.

In addition, the resonant frequency $f_0$ and the inertial moment I of the mirror substrate 902 has a relationship of $f_0 \propto I^{-1/2}$. The resonant frequency $f_0$ will deviate due to processing errors of such as the thickness of the mirror substrate, the profile dimension, etc. As described, if the scanning frequency shifts away from the resonant frequency, the vibration angle of performing the optical scanning becomes small. For obtaining a desired vibration angle, the only way is to increase the driving voltage and enlarge the electrostatic torque Tq, so that there are limitations. As a result, in the optical scanning device, the scanning frequency is set according to each resonant frequency.

Accordingly, an error of about several percentages (%) with respect to the design standard occurs, and the main scanning times per unit time, i.e., the scanning frequency is different for each case. As the scanning frequency is different, the size of the formed image in the secondary scanning direction is different. For example, if the resonant frequency is faster than the design standard, the size of the image in the secondary scanning direction becomes small because the pixel pitch in the secondary scanning direction becomes short. If the error is 1%, the size in the sub-scanning direction is shifted by one pixel as being scanned one hundred times in the main scanning direction. In particular, for an image forming device to form one image by overlapping images that are recorded by plural optical scanning devices, image degradation is a severe problem.

SUMMARY OF THE INVENTION

According to the foregoing description, an object of this invention is to provide a vibration mirror and a method for making the same. The vibration mirror has a structure capable of simplifying a process to form a recess part for reducing weight of the vibration mirror and also for reducing a processing time.

It is another object of this invention to provide an optical scanning device with a simple structure, a large vibration angle for performing a scanning process, a low driving voltage, a highly improved reliability, a strong strength, a high yield rate and a low cost, and a method for making the optical scanning device.

It is another object of this invention to provide an image forming device with the aforementioned optical scanning device, capable of performing an optical writing in an electrophotographic process with a high accuracy and a high speed. The image forming device can reduce an amount of parts used and its manufacturing cost It is still another object of this invention to provide an reading device with the aforementioned optical scanning device with a high accuracy and a high speed. The image forming device can reduce an amount of parts used and its manufacturing cost It is still another object of this invention to provide a scanning control device or method capable of reducing image degradation due to a driving error of a deflection means (a vibration mirror). In addition, a program, a positioning mechanism, an optical scanning unit and an image forming device using the same capable of reducing image degradation are provided.

In order to achieve the objects mentioned above, the present invention provides a vibration mirror. The vibration mirror is reciprocatively vibrated by an electrostatic force to reflect an incident light beam such that a reflection direction of the reflected light beam is different from an incident direction of the incident light beam. The vibration mirror comprising a reflection means for reflecting the incident light beam; a reflection means holding substrate for holding the reflection means; a torsional rotation shaft comprising rod members rotatably supporting two ends of the reflection means holding substrate; movable electrodes formed on side faces of the reflection means holding substrate supported; a first substrate for supporting the reflection means supporting substrate via the torsional rotation shaft; first fixed electrodes formed on the first substrate so as to face the movable electrodes; a first electrically insulating and separating means formed on the first substrate to electrically insulate and separate the movable electrodes from the first fixed electrodes; and a second substrate overlaid on the first substrate with an insulating layer therebetween so as to be electrically insulated from and overlapped to adhere onto the first substrate. Furthermore, the second substrate further comprises second fixed electrodes, which face the movable electrodes.

According to an aspect of the present invention, in the above vibration mirror, the first electrically insulating means comprises separation slits to separate and electrically insulate the movable electrodes from the first fixed electrodes.

According to an aspect of the present invention, the above vibration mirror further comprises a second electrically insulating and separating means, wherein the second fixed electrodes formed on the second substrate comprises a plurality of regions that are electrically insulated and separated by the second electrically insulating and separating means. In addition, the second electrically insulating and separating means comprises separation slits to insulate electrically the plurality of regions of the second fixed electrodes from each other.

According to an aspect of the present invention, both the movable electrodes and at least one of the first and the second fixed electrodes have a comb shape, and arranged such that convex portions of the movable electrodes face concave portions of the at least one of the first and the second fixed electrodes; and concave portions of the movable electrodes faces convex portions of the at least one of the first and the second fixed electrodes.

According to an aspect of the present invention, each of the first and the second substrates is a silicon substrate. In addition, the silicon substrate is a silicon on insulator (SOI) substrate.

According to an aspect of the present invention, in the above vibration mirror a formation of the reflection means holding substrate and the separation slits that separate the movable electrodes from the first fixed electrodes are simultaneously performed by etching. In addition, the reflection means holding substrate further comprises at least one resonant frequency adjustment plate for adjusting a resonant frequency of the vibration mirror, and wherein the resonant frequency is adjusted by cutting the at least one resonant frequency adjustment plate.

The present invention further provides a vibration mirror, which is reciprocatively vibrated by an electrostatic force to reflect an incident light beam such that a reflection direction of the reflected light beam is different from an incident direction of the incident light beam. The vibration mirror comprises a reflection means for reflecting the incident light beam; a reflection means holding substrate for holding the reflection means; a first substrate comprising a torsional rotation shaft comprising rod members rotatably supporting two ends of the reflection means holding substrate; and a second substrate overlaid on the first substrate with an insulating layer therebetween so as to be electrically insulated from the first substrate, wherein the reflection means is formed on any one of surfaces of the first substrate and the insulating layer.

According to an aspect of the present invention, the reflection means holding substrate comprises a thin portion thinner than a thickness of the first substrate on a surface thereof opposite to that bearing the reflection means. Furthermore, a formation of the reflection means holding substrate and thin portion of the reflection means holding substrate are simultaneously performed by etching. When the etching is performed, an etching mask with a step is used, and wherein a thickness of the etching mask corresponding to the thin portion of the reflection means holding substrate is thinner than a thickness of other portions of the etching make.

In the above vibration mirror, the etching mask comprises two layers with different materials. When the etching is performed, an etching mask is used, and in which a high concentration impurity is doped is used for the thin portion of the reflection means holding substrate. Alternatively, a recess part can be formed on a surface of the first substrate that contacts the insulating layer to monitor an etching stop. Moreover, the insulating layer remains even after etching the first substrate.

In the aforementioned vibration mirror, the reflection means holding substrate further comprises at least one resonant frequency adjustment plate for adjusting a resonant frequency of the vibration mirror, and wherein the resonant frequency is adjusted by cutting the at least one resonant frequency adjustment plate.

In addition, the present invention further provides an optical scanning device, comprising at least one vibration mirror; and a means for irradiating the at least one vibration mirror with a light beam that is modulated by image information according to a vibration amplitude of the vibration mirror; and a means for focusing the light beam reflected by the reflection means on a surface to be scanned. The at least one vibration mirror is reciprocatively vibrated by an electrostatic force to reflect an incident light beam such that a reflection direction of the reflected light beam is different from an incident direction of the incident light beam. The at least one vibration mirror comprises a reflection means for reflecting the incident light beam; a reflection means holding substrate for holding the reflection means; a first substrate comprising a torsional rotation shaft comprising rod members rotatably supporting two ends of the reflection means holding substrate; and a second substrate overlaid on the first substrate with an insulating layer therebetween so as to be electrically insulated from the first substrate, wherein the reflection means is formed on any one of surfaces of the first substrate and the insulating layer.

In addition, the present invention further provides an optical scanning device, comprising at least one vibration mirror; a means for irradiating the at least one vibration mirror with a light beam that is modulated by image information according to a vibration amplitude of the vibration mirror; and a means for focusing the light beam reflected by the reflection means on a surface to be scanned. The at least one vibration mirror is reciprocatively vibrated by an electrostatic force to reflect an incident light beam such that a reflection direction of the reflected light beam is different from an incident direction of the incident light beam. The at least one vibration mirror comprises a reflection means for reflecting the incident light beam; a reflection means holding substrate for holding the reflection means; a torsional rotation shaft comprising rod members rotatably supporting two ends of the reflection means holding substrate; movable electrodes formed on side faces of the reflection means holding substrate supported; a first substrate for supporting the reflection means supporting substrate via the torsional rotation shaft; first fixed electrodes formed on the first substrate so as to face the movable electrodes; a first electrically insulating and separating means formed on the first substrate to electrically insulate and separate the movable electrodes from the first fixed electrodes; and a second substrate overlaid on the first substrate with an insulating layer therebetween so as to be electrically insulated from and overlapped to adhere onto the first substrate.

In addition, the present invention further provides an image forming device, comprising an optical scanning device comprising at least one vibration mirror, a means for irradiating the at least one vibration mirror with a light beam that is modulated by image information according to a vibration amplitude of the vibration mirror; a means for focusing the light beam reflected by the reflection means on to a scan face; and an image supporter moving in a sub-scanning direction and which an electrostatic latent image is formed by scanning the focused light beam in a main scanning direction; and a developing means for developing the electrostatic latent image. The at least one vibration mirror is reciprocatively vibrated by an electrostatic force to reflect an incident light beam such that a reflection direction of the reflected light beam is different from an incident direction of the incident light beam. The at least one vibration mirror comprises a reflection means for reflecting the incident light beam; a reflection means holding substrate for holding the reflection means; a first substrate comprising a torsional rotation shaft comprising rod members rotatably supporting two ends of the reflection means holding substrate; and a second substrate overlaid on the first substrate with an insulating layer therebetween so as to be electrically insulated from the first substrate, wherein the reflection means is formed on any one of surfaces of the first substrate and the insulating layer. Alternatively, the at least one vibration mirror can comprises a reflection means for reflecting the incident light beam; a reflection means holding substrate for holding the reflection means; a torsional rotation shaft comprising rod members rotatably supporting two ends of the reflection means holding substrate; movable electrodes formed on side faces of the reflection means holding substrate supported; a first substrate for supporting the reflection means supporting substrate via the torsional rotation shaft; first fixed electrodes formed on the first substrate so as to face the movable electrodes; a first electrically insulating and separating means formed on the first substrate to electrically insulate and separate the movable electrodes from the first fixed electrodes; and a second substrate overlaid on the first substrate with an insulating layer therebetween so as to be electrically insulated from and overlapped to adhere onto the first substrate.

In the aforementioned image forming device, the image forming device further comprises a plurality of optical scanning devices, wherein the image information is divided into a plurality of divided regions in the main scanning direction, and the electrostatic latent image is recorded by the plurality of optical scanning devices, wherein a number of the plurality of optical scanning devices is the same as that of the divided regions. In addition, the image information comprises pixels whose position are respectively represented by coordinates of a matrix, and the electrostatic latent image is recorded after coordinate of each of the pixels is transformed into a coordinate of a tilt matrix that is tilted by a prescribed angle from the matrix. Furthermore, the scanning direction of the light beam on the vibration mirror is tilted from a direction perpendicular to the sub-scanning direction.

The present invention further provides a reading device, comprising at least one vibration mirror; and an optical receiving means for receiving a reflection light that the vibration mirror optically scans a read face. The at least one vibration mirror is reciprocatively vibrated by an electrostatic force to reflect an incident light beam such that a reflection direction of the reflected light beam is different from an incident direction of the incident light beam. The at least one vibration mirror can comprise a reflection means for reflecting the incident light beam; a reflection means holding substrate for holding the reflection means; a first substrate comprising a torsional rotation shaft comprising rod members rotatably supporting two ends of the reflection means holding substrate, and a second substrate overlaid on the first substrate with an insulating layer therebetween so as to be electrically insulated from the first substrate, wherein the reflection means is formed on any one of surfaces of the first substrate and the insulating layer. Alternatively, the at least one vibration mirror can comprise a reflection means for reflecting the incident light beam; a reflection means holding substrate for holding the reflection means; a torsional rotation shaft comprising rod members rotatably supporting two ends of the reflection means holding substrate; movable electrodes formed on side faces of the reflection means holding substrate supported; a first substrate for supporting the reflection means supporting substrate via the torsional rotation shaft; first fixed electrodes formed on the first substrate so as to face the movable electrodes; a first electrically insulating and separating means formed on the first substrate to electrically insulate and separate the movable electrodes from the first fixed electrodes, and a second substrate overlaid on the first substrate with an insulating layer therebetween so as to be electrically insulated from and overlapped to adhere onto the first substrate The present invention further provides a method for manufacturing a vibrator comprising a torsional rotation shaft and a reflection means holding substrate having a reflection means, comprising: forming a complex substrate comprising a first substrate, an insulating layer and a second substrate, wherein the insulating layer is sandwiched by the first and second substrates; forming a patterned photoresist on the first substrate; and etching the first substrate to form the reflection means holding substrate, the torsional rotation shaft, and separation slits which separate the reflection means holding substrate and torsional rotation shaft from the first substrate.

In the above method, the etching comprises etching the first substrate to form the reflection means holding substrate, the torsional rotation shaft, and separation slits which separate the reflection means holding substrate and torsional rotation shaft from the first substrate, wherein the reflection means holding substrate has a thinner portion on a surface thereof.

In the above method, the etching comprises etching the first substrate to form the reflection means holding substrate, the torsional rotation shaft, and separation slits which separate the reflection means holding substrate and torsional rotation shaft from the first substrate, using an etching mask, wherein the reflection means holding substrate has a thinner portion on a surface thereof and wherein a portion of the etching mask for the thinner portion of the reflection means holding substrate is thinner than that of the other portions of the etching mask.

In the above method, the etching mask is constituted of a double-layered mask of two different materials, and wherein the portion of the etching mask for the thinner potion of the reflection means holding substrate is a single-layered mask of one of the two different materials.

In the above method, the etching mask is an etching mask in which an impurity is doped in a higher concentration in the portion of the etching mask for the thinner portion of the reflection means holding substrate than that of the other portions of the etching mask.

In the above method, the forming comprises forming a complex substrate comprising a first substrate having a recess part on a surface thereof, an insulating layer and a second substrate, wherein the insulating layer is sandwiched by the first and second substrates such that the recess part faces the insulating layer. The etching comprises etching the first substrate to form the reflection means holding substrate, the torsional rotation shaft, and separation slits which separate the reflection means and torsional rotation shaft from the first substrate, wherein the reflection means holding substrate has a thinner portion on a surface thereof; and stopping the etching when the recess part appears.

In the above method, the etching can comprises etching the first substrate to form a reflection means holding substrate which has a thinner portion on a surface thereof, the torsional rotation shaft and separation slits which separate the reflection means holding substrate and torsional rotation shaft from the first substrate, using an etching mask, wherein a portion of the etching mask for the thinner portion of the reflection means holding substrate is thinner than that of the other portions of the etching mask, and wherein the insulating layer remains even after the etching.

In the above method, the etching comprises etching the first substrate to form a reflection means holding substrate comprising at least one resonance frequency adjustment plate, the torsional rotation shaft and separation slits which separate the reflection means and torsional rotation shaft from the first substrate; and cutting the at least one resonance frequency adjustment plate to adjust a resonance frequency of the vibrator.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIGS. 6A to 6C show a manufacturing process for another embodiment of the vibration mirror manufacturing method according to the present invention;

DESCRIPTION OF THE PREFERRED EMBODIMENT

Figures 1A, 1B:
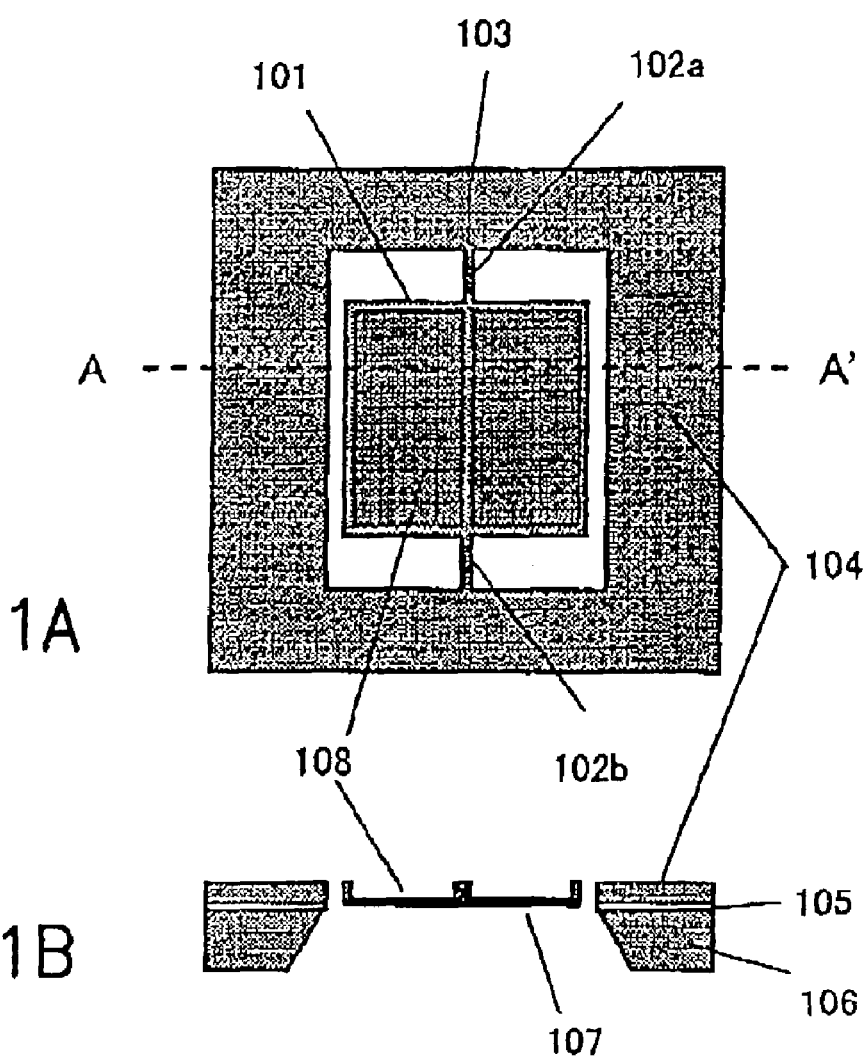
FIGS. 1A and 1B show a vibration mirror according to an embodiment of the present invention.

The embodiments of the present invention are described in detail accompanying with the attached drawings. FIGS. 1A and 1B show an embodiment of a vibration mirror according to the present invention. FIG. 1A is a schematic view showing the shape of the vibration mirror, when viewed from an opposite side to a mirror surface on the vibration mirror. FIG. 1B shows schematically a cross-sectional view along the line A—A in FIG. 1A.

The vibration mirror uses a three-layered substrate where a silicon substrate 104 (as a first substrate) and a silicon substrate 106 (as a second substrate) are jointed through an oxide layer 105 as an insulating layer, and is made by using the micro machining technology. The exemplary manufacturing process is described in detail as follows.

The vibration mirror comprises a movable mirror 101, torsional rods 102a, 102b, and a supporting frame 103. The movable mirror 101 is entirely a quadrate or rectangular in shape. Central parts of opposite sides (the upper and the lower sides in FIG. 1A) of the movable mirror 101 are respectively connected to one end of each of the torsional rods 102a, 102b that are arranged on the same line. Another ends of the torsional rods 102a, 102b are connected to the supporting frame 103. The dimensions of the movable mirror 101 and the torsional rods 102a, 102b are determined based on a resonant frequency, a vibration angle and a mirror surface accuracy of the vibration mirror.

A portion of the second silicon substrate 106 and the oxide layer 105 that contains the movable mirror 101 and the torsional rods 102a, 102b is removed. Therefore, the movable mirror 101 is capable of torsional rotation using the torsional rods 102a, 102b as axes. A mirror surface, which is formed with a metal film having a sufficient reflection rate with respect to a light wavelength at a surface side where the silicon substrate 104 and the oxide layer, is formed on the movable mirror 101.

In addition, a thin region 108 thinner than the thickness of the silicon substrate 104 is formed on a face opposite to the mirror face 107 of the movable mirror 101. Except the thin region (the concave portion) 108, the circumference of the movable mirror 101 and the extension portion between the torsional rods 102a, 102b have the same thickness as the silicon substrate 104. As compared with a mirror structure whose thickness is entirely the same as the silicon substrate 104, the weight of the movable mirror 101 with the above structure is light and its inertial moment is also small, and therefore, a large vibration angle can be obtained with a small driving torque. Furthermore, because the circumference of the movable mirror 101 and the extension portion between the torsional rods 102a, 102b have a sufficient thickness, the movable mirror 101 has a demanded rigidity and does not deform during the vibration.

In addition, for driving the vibration mirror, electrodes are arranged opposite to the mirror face of the movable mirror 101 or end faces which do not joint to the torsional rods 102a of the movable mirror 101, and the movable mirror 101 is vibrated by an electrostatic force by applying a voltage to between the electrodes and the movable mirror 101. Alternatively, a current is made to flow through a coil disposed on the movable mirror 101 to generate an electromagnetic force, and the movable mirror 101 is then driven by the electromagnetic force. Otherwise, a piezoelectric element may be disposed on a sup porting portion of the torsional rods 102a, 102b to drive the movable mirror 101 mechanically. Any of the above driving methods is well known, and therefore it is not shown in FIG. 1.

As described above, because the mirror face 107 of the movable mirror 101 is formed on an adhesion face between the silicon substrate 104 and the oxide layer 105, a surface used to form a thin region (a recess part) 108 for reducing the inertia moment can be the same plane as the surface of the silicon substrate 104. Therefore, the etching mask for processing the concave portion can be easily formed. In addition, the formation of the concave portion can be simultaneously performed during the through etching process for forming a fundamental shape.

Next, a manufacturing process for making the vibration mirror with the aforementioned structure is described in detail. One preferred embodiment of the vibration mirror manufacturing method according to the present invention is described with reference to a manufacturing process shown in FIGS. 2A to 2H.

Figure 2A:
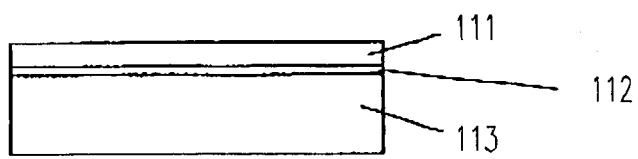
FIGS. 2A to 2H show a manufacturing process for one embodiment of the vibration mirror manufacturing method according to the present invention.

Referring to FIG. 2A, for example, a three-layered substrate where a first substrate 111 and a second substrate 113 is laminated through an insulating layer 112. A silicon substrate with a thickness of 50 μm is used as the first substrate 111, so that a highly accurate and subtle process is possible and a sufficient strength for repeated operations with a suitable rigidity can be obtained. The first substrate 111 is then laminated to a silicon substrate (as the second substrate 113) with a thickness of 525 μm through a thermal oxide layer (as the insulating layer 112) with a thickness of 0.5 μm, so that the three-layered substrate is formed and prepared. In addition, the initial thickness of the silicon substrate 111 is 525 μm. After the silicon substrate 111 is laminated to the silicon substrate 113 through the thermal oxide layer 113, the silicon substrate 111 is mechanically ground to have the thickness of 50 μm. Moreover, as for the adhesion method, a direct adhesion is used, wherein after one silicon substrate is processed by thermal oxidation, and then the two substrates are cleaned. After the two substrates are temporally adhered at the adhesion face in a low pressure environment, a final adhesion, i.e., a thermal process with a temperature of 1100° C., is performed.

Figure 2B:
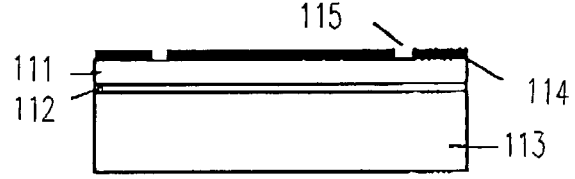

Referring to FIG. 2B, a photoresist layer 114 is coated on the silicon substrate 111 of the three-layered substrate. The photoresist layer 114 is patterned by exposing and developing in such a manner that the photoresist layer 114 over a through region 115 is completely removed.

Figure 2C:
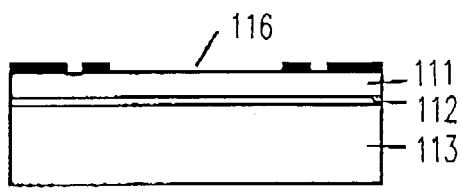

A portion 116 where the plate thickness of the movable mirror is to be thinned (equivalent to the thin region 108 in FIG. 1) is patterned by exposing and developing in such a manner that the portion 116 of the photoresist 114 is formed with a prescribed thickness, so that a stepped profile photoresist is formed as shown in FIG. 2C. At this time, the thickness of the photoresist 114 is set to a thickness at the thin region 116 until the through region 115 is etched to a depth that is equivalent to the thickness of the region where the plate thickness of the movable mirror is thinned, and set to a thickness at the thick region until the through etching ends.

Figure 2D:
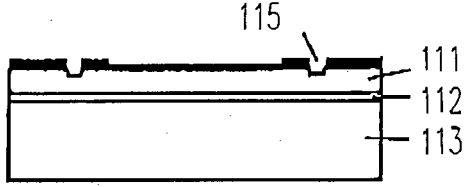

Next, using the photoresist where the step part is formed thereon as a mask, the through region 115 of the silicon substrate 111 is etched by high density plasma etching with an etching gas of $SF_6$. At this time, the etching depth of the through region 115 is the same as or deeper than the thinned portion of the plate thickness of the movable mirror, as shown in FIG. 2D.

Figure 2E:
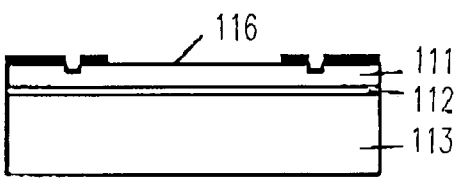

Referring to FIG. 2E, the photoresist 114 on the region 116 to thin the plate thickness of the movable mirror is removed by dry etching to expose the surface of the silicon substrate 111 at this region 116. At this time, because the dry etching is performed to the whole resist on the substrate surface, a mask portion other than the region to be thinned is also etched and thus thinned after the through etching is finished. Therefore, it is necessary to set a thickness by predicting a resist etching amount.

Figure 2F:
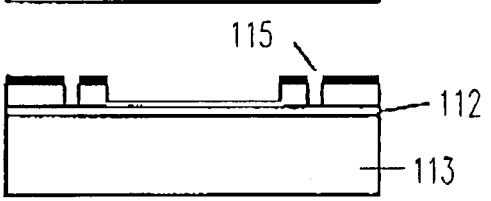

Referring to FIG. 2F, the high density plasma etching process is performed again, and the etching process stops until the through region 115 reaches the thermal oxide layer 112.

Figure 2G:
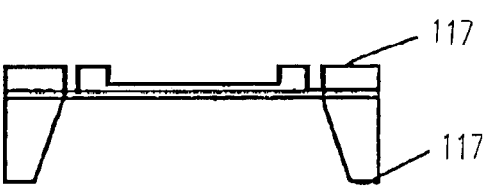

Afterwards, the photoresist 114 is removed, and silicon nitride layers with sufficient resistance against anisotropic etching are respectively formed on the surfaces of the silicon substrates 111, 113 by such as LP-CVD (low pressure-chemical vapor deposition). The silicon nitride layer 117, which is located on a region including movable mirror and the torsional rods, on the surface of the silicon substrate 113 is removed by dry etching, and then patterned. Then, a portion of the silicon substrate 113 corresponding to the movable mirror and the torsional rods is removed by performing an anisotropic etching process with KOH, as shown in FIG. 2G. In addition, the etching mask can also use a thermal oxide layer and be etched by anisotropic etching with TMAH solution.

Figure 2H:
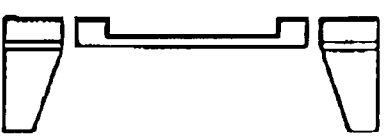

Referring to FIG. 2H, the thermal oxide layer 112 at the junction is removed by dry etching to complete the basic structure of the movable mirror. Afterwards, other processes that are well known for forming the mirror plane of the movable mirror, etc. are carried, but their descriptions are not described herein.

In this embodiment, the method for manufacturing the movable mirror uses the etching mask where a step part is formed thereon to adjust, by using different mask thickness, an etching start timing of the through region around the movable mirror and the silicon substrate at the thin region of the plate thickness of the movable mirror, so that the through region and the thin region of the plate thickness can be formed at the same time. Accordingly, the advantage of the above process steps of the present invention is that it greatly simplifies the manufacturing process and thereby reduces the overall processing time. In addition, because the photoresist layer is used as the etching mask, it is advantageous that the etching mask with a step part can be easily formed through exposing and developing the photoresist. Moreover, at the final stage of the through etching for the silicon substrate, because the thermal oxide layer 112 corresponding to the through region 115 remains and the movable mirror can be held by the remaining thermal oxide layer 112, it is difficult to damage the movable mirror in subsequent processes and therefore the yield of the movable mirror can be effectively improved.

Figure 3A:
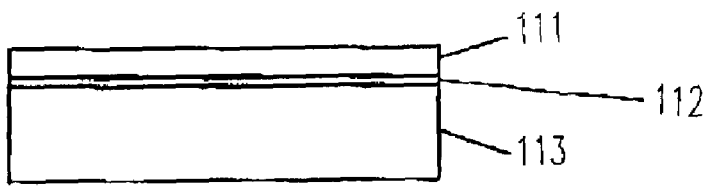
FIGS. 3A to 3F show a manufacturing process for another embodiment of the vibration mirror manufacturing method according to the present invention.
Figure 3B:
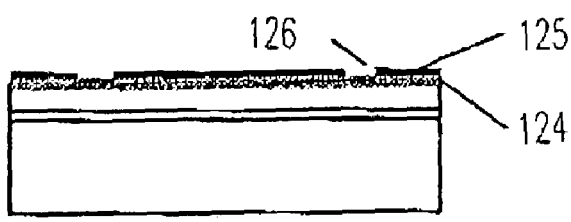

FIG. 3A to FIG. 3F show a manufacturing method for making a movable mirror according to another embodiment of the present invention. Similar to the previous embodiment, a three-layered substrate comprising the silicon substrates 111, 113 and the thermal oxide layer 124 is prepared as shown in FIG. 3A. After a thermal oxide layer 124 with a thickness of 1 μm is formed on the three-layered substrate, a resist layer 125 is coated on the thermal oxide layer 124. Referring to FIG. 3B, the resist layer 125 is patterned by performing an exposure process and developing process under a condition that the resist layer corresponding to a through region 126 is completely removed.

Figure 3C:
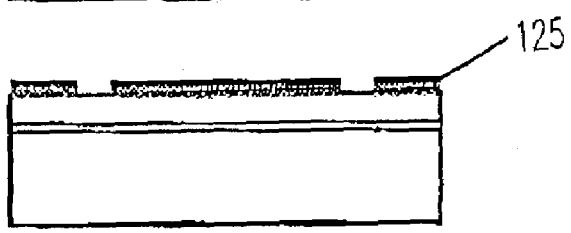

Referring to FIG. 3C, using the resist layer 124 as a mask, a dry etching process is performed with an etching gas $CF_4$ until a portion of the thermal oxide layer 124 corresponding to the through region 126 is completely removed. The etching process for example, comprise a dry etching process, but however a wet etching process with buffer hydrofluoric acid may also be used. However, when the etched sidewall of the oxide layer mask is highly critical as being very vertical during performing a highly accurate through etching, it is preferred to use the dry etching with a high anisotropic ability.

Figure 3D:
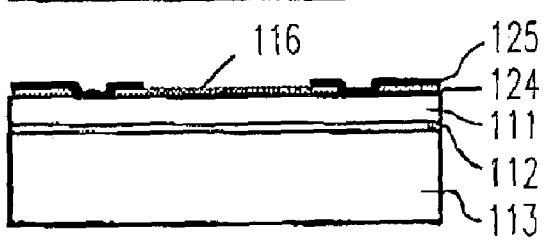

Referring to FIG. 3D, the resist layer 126 is coated again, and the resist layer 126 is patterned by exposing and developing under a condition that the resist layer 126 at a region 116 formed to be thinner than the silicon substrate 111 is completely removed.

Figure 3E:
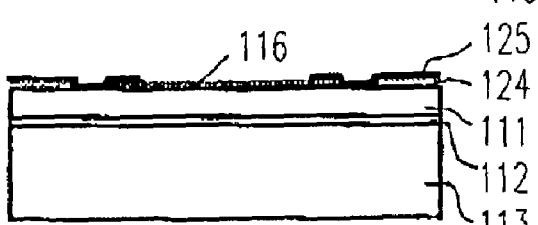

Referring to FIG. 3E, the thermal oxide layer 124 at the region 116 formed to be thinner than the silicon substrate 111 is patterned by dry etching with an etching gas CH4 to have a prescribed thickness, so that a stepped oxide layer is formed.

Figure 3F:
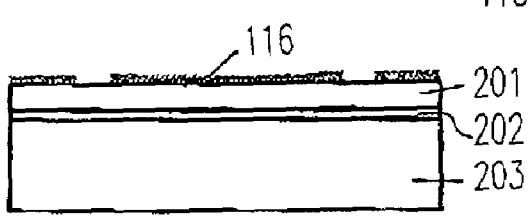

Afterwards, referring to FIG. 3F, a mask for performing the through etching process using a high density plasma is thus formed by removing the resist layer 126. The basic structure of the vibration mirror is completed by carrying out the processes similar to the processes shown in FIGS. 2D to 2H.

In the method for making the vibration mirror according to the present invention, because the etching mask for the silicon substrate 111 uses a thermal oxide film whose etching election ration to the silicon is larger than the resist, penetrating a thick substrate and forming a thin plate are possible, so that a large vibration mirror can be formed. In addition, because dry etching is used to form the step part of the etching mask, the edge of the step part of the etching mask can be well controlled to form with a right angle and ends of the wafer substrate around the thin plate that would also be etched could also be formed with a right angle, so that the dimension of the vibration mirror can be precisely and accurately controlled, and the non-uniformity in the thickness can be improved. Moreover, the advantages of using the etching mask with the step profile are the same as described in the previous embodiments.

Figure 4A:
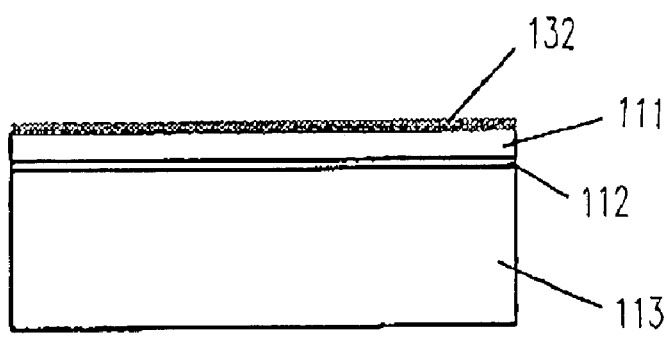
FIGS. 4A to 4D show a manufacturing process for another embodiment of the vibration mirror manufacturing method according to the present invention.

FIGS. 4A to FIG. 4D show a manufacturing method for making a movable mirror according to yet another embodiment of the present invention. As shown in FIG. 4A, the same as the previous embodiments, a three-layered substrate comprising the silicon substrates 111, 113 and the thermal oxide layer 124 is prepared, and a thermal oxide layer 132 is further formed on the first silicon substrate 111. The thickness of the thermal oxide layer 132 is set to a thickness until the through region 115 is etched to a depth that is equivalent to the thickness of the region where the plate thickness of the movable mirror is thinned.

Figure 4B:
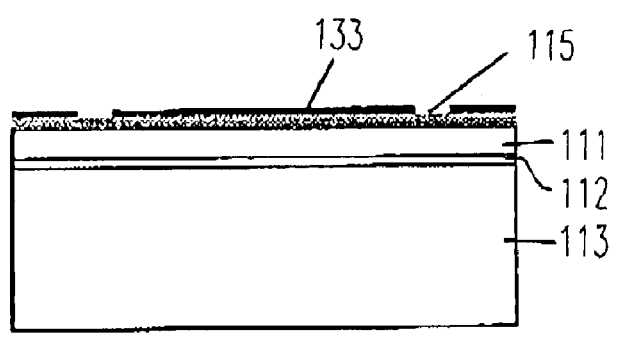

A thin Ni film 133 is formed by sputtering the Ni on the thermal oxide layer 132. The thickness of the thin Ni film 133 is set to a thickness until the through etching ends. In addition, the material of the mask can be such a material that has an etching selectivity ratio to the silicon, a good adhesion with the oxide layer, and can be easily removed after the etching process; otherwise, a material other than Ni may also be used. Referring to FIG. 4B, by using a wet etching and a resist mask, the thin Ni film 133 corresponding to the through region 115 is removed.

Figure 4C:
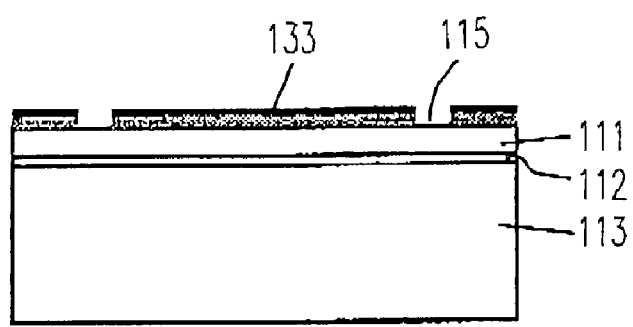

Referring to FIG. 4C, using the thin Ni film 133 as a mask, the thermal oxide layer 132 at the through region 115 is removed by using a wet etching.

Figure 4D:
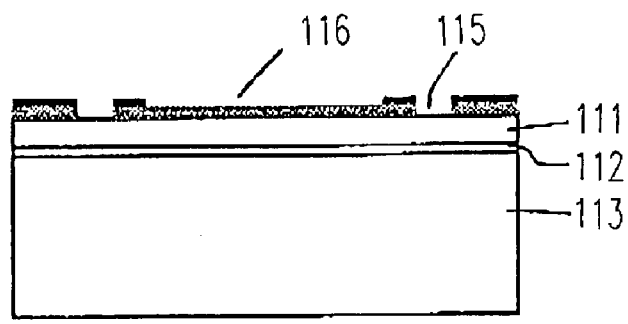

Referring to FIG. 4D, the thin Ni film 132 at the region 116 that is formed to be thinner than the silicon substrate 111 is removed by using a wet etching and the resist mask.

Therefore, a mask with a stepped structure for performing the through etching process by using a high-density plasma is thus formed. The basic structure of the vibration mirror is finished by processes similar to the processes shown in FIGS. 2D to 2H.

In this embodiment, the upper part and the lower part of the etching mask with the stepped structure use different mask materials, and therefore the etching start timing for the silicon substrate can be adjusted to a wider range as compared with the case that only single mask material is used. Therefore, the design control range for the depth of the through etching and the thickness of the thin region of the movable mirror can be promoted further. Furthermore, the upper part of the mask uses the thin Ni film formed through sputtering, but an electroforming film may be used when through etching a thicker substrate. Moreover, the method using wet etching to form the step part on the etching mask has an advantage that a plurality of wafers can be easily processed at the same time. The advantage of using the etching mask with the step part is the same as described in the previous embodiments.

Figure 5A:
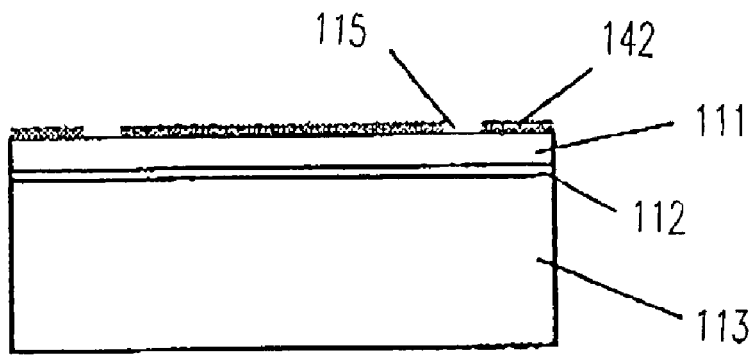
FIGS. 5A to 5D show a manufacturing process for another embodiment of the vibration mirror manufacturing method according to the present invention.

FIG. 5A to FIG. 5D show a manufacturing method for making a movable mirror according to yet another embodiment of the present invention. As shown in FIG. 5A, the same as the previous embodiments, a three-layered substrate comprising the silicon substrates 111, 113 and the thermal oxide layer 124 is prepared, and a thermal oxide layer 142 is further formed on the first silicon substrate 111. The thermal oxide layer 142 corresponding to the through region 115 is removed by dry etching with a resist mask. The thermal oxide layer 142 is set to a thickness until the through etching process ends.

Figure 5B:
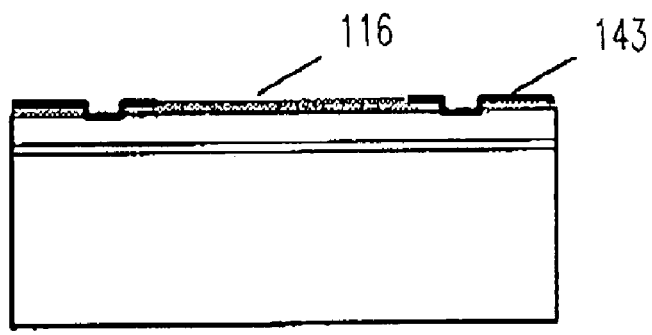

Referring to FIG. 5B, a resist layer 143 is coated on the thermal oxide layer 142, and the resist 143 at the region 116 where the plate thickness of the movable mirror is thinned is exposed, developed and then removed.

Figure 5C:
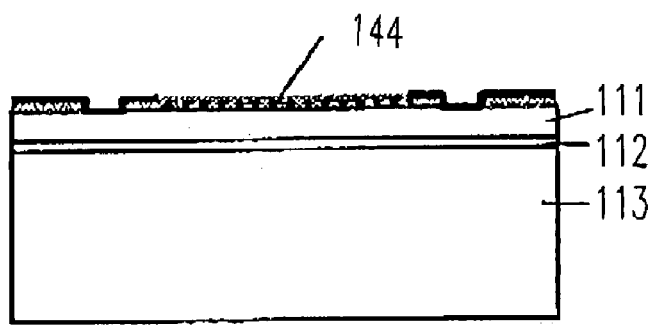

Referring to FIG. 5C, using the resist layer 143 as a mask, boron ions 144 with a high concentration are implanted into the thermal oxide layer 142 at the region 116 where the plate thickness of the movable mirror is thinned. The region of the thermal oxide region 142 where the ions are implanted has an etching rate faster than other region during an etching using a high-density plasma. The ion implantation amount is set to a value equivalent to an etching rate so that the through region 205 is etched to a depth equivalent to the thickness of the region where the movable mirror is to be thinned.

Figure 5D:
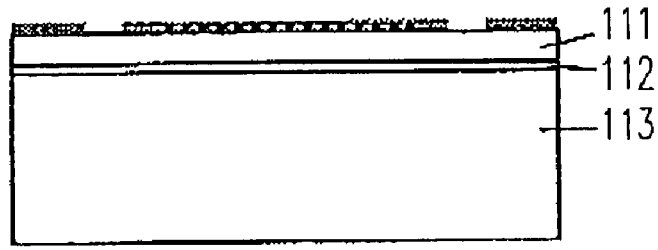

Referring to FIG. 5D, by removing the resist layer 143, an etching mask, where a portion of it has a different etching rate, for performing the through etching process by using a high density plasma is thus formed. Afterwards, the basic structure of the movable mirror is finished by carrying out the processes similar to the processes shown in FIGS. 2D to 2H.

In this embodiment, because the etching mask of which is partially doped with high concentration impurity is used to adjust an etching start timing for the silicon substrate, it is advantageous that the mask material can use one material and the stepped part is not necessary to be formed.

FIG. 6A to FIG. 6D show a manufacturing method for making a movable mirror according to yet another embodiment of the present invention. As shown in FIG. 6A, the same as the previous embodiments, a three-layered substrate comprising the silicon substrates 111, 113 and the thermal oxide layer 124 is prepared. But, before the adhesion process, a recess part 152, which has the same depth as the thickness of the thinned region of the movable mirror, is formed on a portion (to be formed as the supporting frame) of the first silicon substrate 111 at the adhesion face side. The method for forming the recess part 152 is a method capable of obtaining an accurate depth, if possible. The anisotropic etching and the dry etching, etc. to the oxide mask are performed, while the etching rate and time are well managed.

Referring to FIG. 6B, a stepped resist mask 154 is formed on the silicon substrate 111 with the same processes as described in previous embodiment. Referring to FIG. 6C, using the resist mask 154, the silicon substrate 111 is through etched by using a high density plasma etching, and etching is stopped as the recess part 152 appears. The recess part 152 is used to monitor the etching stop. Because the timing of the etching stop can be confirmed visually by setting this monitoring mechanism, a movable mirror with high accuracy in dimension can be made even though the etching condition is non-uniform. In addition, when there is a non-uniformity in distribution in the etching rate, it is preferred to form a plurality of recess parts 152 within four sides of the supporting frame. Afterwards, the basic structure of the vibration mirror is completed by carrying out the processes similar to the processes shown in FIGS. 2G to 2H.

Figure 7:
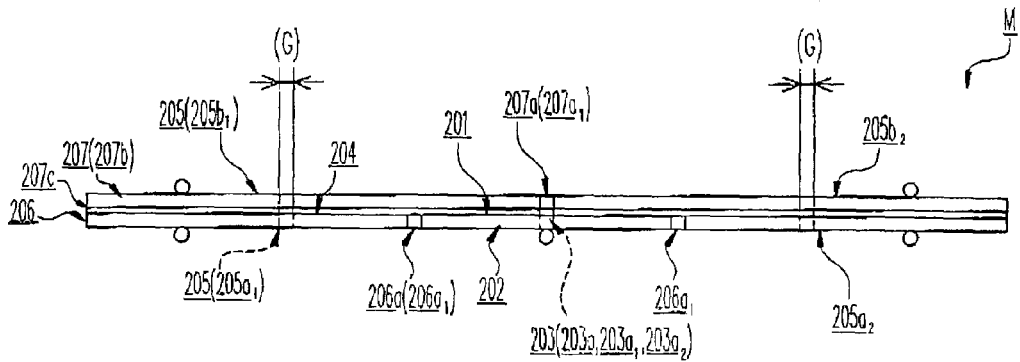
FIG. 7 is a diagram showing an optical scanning device according to the embodiment of the present invention.
Figure 8:
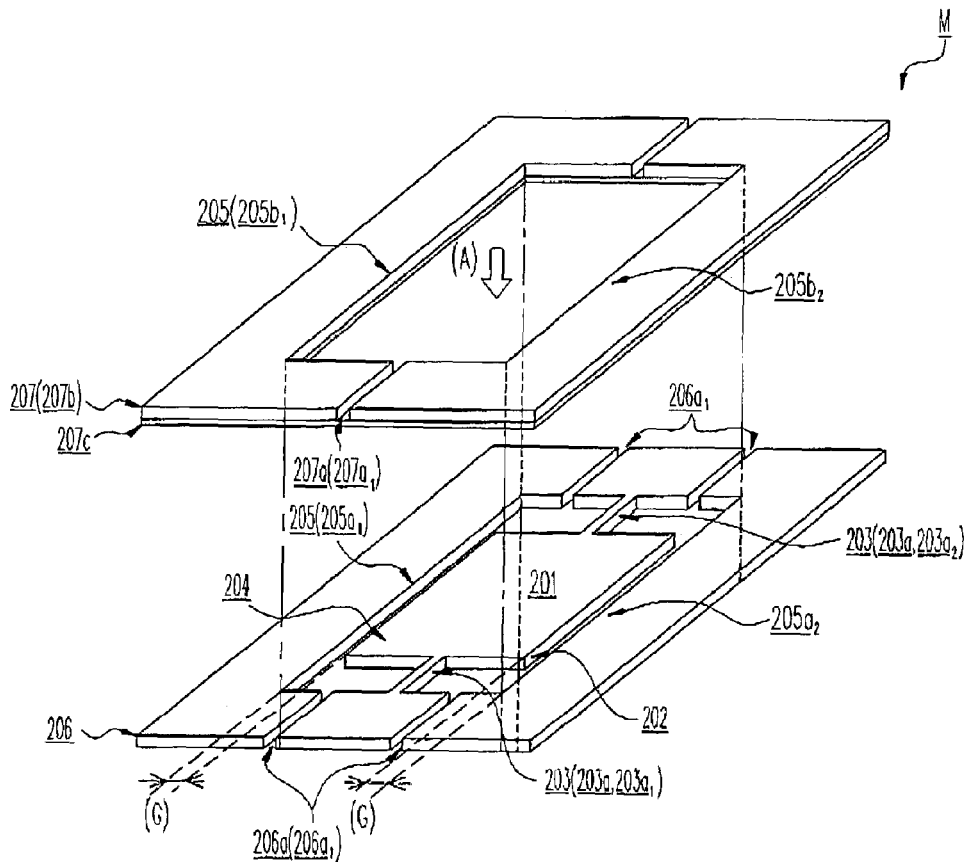
FIG. 8 is an exploded diagram showing main parts of the optical scanning device according to the embodiment of the present invention.
Figure 9:
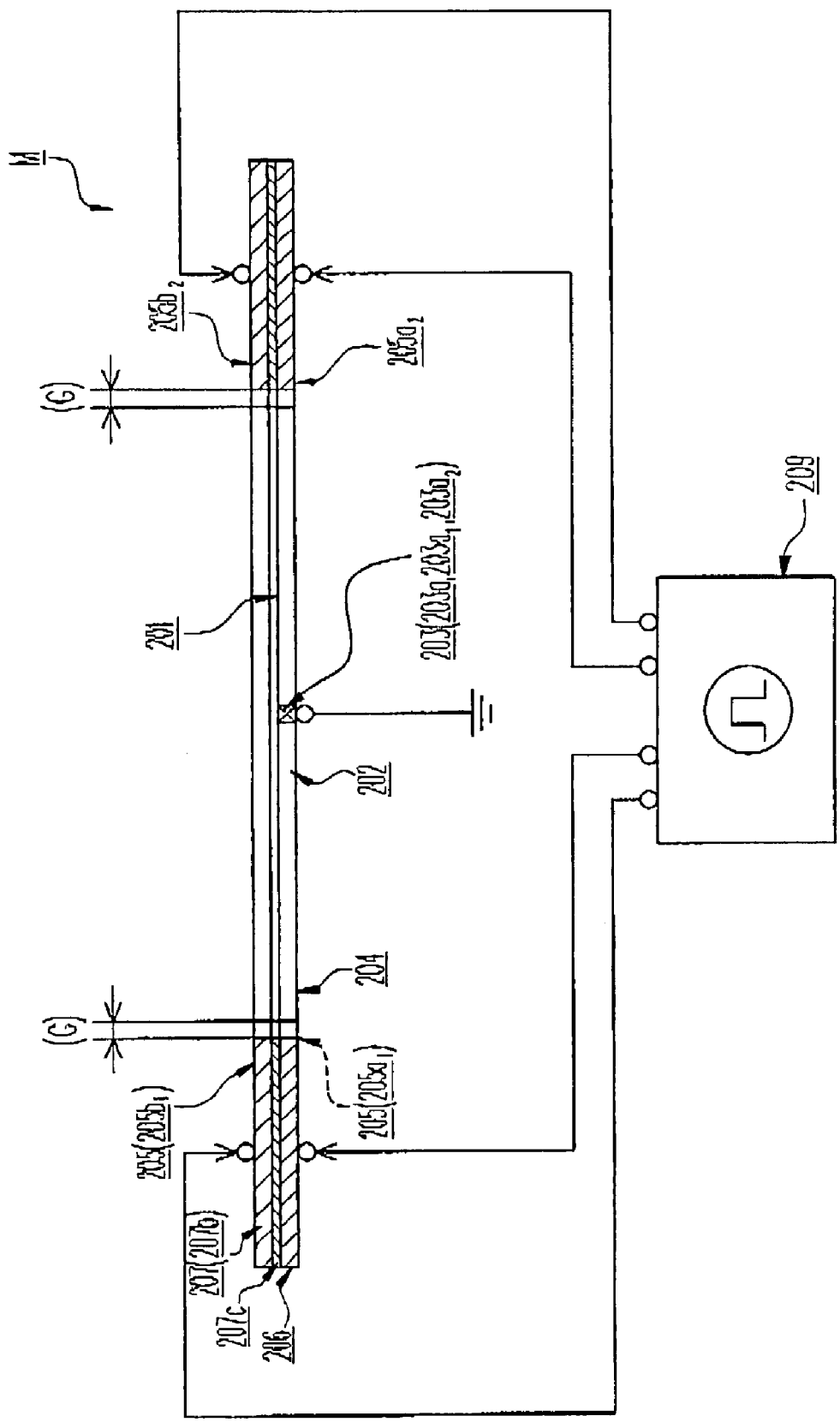
FIG. 9 is a diagram showing other main parts of the optical scanning device according to the embodiment of the present invention.
Figure 10:
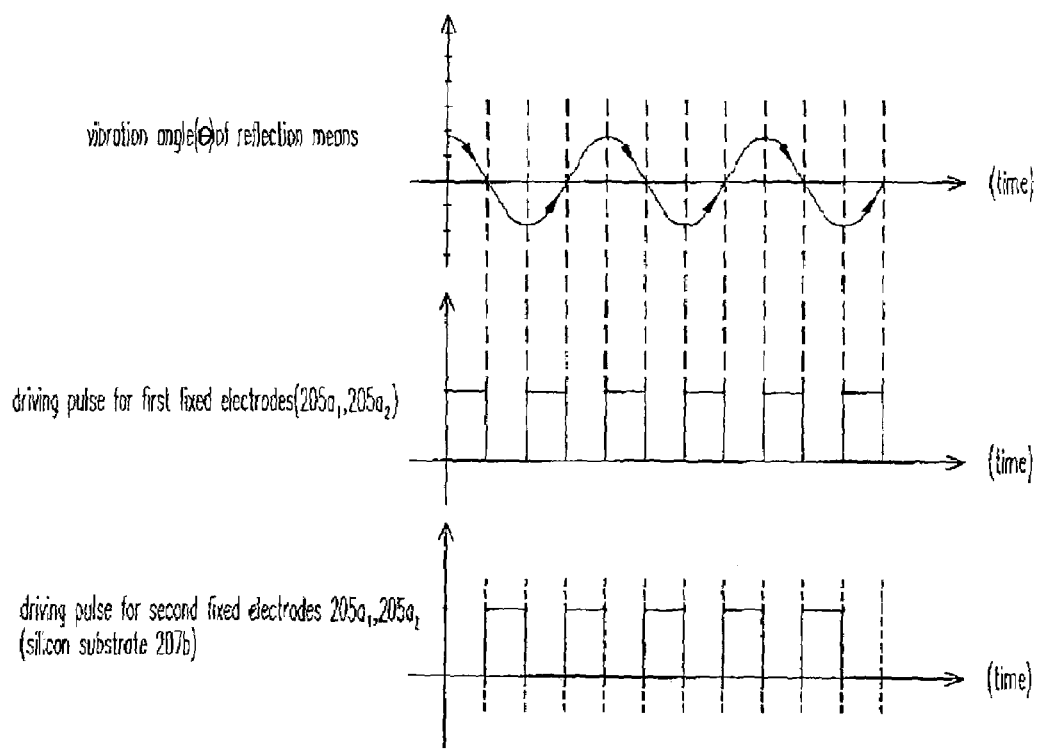
FIG. 10 is a graph showing characteristics of a driving pulse of first fixed electrodes, a driving pulse of second fixed electrodes and a vibration angle of a reflection means to explain other main parts of the optical scanning device according to the embodiment of the present invention.
Figure 11:
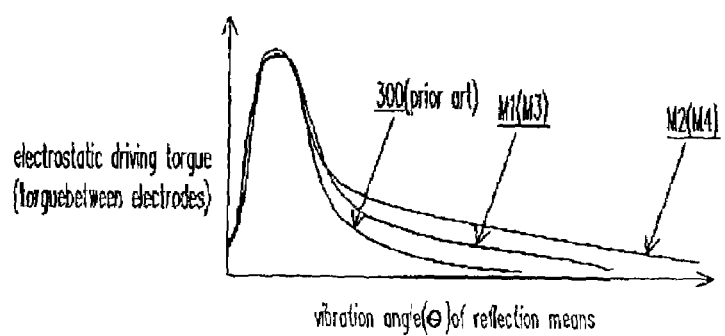
FIG. 11 is a graph showing characteristics of an electrostatic driving torque (torque between electrodes) and the vibration angle of the reflection means to explain other main parts of the optical scanning device according to the embodiment of the present invention.
Figure 12:
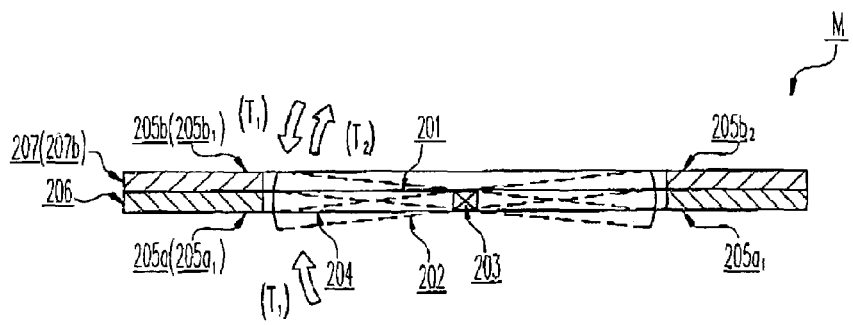
FIG. 12 is a diagram to explain operations of other main parts of the optical scanning device according to the embodiment of the present invention.

Next, embodiments of the movable electrodes and the fixed electrodes are described in detail by referring to the attached drawings. FIG. 7 is a front view showing a structure of the main parts of a vibration mirror according to one embodiment of the present invention. FIG. 8 is an exploded and perspective view of FIG. 7. FIG. 9 is a cross-sectional view of the front view in FIG. 7. FIG. 10 shows graphs showing characteristics of a vibrational angle (θ) of a reflection means, driving pulses of first fixed electrodes, and a driving pulse of second fixed electrodes. FIG. 11 is a graph showing an electrostatic driving torque (torque between electrodes) and the vibrational angle (θ) of the reflection means. FIG. 12 is a diagram to explain the operation of main parts of the movable mirror. In FIGS. 7 to 12, the vibration mirror M, which is used to perform an optical scanning by using the electrostatic force to rotate the rotation shaft to change the reflection direction of an incident light, comprises a reflection mirror as a reflection means (reflection mirror) 201 for reflecting an incident light; a mirror substrate 202 used as a reflection means holding substrate where the reflection mirror 201 is formed with a film thereon; a torsional rotation shaft 203 composed of rods 203a capable of rotably supporting two ends of the mirror substrate 202; movable electrodes 204 that are respectively formed on two side faces of the mirror substrate 202 supported by the rods 203a; a first substrate 206 with a substantially rectangular ring shape that supports the movable electrodes 204, which are opposite to the first fixed electrodes 205a as the fixed electrode 205, through the rods 203a; a first electrically insulating means 206a for electrically insulating and separating the movable electrodes 204 and the first fixed electrodes 205a; a silicon substrate 207b with a substantially rectangular ring shape, as a second substrate 207, that is electrically insulated and overlapped to adhere to the first substrate 206; and second fixed electrodes 205b that are respectively opposite to the movable electrodes 204 and are formed on the silicon substrate 207b. Therefore, the structure of the above vibration mirror is simple, the vibration angle for performing the optical scanning is large, the driving voltage is low and the cost is low. In addition, a portion of the first substrate 206 that supports the reflection means holding substrate 202 through the torsional rotation shaft 203 and the other portion of the first substrate 206 are separated by slit-shaped and electrically isolating separating means 206a. However, as described above, the profile of the mirror substrate is through etched under a condition that the first substrate 206 and the second substrate 207 are adhered. Because the slits of the electrically isolating separating means 206a are penetrated at the same time, a fixing part for the first substrate can be supported in such as manner that its arrangement can be kept.

The separating splits 206a1 formed by etching, which are used as the first electrically isolating separating means 206a, are disposed on the silicon substrate 206, and thus the mirror substrate 202 and first fixed electrodes 205a1, 205a2 are formed. Furthermore, separating splits 207a1, which are used as the second electrically isolating separating means 207a, are formed by the etching process on the silicon substrate 207b, and thus second fixed electrode 205b1, 205b2 are formed. In this way, minute gaps G are formed between the first fixed electrodes 205a1, 205a2, and the movable electrodes 204 that are formed on the side faces of the mirror substrate 202 where the reflection mirror 201 is formed thereon with a film. Similarly, minute gaps G are also formed between the second fixed electrode 205b1, the second fixed electrode 205b2, and the movable electrodes 204 that are formed on the side faces of the mirror substrate 202.

The silicon substrate, used as the first substrate 206, is etched so that the rod members 203a1, 203a2 (rods 203a), which are twist springs, are formed on the two side faces of the mirror substrate 202. The rods 203a is constructed by arranging a plurality of rod members 2033a1 and 203a2 on the same straight line and support rotably the two ends of the mirror substrate 202. Therefore, a vibration mirror, whose structure is simple, vibration angle for performing the optical scanning is large, driving voltage is low and cost is low, can be provided. The silicon substrate 206 and the silicon substrate 207b arranged through an insulating film 207c are positioned, and then adhered by a manufacturing method of such as a direct adhesion process. After the adhesion process is performed using wafer as a processing unit, the etching process is performed, so that the manufacturing cost can be reduced.

Referring to FIG. 9, in the vibration mirror M, the movable electrodes 204, which are formed on the side faces of the mirror substrate 202 where the reflection mirror 201 is formed with film thereon, are grounded, and the first fixed electrodes 205a1, 205a2 and the second fixed electrodes 205b1, 205b2 are connected to a driving voltage applying means 209. By applying a driving voltage from the driving voltage applying means 209, the optical scanning is thus performed by rotating the rotation shaft 203 with an electrostatic force to change the reflection direction of an incident light.

Figure 54:
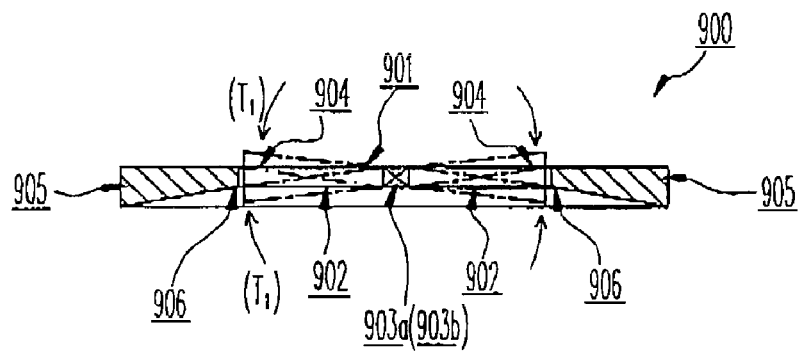
FIG. 54 is a cross-sectional view showing a conventional optical scanning device.
Figure 55:
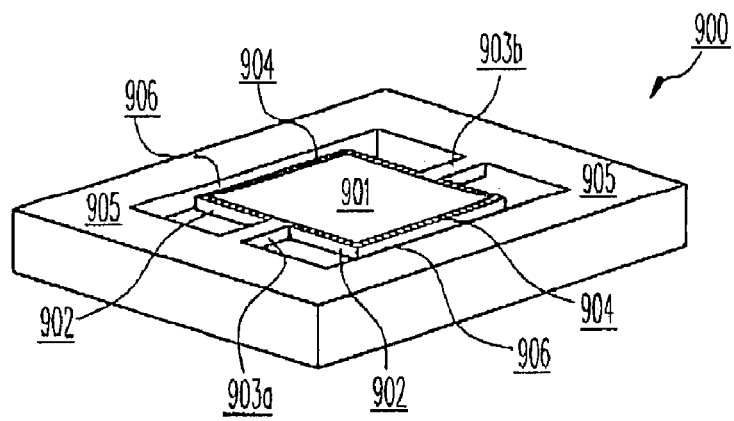
FIG. 55 is a perspective view showing the conventional optical scanning device.
Figure 56:
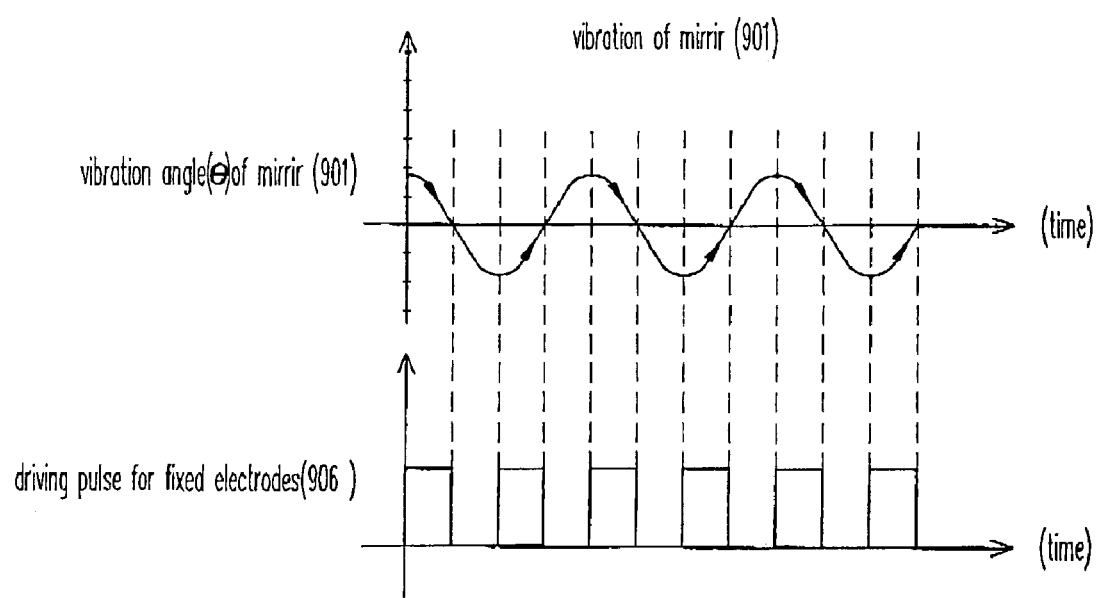
FIG. 56 is a graph showing characteristics of a driving pulse of fixed electrodes and a vibration angle of a reflection mirror of the conventional optical scanning device.

In the resonant state, the vibration angle θ of the mirror substrate 202 where the reflection mirror 202 is formed with film thereon can be substantially expressed by the equation: θ=(Tq/I)·K, wherein Tq represents an electrostatic driving torque that acts against the reflection means holding substrate 202 where the reflection mirror 201 is formed thereon, I is an inertial moment of the reflection means holding substrate 202 where the reflection mirror 201, and K is a constant to determine a resonant frequency. The electrostatic torque Tq is expressed by Tq∝S·(V/g)$^2$, wherein S is a facing area between the electrodes, V is an applying voltage, and g is a distance between the electrodes. As shown in FIG. 10, according to a displacement angle (time) of the mirror substrate 202 where the reflection mirror 201 is formed with film thereon, the first fixed electrodes 205a1, 205a2 and the second fixed electrodes 205b1, 205b2 are connected to the driving voltage applying means 209 to switch a driving pulse, so as to drive the vibration mirror M. Therefore, as shown in FIG. 11, in comparison with the conventional vibration mirror 900 in FIG. 54, the electrostatic driving torque (torque between the movable electrodes 204 and the fixed electrodes 205) acting against the mirror substrate 202 can operate the mirror substrate 202 within a wide displacement angle range. Therefore, according to the equation for the vibration angle (θ) of the mirror substrate 202: θ=(Tq/I)·K, because the displacement angle to operate the electrostatic driving torque Tq increases, the vibration angle θ increases. As shown in FIG. 12, because the driving pulse is switched by the driving voltage applying means 209, in addition to the electrostatic driving torque T1 shown in arrow direction, an electrostatic driving torque T2 and an electrostatic driving torque T3 act, too. However, there is only one electrostatic driving torque T1 acted in the arrow direction for the conventional vibration mirror 900 (referring to FIG. 54). Therefore, a vibration mirror M, whose structure is simpler, vibration angle for performing the optical scanning is larger, driving voltage is lower and cost is lower, can be provided.

Figure 13:
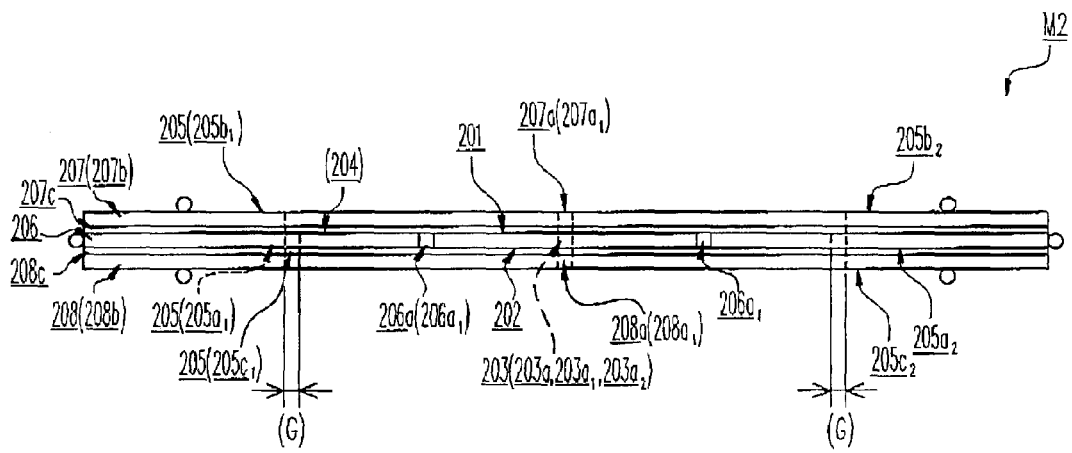
FIG. 13 is a diagram showing an optical scanning device according to another embodiment of the present invention.
Figure 14:
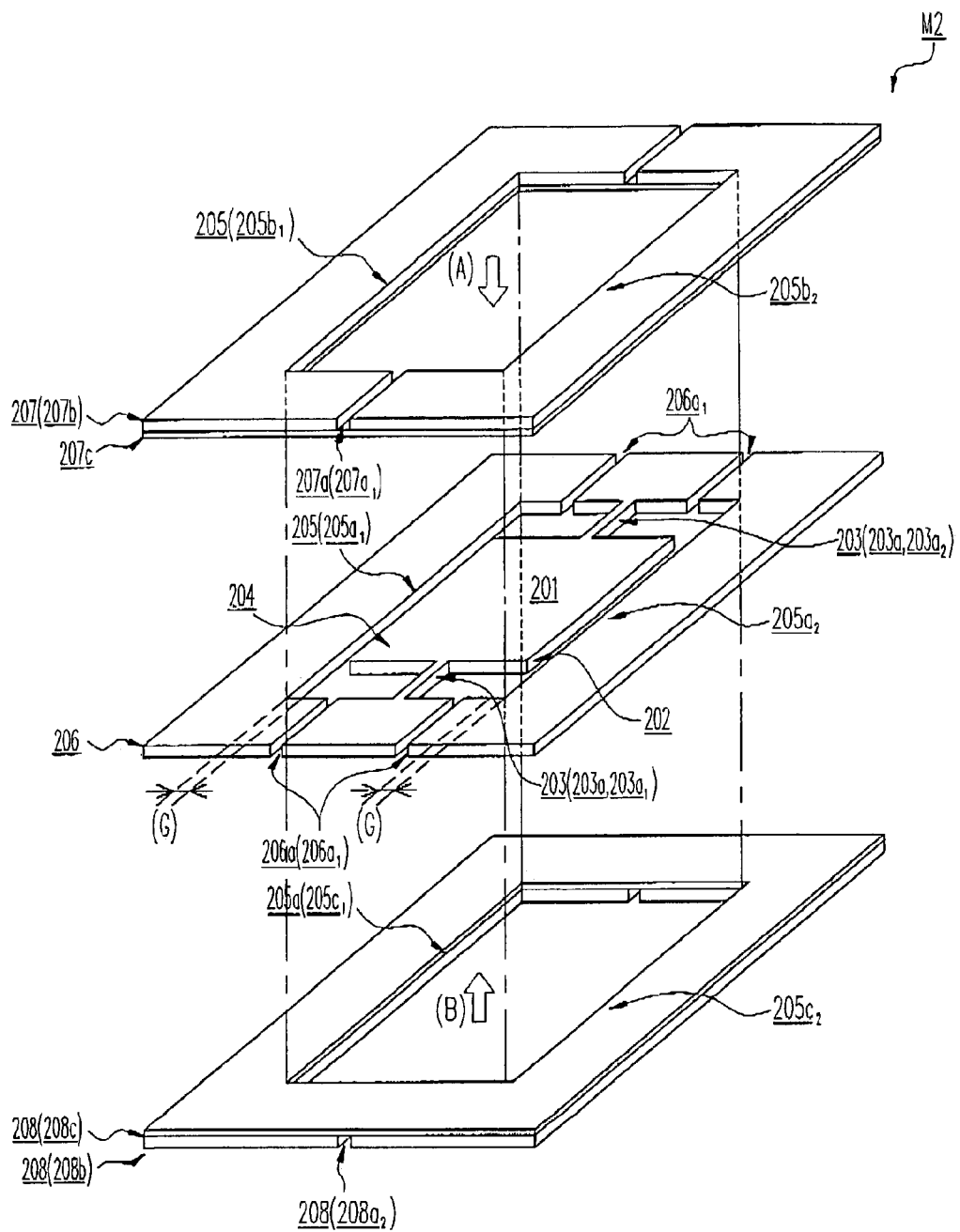
FIG. 14 is a diagram showing main parts of the optical scanning device according to another embodiment of the present invention.
Figure 15:
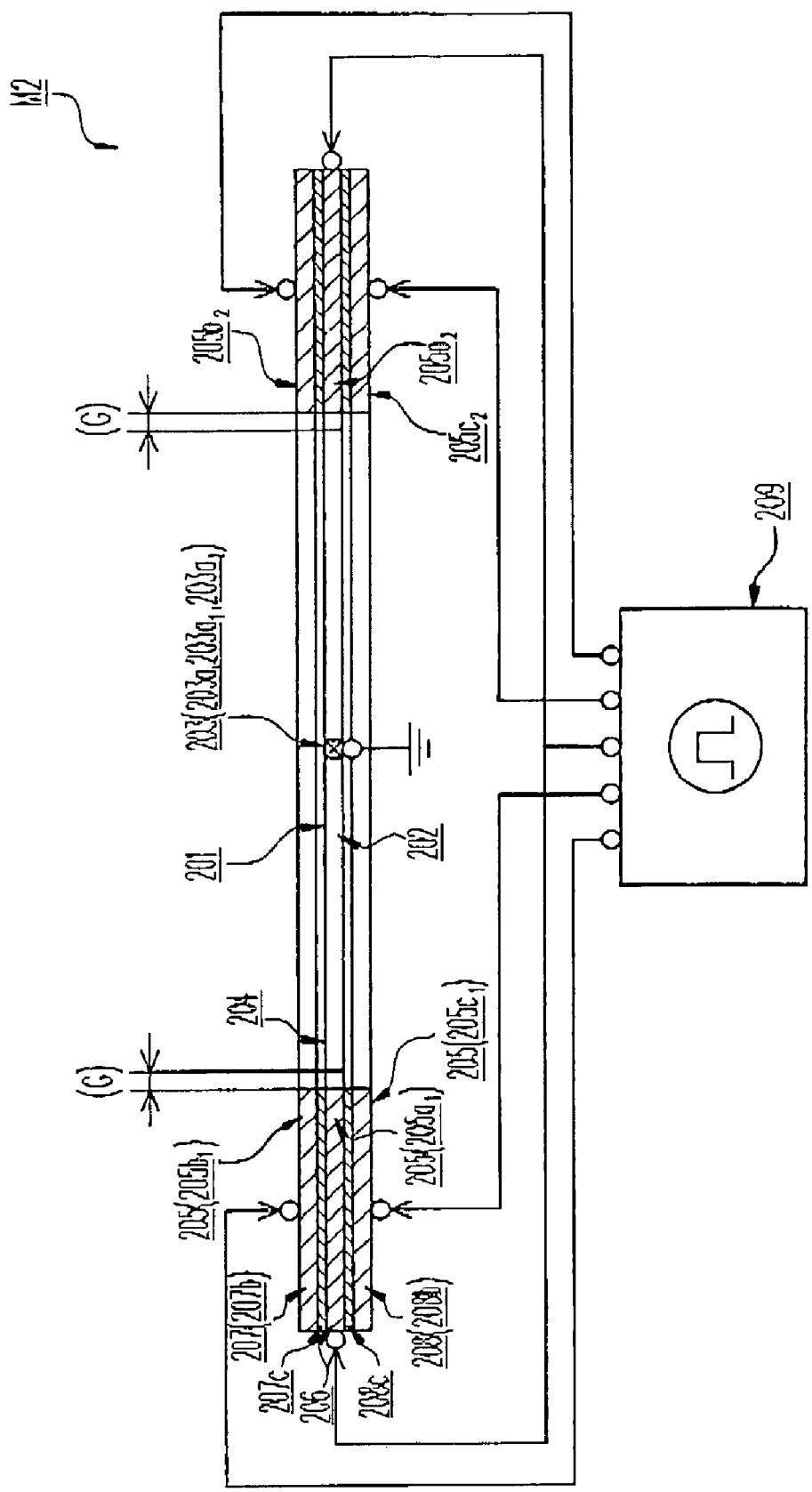
FIG. 15 is an exploded diagram showing other main parts of the optical scanning device according to another embodiment of the present invention.
Figure 16:
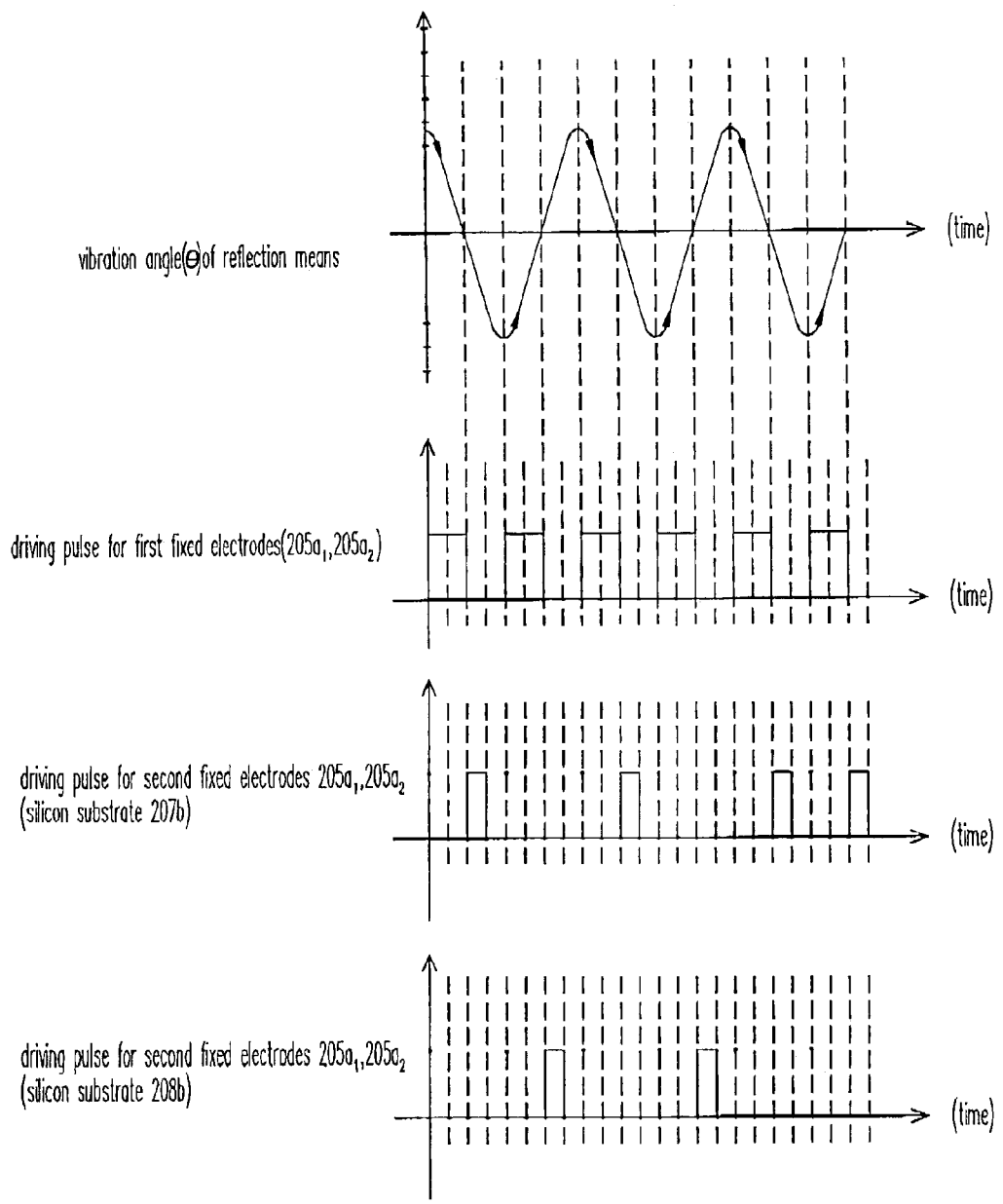
FIG. 16 is a graph showing characteristics of a driving pulse of first fixed electrodes, a driving pulse of second fixed electrodes and a vibration angle of a reflection means to explain other main parts of the optical scanning device according to another embodiment of the present invention.
Figure 17:
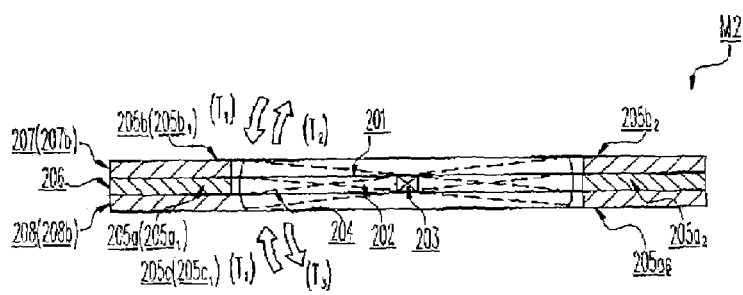
FIG. 17 is a diagram to explain operations of other main parts of the optical scanning device according to another embodiment of the present invention.

FIG. 13 is a front view showing a structure of main parts of a vibration mirror M2 according to another embodiment of the present invention. FIG. 14 is an exploded and perspective view of FIG. 13. FIG. 15 is a cross-sectional view of the front view in FIG. 13. FIG. 16 shows graphs showing characteristics of a vibrational angle (θ) of a reflection means and driving pulses for each of first, second and third fixed electrodes. FIG. 17 is a diagram to explain the operation of main parts of the movable mirror. In FIGS. 13 to 17, the vibration mirror M2, which is used to perform an optical scanning by using the electrostatic force to rotate the rotation shaft to change the reflection direction of an incident light, comprises a reflection mirror as a reflection means (reflection mirror) 201 for reflecting an incident light; a mirror substrate 202 used as a reflection means holding substrate where the reflection mirror 201 is formed with a film thereon; a torsional rotation shaft 203 composed of rods 203a capable of rotably supporting two ends of the mirror substrate 202; movable electrodes 204 that are respectively formed on two side faces of the mirror substrate 202 supported by the rods 203a; a first substrate 206 that supports the movable electrodes 204, which are opposite to the first fixed electrodes 205a, through the rods 203a; a separating split 206a1, which is used as the first electrically isolating separating means 206a, for electrically insulating and separating the first fixed electrodes 205a and the movable electrodes 204 of the first substrate 206; a silicon substrate 207b that is electrically insulated and overlapped to adhere to the first substrate 206; second fixed electrodes 205b that are respectively opposite to the movable electrodes 204 and are formed on the silicon substrate 207b; and third fixed electrodes 205c (205c1+205c2) that are respectively opposite to the movable electrodes 204 and are formed on the third silicon substrate 208.

The separating splits 206a1 formed by etching are disposed on the silicon substrate 206, and thus the mirror substrate 202 and first fixed electrodes 205a1, 205a2 are formed. Furthermore, by the etching process, separating splits 207a1, which are used as a second electrically isolating separating means 207a, are formed on the silicon substrate 207b, and thus the second fixed electrodes 205b1, 205b2 as the second fixed electrodes 205b are formed. Moreover, by the etching process, a separating split 208a1, which is used as a third electrically isolating separating means 208a, is formed on the silicon substrate 8b, and thus the third fixed electrodes 205c1, 205c2 as the third fixed electrodes 205c are formed. In this way, minute gaps G are formed between the first fixed electrodes 205a1, 20a2, and the movable electrodes 204 that are formed on the side faces of the mirror substrate 202 where the reflection mirror 201 is formed thereon with film. Similarly, minute gaps G are also formed between the second fixed electrodes 205b1, 205b2, and the movable electrodes 204 that are formed on the side faces of the mirror substrate 202. Similarly, minute gaps G are also formed between the second fixed electrode 205c1, 205c2, and the movable electrodes 204 that are formed on the side faces of the mirror substrate 202.

The silicon substrate, used as the first substrate 206, is etched so that the rod members 203a1, 203a2 (rods 203a), which are twist springs, are formed on the two side faces of the mirror substrate 202. The silicon substrate 206, the silicon substrate 207b arranged through an insulating film 207c, and the silicon substrate 208b arranged through an insulating film 208c are positioned, and then adhered by a manufacturing method of such as a direct adhesion process.

Referring to FIG. 15, in the vibration mirror M2, the movable electrodes 204, which are formed on the side faces of the mirror substrate 202 where the reflection mirror 201 is formed with film thereon, are grounded, and the first fixed electrodes 205a1, 205a2, the second fixed electrodes 205b1, 205b2, and the third electrodes 205c1, 205c2 are connected to a driving voltage applying means 209. By applying a driving voltage from the driving voltage applying means 209, the optical scanning is thus performed by rotating the rotation shaft 203 with an electrostatic force to change the reflection direction of an incident light. As shown in FIG. 16, according to a displacement angle (time) of the mirror substrate 202 where the reflection mirror 201 is formed with film thereon, the first fixed electrodes 205a1, 205a2, the second fixed electrodes 205b1, 205b2 and the third fixed electrodes 205c1, 205c2 are connected to the driving voltage applying means 209 to switch a driving pulse, so as to drive the vibration mirror M2. Therefore, as shown in FIG. 11, in comparison with the conventional vibration mirror 900 in FIG. 54, the electrostatic driving torque (torque between the movable electrodes 204 and the fixed electrodes 205) acting against the mirror substrate 202 can operate the mirror substrate 202 within a wide displacement angle range. Therefore, according to the equation for the vibration angle (θ) of the mirror substrate 202: θ=(Tq/I)·K, because the displacement angle to operate the electrostatic driving torque Tq increases, the vibration angle θ increases. As shown in FIG. 17, because the driving pulse is switched by the driving voltage applying means 209, in addition to the electrostatic driving torque T1 shown in arrow direction, an electrostatic driving torque T2 and an electrostatic driving torque T3 act, too. However, there is only one electrostatic driving torque T1 acted in the arrow direction for the conventional vibration mirror 900 (referring to FIG. 54). Therefore, a vibration mirror M2, whose structure is simpler, vibration angle for performing the optical scanning is larger, driving voltage is lower and cost is lower, can be provided.

Figure 18:
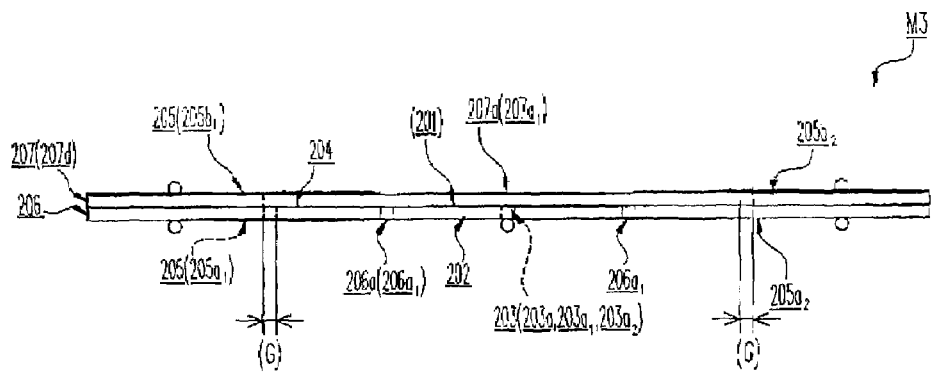
FIG. 18 is a diagram showing an optical scanning device according to another embodiment of the present invention.
Figure 19:
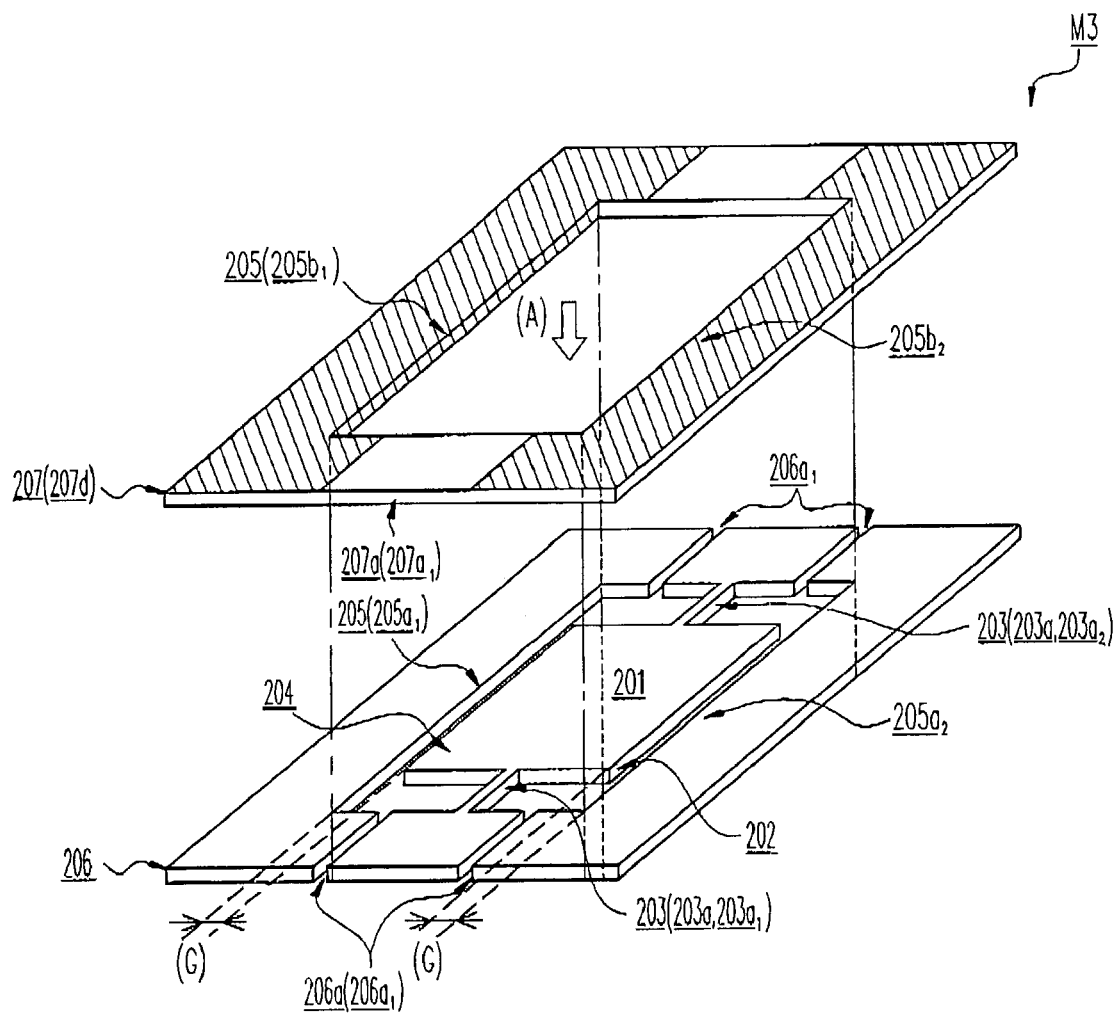
FIG. 19 is an exploded diagram showing main parts of the optical scanning device according to another embodiment of the present invention.
Figure 20:
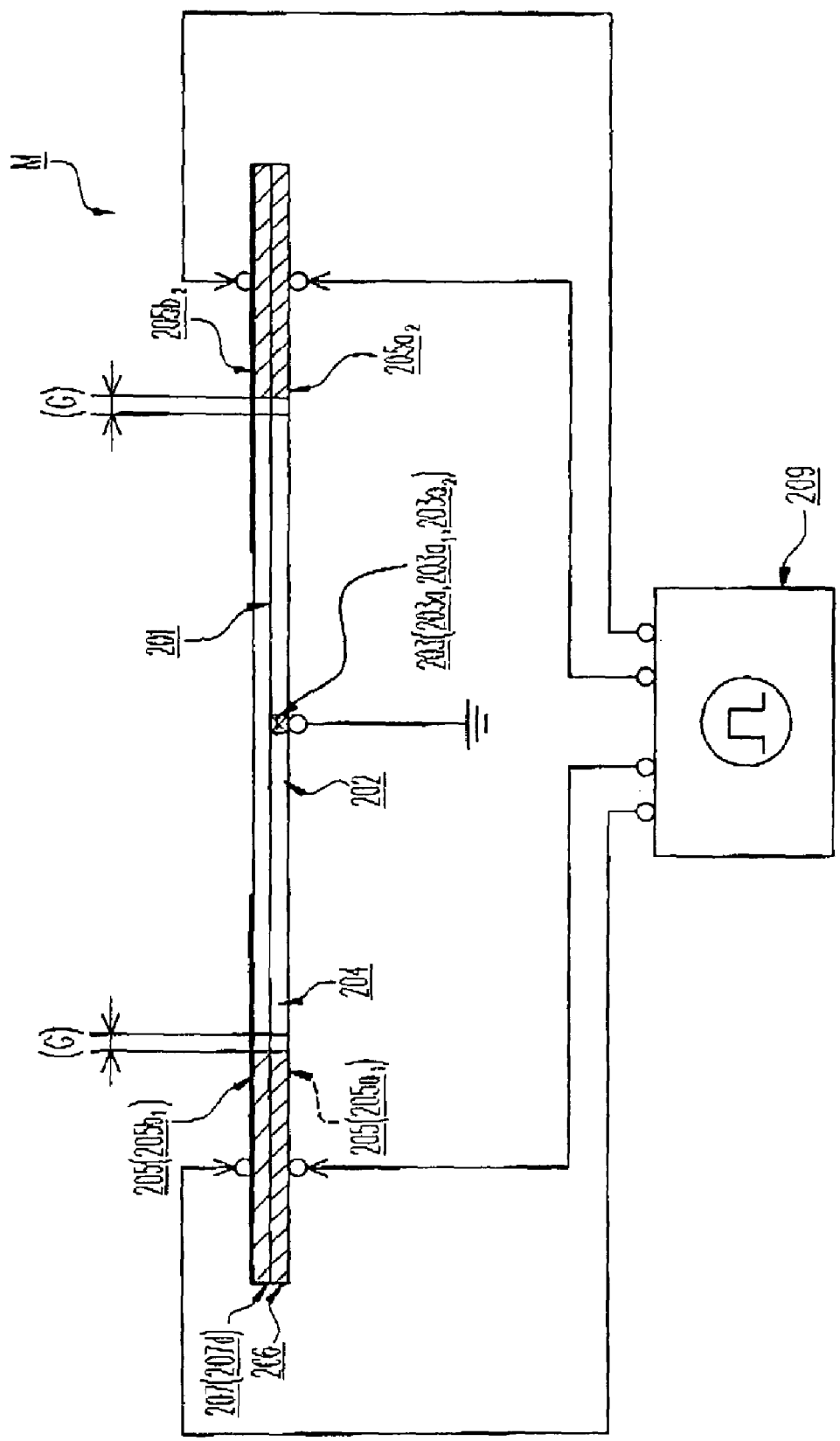
FIG. 20 is a diagram showing other main parts of the optical scanning device according to another embodiment of the present invention.
Figure 21:
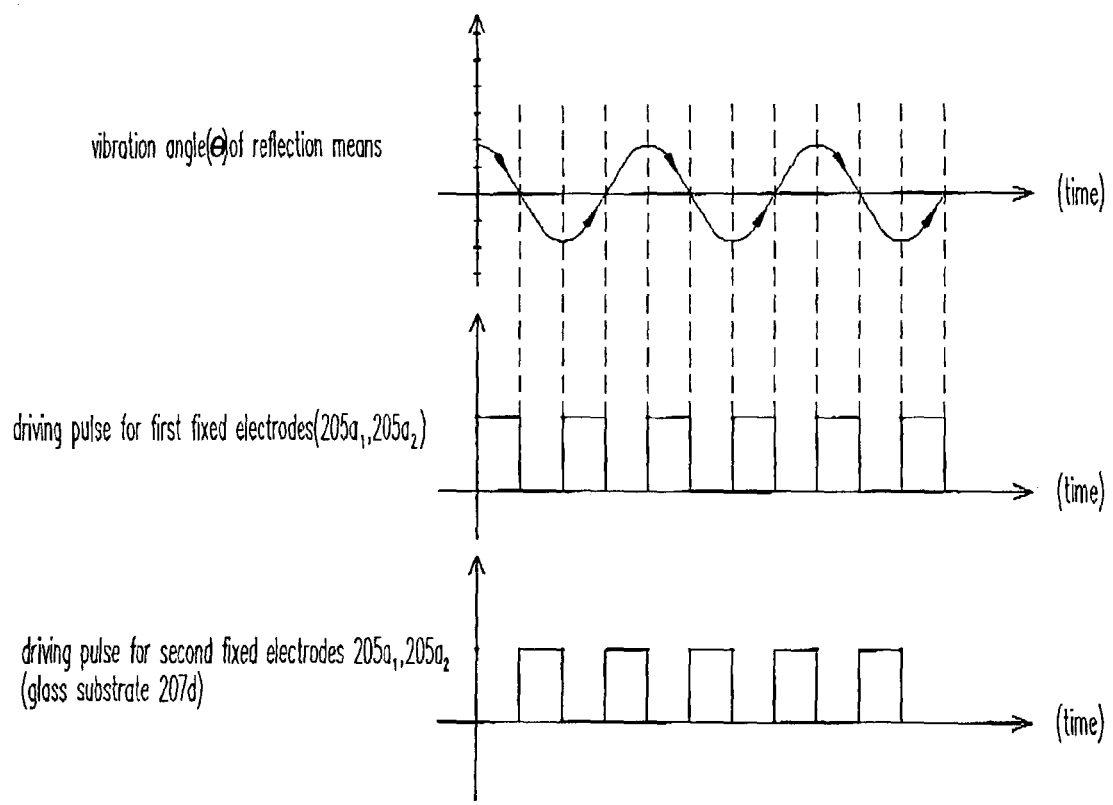
FIG. 21 is a graph showing characteristics of a driving pulse of first fixed electrodes, a driving pulse of second fixed electrodes and a vibration angle of a reflection means to explain other main parts of the optical scanning device according to another embodiment of the present invention.
Figure 22:
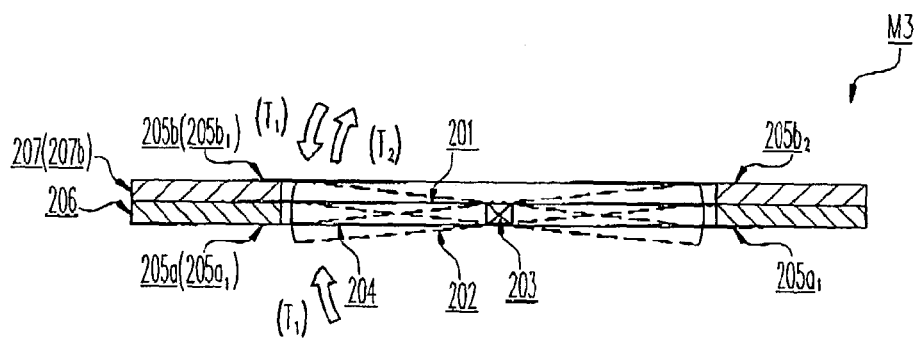
FIG. 22 is a diagram to explain operations of other main parts of the optical scanning device according to another embodiment of the present invention.

FIG. 18 is a front view showing a structure of main parts of a vibration mirror according to yet another embodiment of the present invention. FIG. 19 is an exploded and perspective view of FIG. 18. FIG. 20 is a cross-sectional view of the front view in FIG. 18. FIG. 21 shows graphs showing characteristics of a vibrational angle (θ) of a reflection means and driving pulses for each of first and second fixed electrodes. FIG. 22 is a diagram to explain the operation of main parts of the movable mirror. In FIGS. 18 to 22, the vibration mirror M3, which is used to perform an optical scanning by using the electrostatic force to rotate the rotation shaft to change the reflection direction of an incident light, comprises a reflection mirror 201 for reflecting an incident light; a mirror substrate 202 used as a reflection means holding substrate where the reflection mirror 201 is formed with a film thereon; a torsional rotation shaft 203 composed of rods 203a capable of rotably supporting two ends of the mirror substrate 202; movable electrodes 204 that are respectively formed on two side faces of the mirror substrate 202 supported by the rods 203a; a first substrate 206 that supports the movable electrodes 204, which are opposite to the first fixed electrodes 205a, through the rods 203a; a separating split 206a1 for electrically insulating and separating the first fixed electrodes 205a and the movable electrodes 204 of the first substrate 206; a glass substrate 207b, which is made of Pyrex (registered trademark), etc. and used as the second substrate 207, to be electrically insulated and overlapped to adhere to the first substrate 206; and second fixed electrodes 205b that are respectively opposite to the movable electrodes 204 and are formed on the glass substrate 207d.

The separating splits 206a1 formed by etching are disposed on the silicon substrate 206, and thus the mirror substrate 202 and first fixed electrodes 205a1, 205a2 are formed. Furthermore, separating parts 207a1, which are used as a second electrically isolating separating means 207a, is formed by the etching process on the glass substrate 207d (as the second substrate 207), and thus the second fixed electrodes 205b1, 205b2 are formed by conductive thin films. Namely, the conductive thin films are respectively formed on an upper face and inner circumferential faces (opposite to the movable electrodes 204), but separated into two by the separating parts 207a1. In this way, minute gaps G are formed between the first fixed electrodes 205a1, 205a2, and the movable electrodes 204 that are formed on the side faces of the mirror substrate 202 where the reflection mirror 201 is formed with film thereon. Similarly, minute gaps G are also formed between the second fixed electrodes 205b1, 205b2, and the movable electrodes 204 that are formed on the side faces of the mirror substrate 202. The silicon substrate 206 is etched so that the rod members 203a1, 203a2 (rods 203a), which are twist springs, are formed on the two side faces of the mirror substrate 202. The silicon substrate 206 and the glass substrate 207d as the second substrate 207 are positioned, and then the silicon substrate 206 and the glass substrate 207d (as the second substrate 207) are adhered by a manufacturing method of such as an anode adhesion process.

Referring to FIG. 20, in the vibration mirror M3, the movable electrodes 204, which are formed on the side faces of the mirror substrate 202 where the reflection mirror 201 is formed with film thereon, are grounded. Regarding the fixed electrodes 205, the first fixed electrodes 205a1, 205a2 formed on the silicon substrate 206 and the second fixed electrodes 205b1, 205b2 formed by the thin conductive films on the glass substrate 207d are connected to a driving voltage applying means 209. By applying a driving voltage from the driving voltage applying means 209, the optical scanning is thus performed by rotating the rotation shaft 203 with an electrostatic force to change the reflection direction of an incident light. As shown in FIG. 21, according to a displacement angle (time) of the mirror substrate 202 where the reflection mirror 201 is formed with film thereon, the first fixed electrodes 205a1, 205a2 and the second fixed electrodes 205b1, 205b2 formed by the thin conductive films are connected to the driving voltage applying means 209 to switch a driving pulse, so as to drive the vibration mirror M3. Therefore, as shown in FIG. 11, in comparison with the conventional vibration mirror 900 in FIG. 54, the electrostatic driving torque (torque between the movable electrodes 204 and the fixed electrodes 205) acting against the mirror substrate 202 can operate the mirror substrate 202 within a wide displacement angle range. Therefore, according to the equation for the vibration angle (θ) of the mirror substrate 202: θ=(Tq/I)·K, because the displacement angle to operate the electrostatic driving torque Tq increases, the vibration angle θ increases. As shown in FIG. 17, because the driving pulse is switched by the driving voltage applying means 209, the electrostatic driving torque T1 and the electrostatic driving torque T2 shown in arrow directions act. However, there is only one electrostatic driving torque T1 acted in the arrow direction for the conventional vibration mirror 900 (referring to FIG. 54). Therefore, a vibration mirror M3, whose structure is simpler, vibration angle for performing the optical scanning is larger, driving voltage is lower and cost is lower, can be provided.

Figure 23:
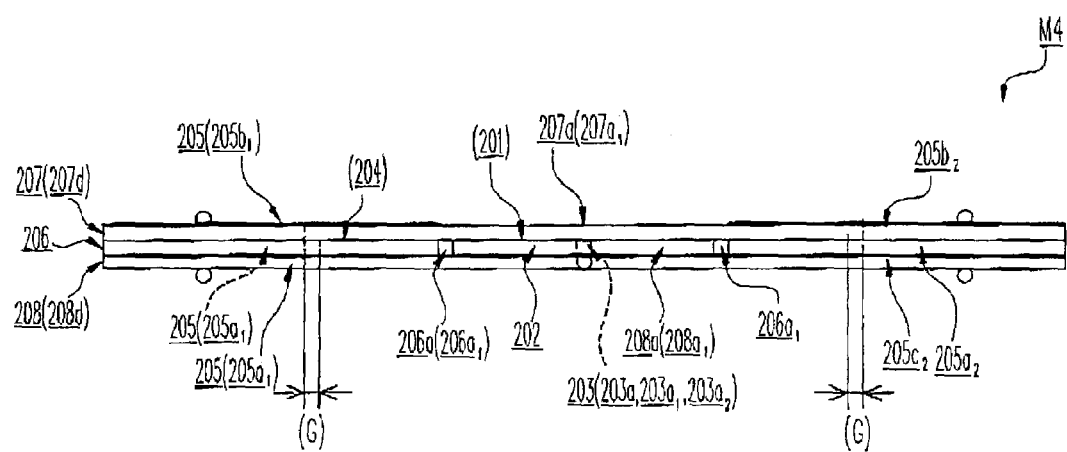
FIG. 23 is a diagram showing an optical scanning device according to another embodiment of the present invention.
Figure 24:
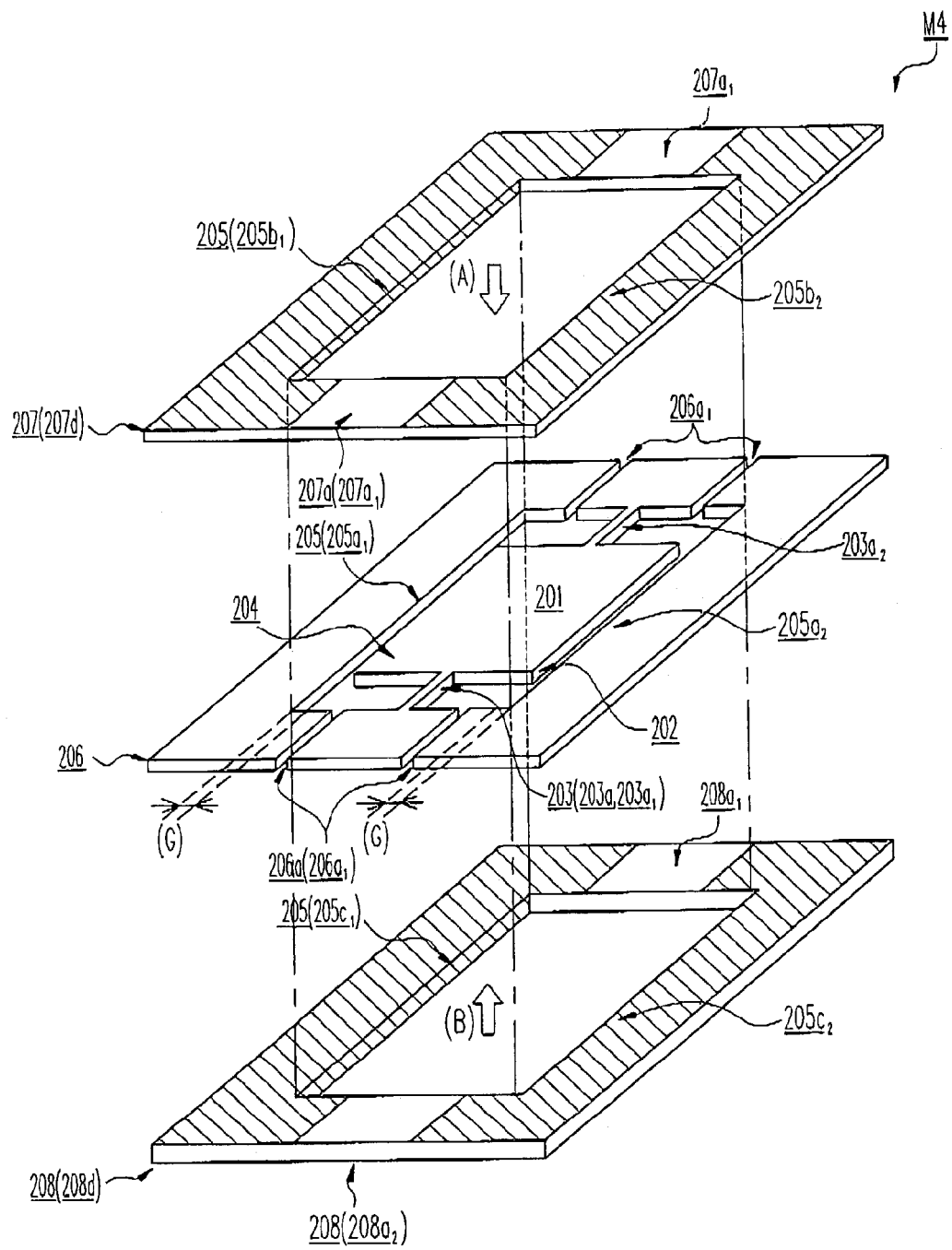
FIG. 24 is an exploded diagram showing main parts of the optical scanning device according to another embodiment of the present invention.
Figure 25:
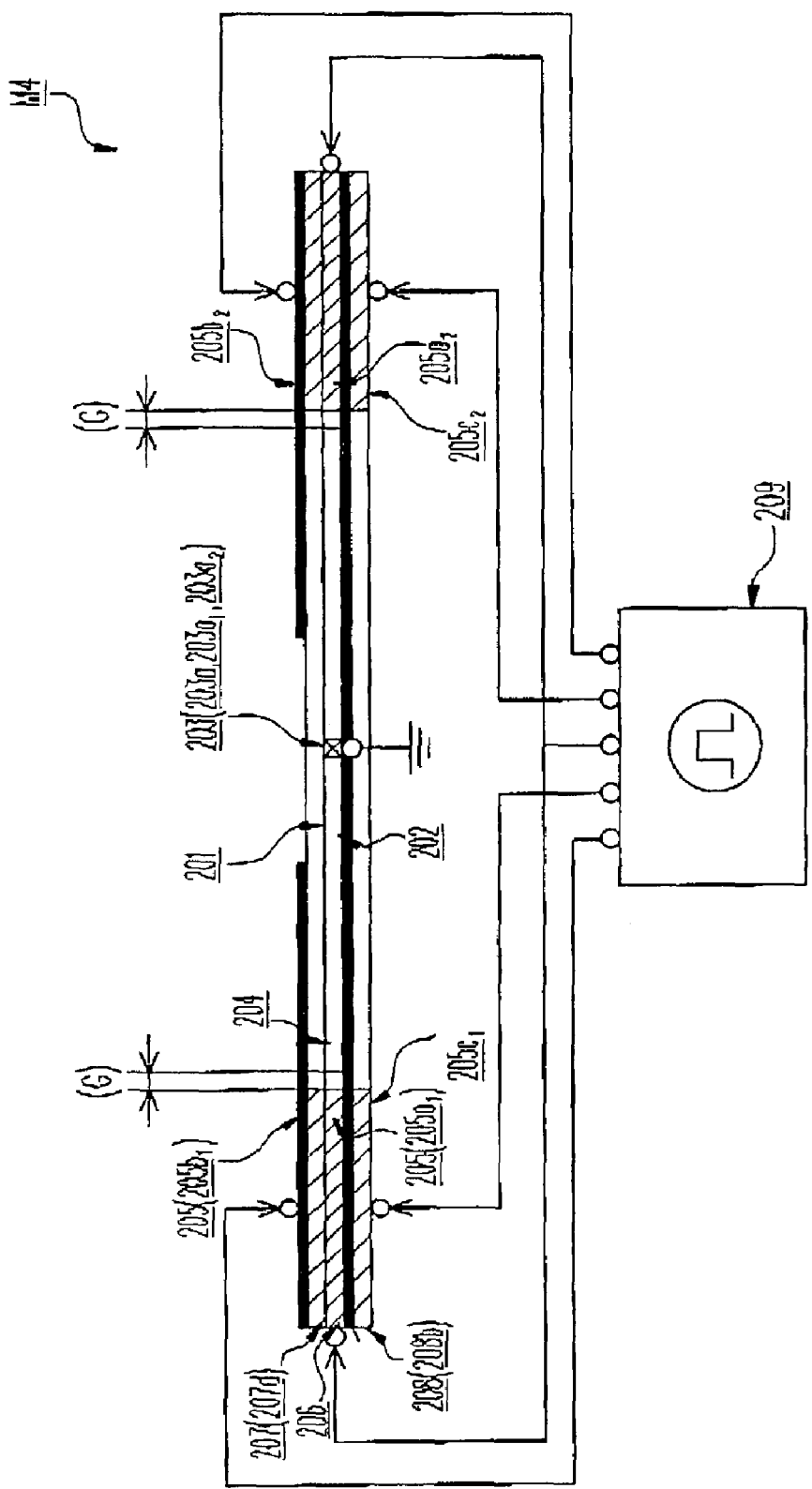
FIG. 25 is a diagram showing other main parts of the optical scanning device according to another embodiment of the present invention.
Figure 26:
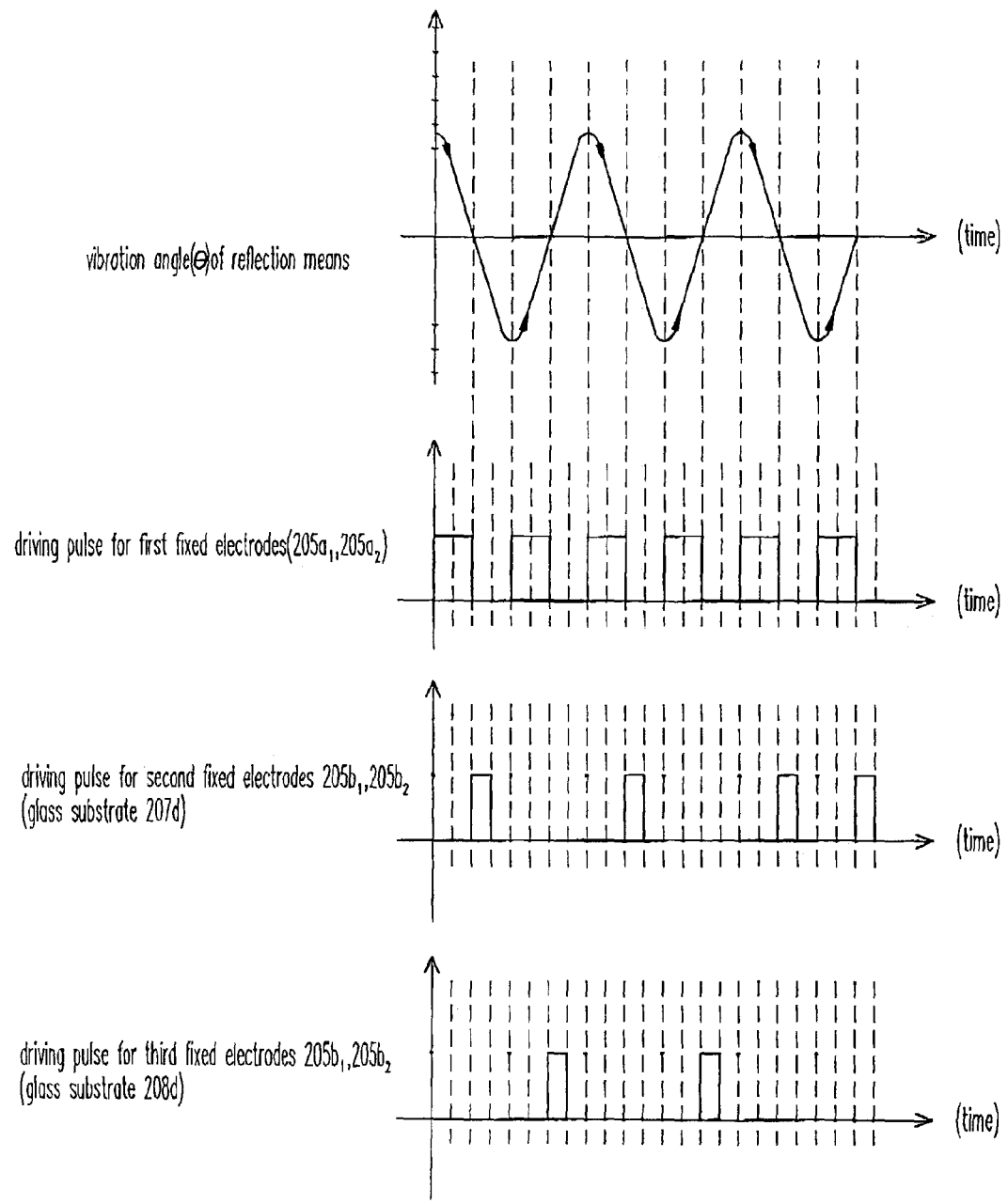
FIG. 26 is a graph showing characteristics of a driving pulse of first fixed electrodes, a driving pulse of second fixed electrodes and a vibration angle of a reflection means to explain other main parts of the optical scanning device according to another embodiment of the present invention.
Figure 27:
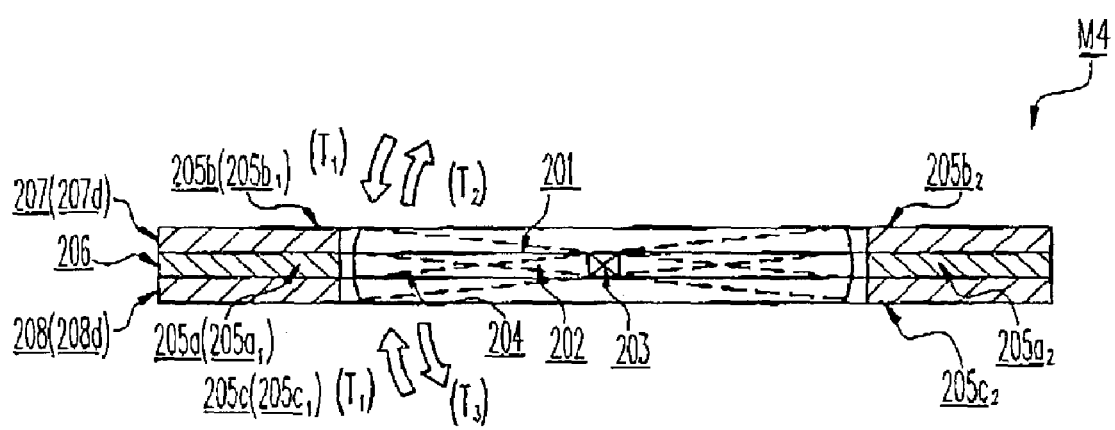
FIG. 27 is a diagram to explain operations of other main parts of the optical scanning device according to another embodiment of the present invention.

FIG. 23 is a front view showing a structure of main parts of a vibration mirror according to yet another embodiment of the present invention. FIG. 24 is an exploded and perspective view of FIG. 23. FIG. 25 is a cross-sectional view of the front view in FIG. 23. FIG. 26 shows graphs showing characteristics of a vibrational angle (θ) of a reflection means and driving pulses for each of first, second and third fixed electrodes. FIG. 27 is a diagram to explain the operation of main parts of the movable mirror. In FIGS. 23 to 27, the vibration mirror M4, which is used to perform an optical scanning by using the electrostatic force to rotate the rotation shaft to change the reflection direction of an incident light, comprises a reflection mirror 1 for reflecting an incident light; a mirror substrate 202 used as a reflection means holding substrate where the reflection mirror 201 is formed with a film thereon; a torsional rotation shaft 203 composed of rods 203a capable of rotably supporting two ends of the mirror substrate 202; movable electrodes 204 that are respectively formed on two side faces of the mirror substrate 202 supported by the rods 203a; a first substrate 206 that supports the movable electrodes 204, which are opposite to the first fixed electrodes 205a, through the rods 203a; a separating split 206a1 for electrically insulating and separating the first fixed electrodes 205a and the movable electrodes 204 of the first substrate 206; a glass substrate 207d used as the second substrate 207 that is electrically insulated and overlapped to adhere to the first substrate 206; second fixed electrodes 205b that are respectively opposite to the movable electrodes 204 and are formed on the glass substrate 207d; a glass substrate 208d, which is used as a third substrate 208 and made of glass such as Pyrex (trademark register), that is electrically insulated and overlapped to adhere to the first substrate 206; and third fixed electrodes 205c that are respectively opposite to the movable electrodes 4 and are formed on the glass substrate 8d.

The separating splits 206a1 formed by etching are disposed on the silicon substrate 206, and thus the mirror substrate 202 and first fixed electrodes 205a1, 205a2 are formed. Furthermore, separating parts 207a1 (non-conductive parts), which are used as a second electrically isolating separating means 207a, is formed by the etching process on the glass substrate 207d1, and thus the second fixed electrodes 205b, 205b2 are formed by conductive thin films. Similarly, separating parts 208a1 (non-conductive parts), which are used as a third electrically isolating separating means 208a, is formed by the etching process on the glass substrate 208d, and thus the second fixed electrodes 205c1, 205c2 are formed by conductive thin films. In this way, minute gaps G are formed between the first fixed electrodes 205a1, 20a2, and the movable electrodes 204 that are formed on the side faces of the mirror substrate 202 where the reflection mirror 201 is formed with film thereon. Similarly, minute gaps G are also formed between the second fixed electrodes 205b1, 205b2 formed by the conductive thin films, and the movable electrodes 204 that are formed on the side faces of the mirror substrate 202. Similarly, minute gaps G are also formed between the third fixed electrodes 205c1, 205c2 formed by the conductive thin films, and the movable electrodes 204 that are formed on the side faces of the mirror substrate 202.

The silicon substrate, used as the first substrate 206, is etched so that the rod members 203a1, 203a2 (rods 203a), which are twist springs, are formed on the two side faces of the mirror substrate 202.

Referring to FIG. 25, in the vibration mirror M4, the movable electrodes 204, which are formed on the side faces of the mirror substrate 202 where the reflection mirror 201 is formed with film thereon, are grounded. Regarding the fixed electrodes 205, the first fixed electrodes 205a1, 205a2 formed on the silicon substrate 206, the second fixed electrodes 205b1, 205b2 formed by the thin conductive films on the glass substrate 207d, and the third fixed electrodes 205c1, 205c2 formed by the thin conductive films on the glass substrate 208d are connected to a driving voltage applying means 209. By applying a driving voltage from the driving voltage applying means 209, the optical scanning is thus performed by rotating the rotation shaft 203 with an electrostatic force to change the reflection direction of an incident light. As shown in FIG. 21, according to a displacement angle (time) of the mirror substrate 202 where the reflection mirror 201 is formed with film thereon, the first fixed electrodes 205a1, 205a2, the second fixed electrodes 205b1, 205b2 and the third fixed electrodes 205c1, 205c2 are connected to the driving voltage applying means 209 to switch a driving pulse, so as to drive the vibration mirror M3. Therefore, as shown in FIG. 11, in comparison with the conventional vibration mirror 900 in FIG. 54, the electrostatic driving torque (torque between the movable electrodes 204 and the fixed electrodes 205) acting against the mirror substrate 202 can operate the mirror substrate 202 within a wide displacement angle range. Therefore, according to the equation for the vibration angle (θ) of the mirror substrate 202: θ=(Tq/I)·K, because the displacement angle to operate the electrostatic driving torque Tq increases, the vibration angle θ increases. As shown in FIG. 27, because the driving pulse is switched by the driving voltage applying means 209, the electrostatic driving torque T1, the electrostatic driving torque T2, and the electrostatic driving torque T3 shown in arrow directions act.

Figure 28:
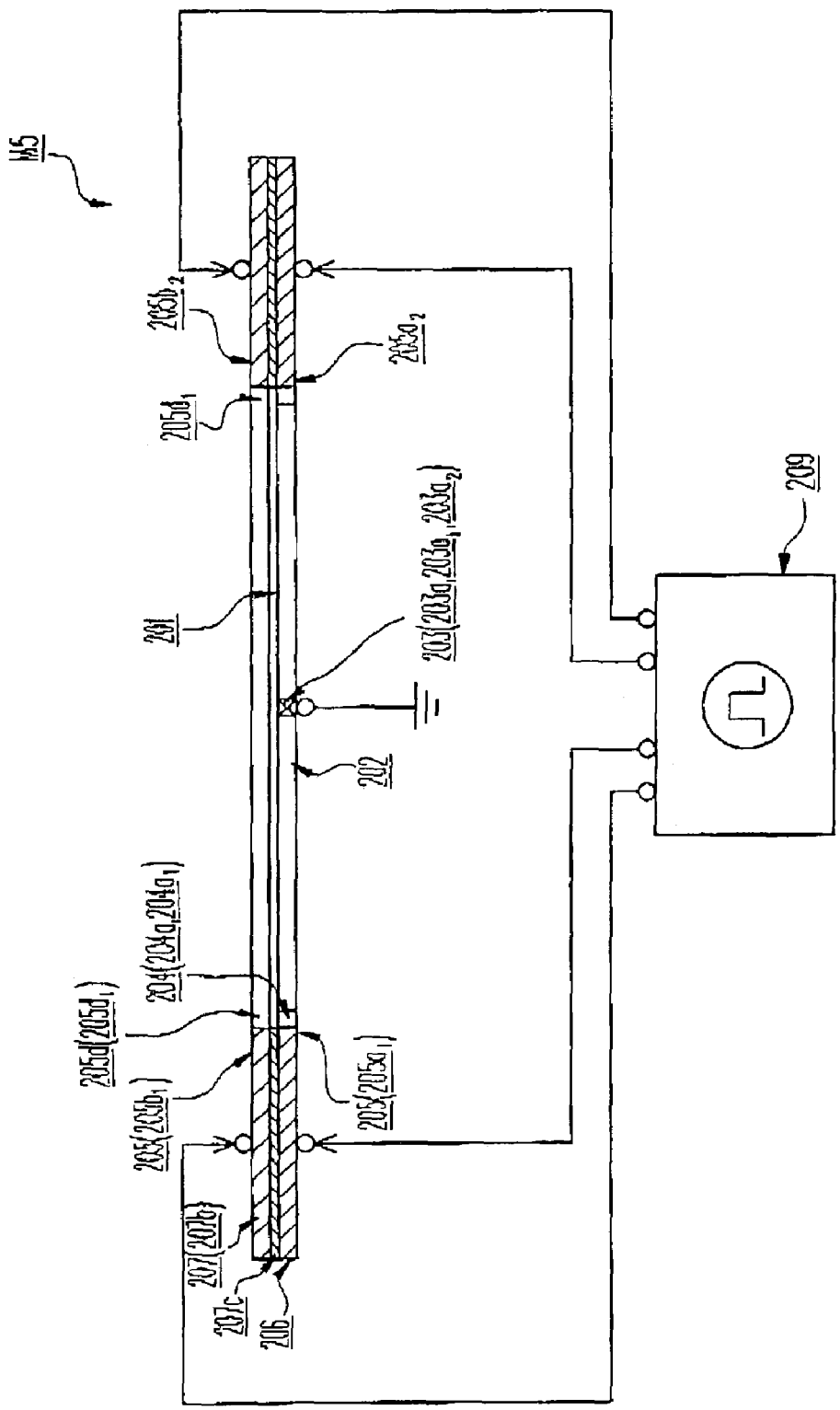
FIG. 28 is a diagram showing an optical scanning device according to another embodiment of the present invention.
Figure 29:
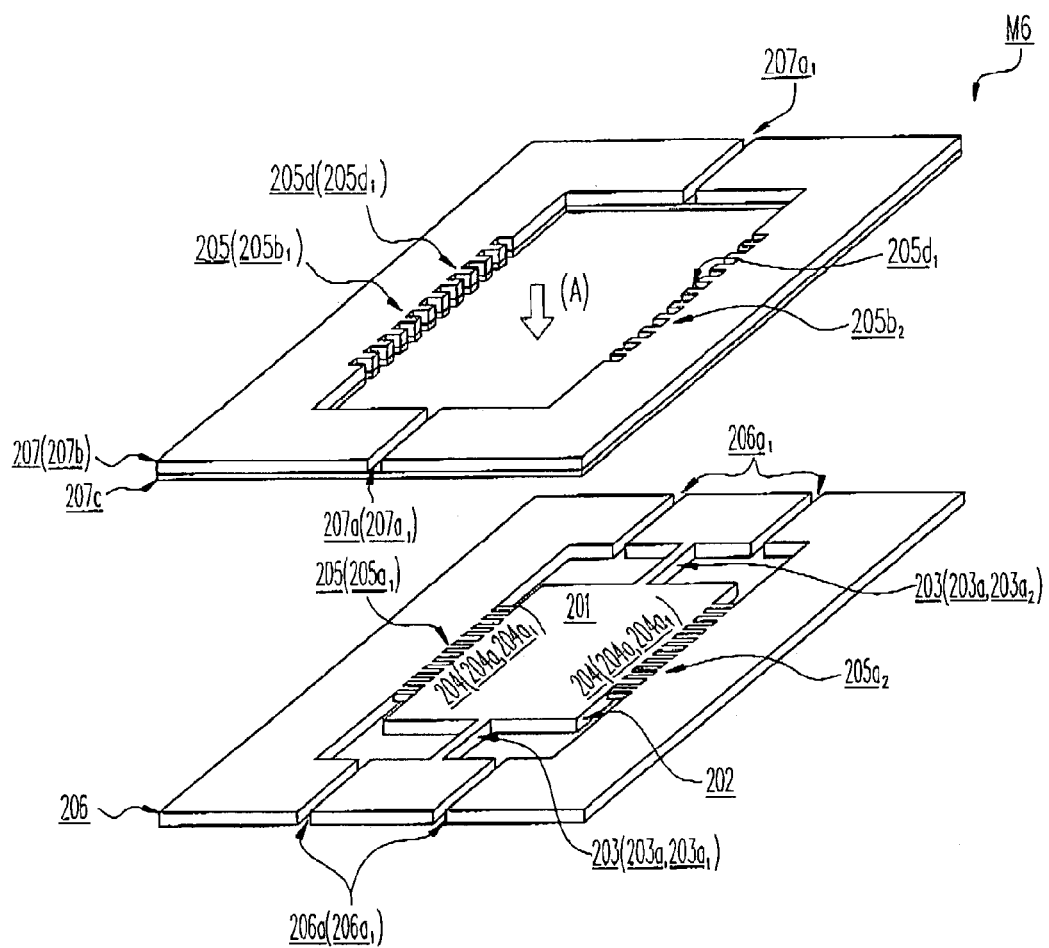
FIG. 29 is an exploded diagram showing main parts of the optical scanning device according to another embodiment of the present invention.

FIG. 28 and FIG. 29 are a front cross-sectional view and an exploded and perspective view according to yet another embodiment of the present invention. A vibration mirror M, which is used to perform an optical scanning by using the electrostatic force to rotate the rotation shaft to change the reflection direction of an incident light, comprises a reflection mirror 201 for reflecting an incident light; a mirror substrate 202 used as a reflection means holding substrate where the reflection mirror 201 is formed with a film thereon; a torsional rotation shaft 203 composed of rods 203a capable of rotably supporting two ends of the mirror substrate 202; movable electrodes 204 that are respectively formed on two side faces of the mirror substrate 202 supported by the rods 203a; a first substrate 206 that supports the movable electrodes 204, which are opposite to the first fixed electrodes 205a, through the rods 203a; a separating split 206a1 for electrically insulating and separating the first fixed electrodes 205*a* and the movable electrodes 204 of the first substrate 206; a silicon substrate 207*b* that is electrically insulated and overlapped to adhere to the first substrate 206 through an insulating layer 207*c*; second fixed electrodes 205*b* that are respectively opposite to the movable electrodes 204 and are formed on the glass substrate 207*d*; comb-shaped opposite faces 204*a*1 on a movable electrode opposite face 204*a* of the movable electrodes 204, which are formed with a comb shape on the movable electrodes 204 at the side faces of the mirror substrate 202 supported by the rod members 203*a*1, 203*a*2 (the rods 203*a*); first fixed electrodes 205*a*1, 205*a*2 (205*a*), which adhere the first substrate 206 and the second substrate 207 overlaid on the first substrate 206, and are arranged such that convex portions of the movable electrodes face concave portions of the at least one of the first and the second fixed electrodes; and concave portions of the movable electrodes faces convex portions of the at least one of the first and the second fixed electrodes. Therefore, the facing area can be increased, the vibration angle for performing the optical scanning can be further increased, and the driving voltage can be further decreased.

The silicon substrate 206 is etched, so that the rod members 203*a*1, 203*a*2 are formed on the two side faces of the mirror substrate 202 that supports the mirror of the reflection means 201. Referring to FIG. 29, after the layered second substrate 207 is positioned from the arrow direction A to be directly adhered, or anode adhered onto the first substrate 206, the first fixed electrodes 205*a*1, 205*a*2 made of conductive thin film formed on an insulating film (for example, a SiO$_2$ film) 207*c* that is formed to secure an insulating status, and the comb-shaped opposite faces 205*d*1 of the fixed electrode opposite face 205*d*, which are formed with a comb shape on the second fixed electrodes 205*b*1, 205*b*2 (as the second fixed electrode 205*b*), are formed to be arranged such that convex portions of the movable electrodes face concave portions of the second fixed electrodes, and concave portions of the movable electrodes face convex portions of the at least one of the second fixed electrodes. The comb-shaped opposite faces 204*a*1, the first fixed electrodes 205*a*1, 205*a*2, the second fixed electrodes 205*b*1, 205*b*2 and the comb-shaped opposite faces 205*d*1 are connected to the driving voltage applying means 209. By applying a driving voltage from the driving voltage applying means 209, the optical scanning is thus performed by rotating the rotation shaft 203 with an electrostatic force to change the reflection direction of an incident light. In the vibration mirror M6, the vibration angle (θ) is expressed by θ=(Tq/I)·K, wherein Tq represents an electrostatic driving torque that acts against the reflection means holding substrate 202 where the reflection mirror 201 is formed thereon, I is an inertial moment of the reflection means holding substrate 202 where the reflection mirror 201, and K is a constant to determine a resonant frequency.

The electrostatic torque Tq is expressed by Tq∝S·(V/g)$^2$. In the above expression, S is an alternatively opposite face between the comb-shaped opposite faces 204*a*1 on the movable electrodes 204, and the first fixed electrodes 205*a*, 205*a*2, the second fixed electrodes 205*b*1, 205*b*2 and the comb-shaped opposite faces 205*d*1. V is an applied voltage from the driving voltage applying means 209. g is an inter-electrode distance between the comb-shaped opposite faces 204*a*1 on the movable electrodes 204, and the first fixed electrodes 205*a*1, 205*a*2, the second fixed electrodes 205*b*1, 205*b*2 and the comb-shaped opposite faces 204*d*1. In order to adhere the second substrate 207 onto the first substrate 206 of the vibration mirror M6, the opposite face areas (S) of the first fixed electrodes 205*a*1, 205*a*2, the second fixed electrodes 205*b*1, 205*b*2 and the comb-shaped opposite faces 205*d*1 that are alternatively opposite to the comb-shaped opposite faces 204*a*1 on the movable electrodes 204 can be more larger. Therefore, in the express, the opposite face area S gets more larger, the electrode gape g, which is between the comb-shaped opposite faces 204*a*1 on the movable electrodes 4 and the first fixed electrodes 205*a*1, 205*a*2, and the comb-shaped opposite faces 205*d*1 of the fixed electrode concaveconvex-shaped opposite face 5*d* on the second fixed electrodes 205*b*1, 205*b*2, can become more smaller, and the electrostatic torque Tq can be more larger. Therefore, a vibration mirror M3, whose structure is simpler, vibration angle for performing the optical scanning is larger, driving voltage is lower and cost is lower, can be provided.

Figure 30:
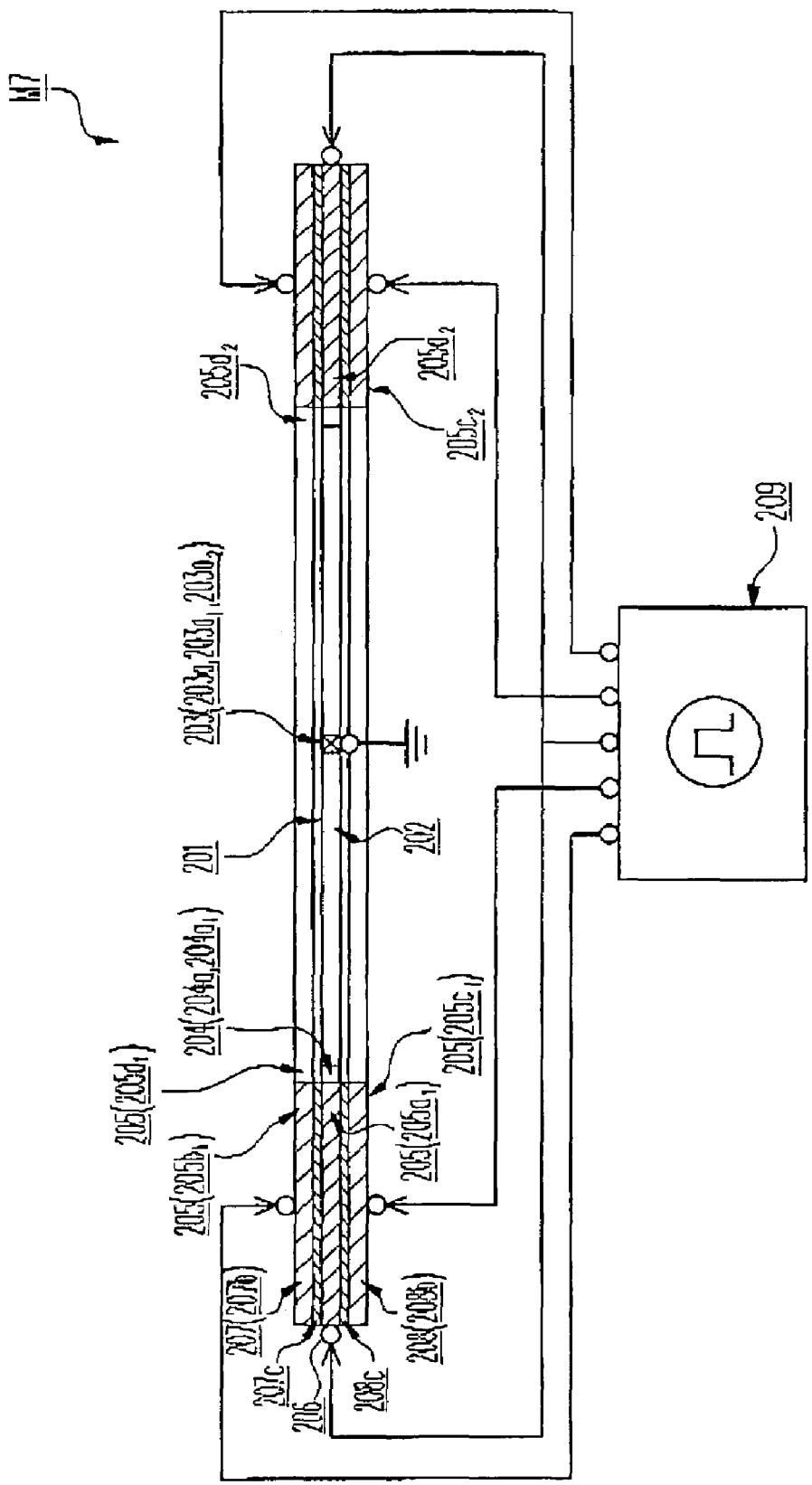
FIG. 30 is a diagram showing an optical scanning device according to another embodiment of the present invention.
Figure 31:
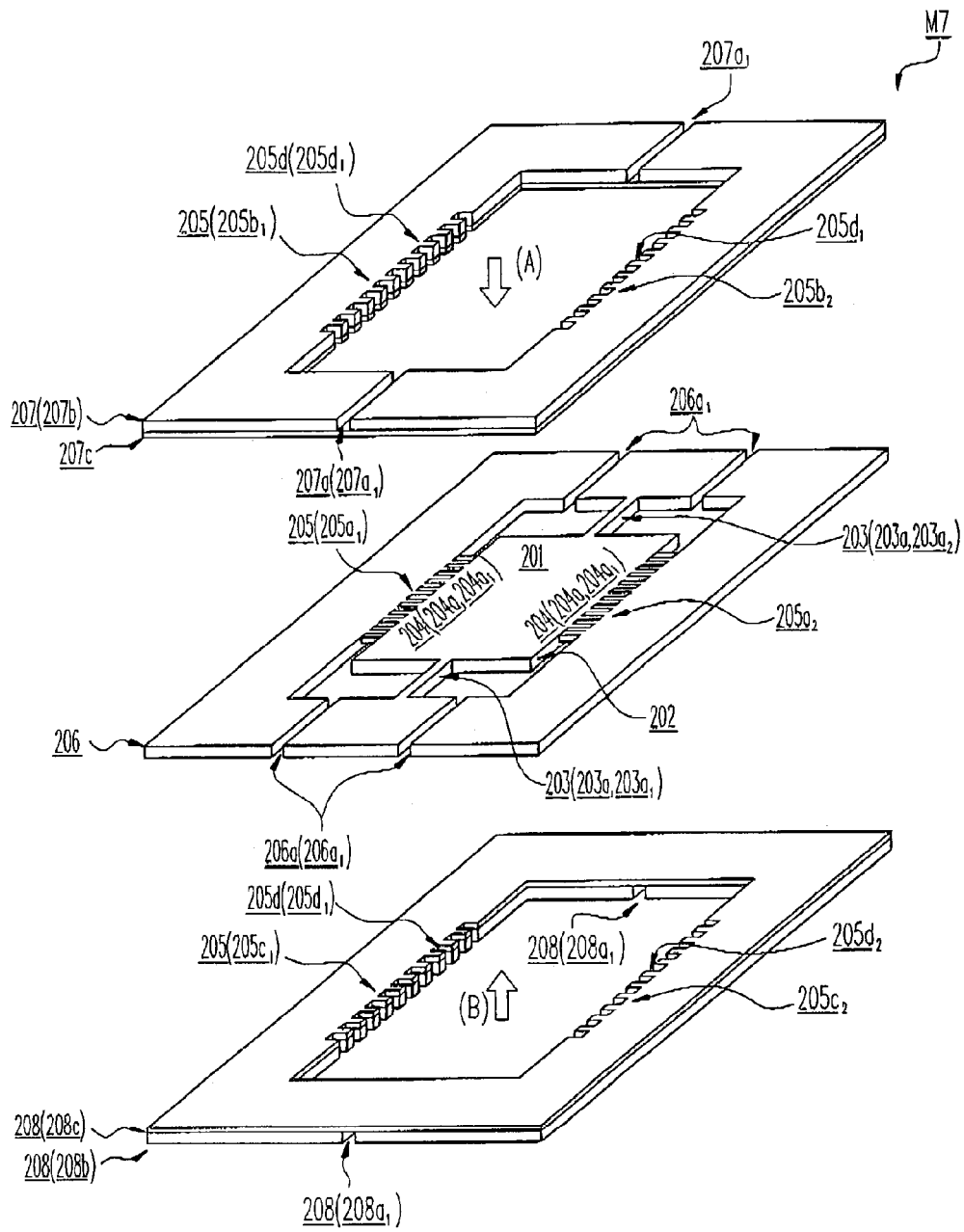
FIG. 31 is an exploded diagram showing main parts of the optical scanning device according to another embodiment of the present invention.

FIG. 30 and FIG. 31 are a front cross-sectional view and an exploded and perspective view according to of a vibration mirror of another embodiment of the present invention. A vibration mirror M7, which is used to perform an optical scanning by using the electrostatic force to rotate the rotation shaft to change the reflection direction of an incident light, comprises a reflection mirror 201 for reflecting an incident light; a mirror substrate 202 used as a reflection means holding substrate where the reflection mirror 201 is formed with a film thereon; a torsional rotation shaft 203 composed of rods 203*a* capable of rotably supporting two ends of the mirror substrate 202; movable electrodes 204 that are respectively formed on two side faces of the mirror substrate 202 supported by the rods 203*a*; a first substrate 206 that supports the movable electrodes 204, which are opposite to the first fixed electrodes 205*a*1, through the rods 203*a*; a separating split 206*a*1 for electrically insulating and separating the first fixed electrodes 205*a* and the movable electrodes 204 of the first substrate 206; a silicon substrate 207*b* that is electrically insulated and overlapped to adhere to an upper side of the first substrate 206; a substrate 208*b*, used as a third substrate 208, that is electrically insulated and overlapped to adhere to an lower side of the first substrate 206; second fixed electrodes 205*b* that are respectively opposite to the movable electrodes 204 and are formed on the glass substrate 207*d*; comb-shaped opposite faces 204*a*1 on a movable electrode opposite face 204*a* of the movable electrodes 204, which are formed with a comb shape on the movable electrodes 204 at the side faces of the mirror substrate 202 supported by the rod members 203*a*1, 203*a*2 (the rods 203*a*); first fixed electrodes 205*a*1, 205*a*2 (205*a*), which adhere the first substrate 206 and the second substrate 207 overlapped with the first substrate 206, and are alternatively opposite to the comb-shaped opposite faces 204*a*1 of the movable electrodes 204 having a comb shape; comb-shaped opposite faces 205*d*1 (as a fixed electrode opposite face 205*d*) on the second fixed electrodes 205*b*1, 205*b*2 and the third fixed electrodes 205*c*1, 205*c*2.

The silicon substrate 206 is etched, so that the rod members 203*a*1, 203*a*2 are formed on the two side faces of the mirror substrate 202. Referring to FIG. 30, after the layered second substrate 207 and the layered third substrate 208 are respectively positioned from the directions A and B to be directly adhered, or anode adhered onto the first substrate 6, the first fixed electrodes 205*a*1, 205*a*2 made of conductive thin film formed on an insulating film (for example, a SiO$_2$ film) 207*c* that is formed to secure an insulating status, and the comb-shaped opposite faces 205*d*1 of the fixed electrode opposite face 205*d*, which are formed with a comb shape on the second fixed electrodes 205*b*1, 205*b*2 (as the second fixed electrode 205*b*), are formed to be alternatively opposite to the comb-shaped opposite faces 204a1 of the movable electrode opposite face 204a (formed with a comb shape) of the movable electrode 204, on the surface of the second substrate 207 and the first substrate 206 both of which are layered and adhered. The comb-shaped opposite faces 204a, the first fixed electrodes 205a1, 205a2, the second fixed electrodes 205b1, 205b2 and the comb-shaped opposite faces 205d1 are connected to the driving voltage applying means 209. By applying a driving voltage from the driving voltage applying means 209, the optical scanning is thus performed by rotating the rotation shaft 203 with an electrostatic force to change the reflection direction of an incident light. In the vibration mirror M7, the vibration angle (θ) is expressed by θ=(Tq/I)·K, wherein Tq represents an electrostatic driving torque that acts against the reflection means holding substrate 202 where the reflection mirror 201 is formed thereon, I is an inertial moment of the reflection means holding substrate 202 where the reflection mirror 201, and K is a constant to determine a resonant frequency.

Figure 32:
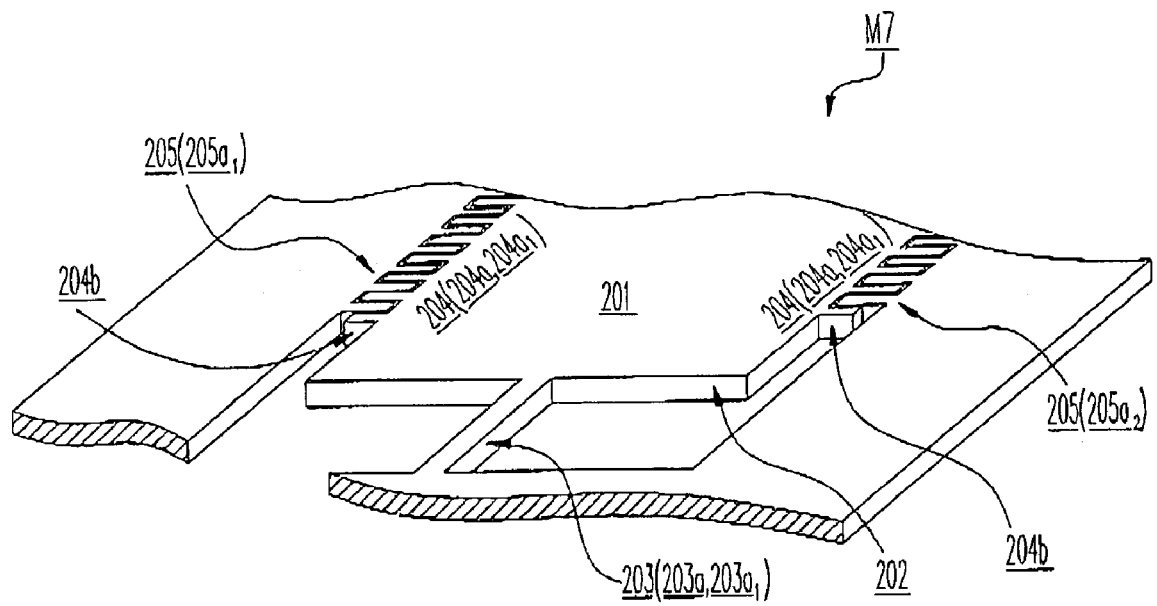
FIG. 32 is a perspective view to explain main parts of the optical scanning device according to another embodiment of the present invention.

The electrostatic torque Tq is expressed by $Tq \propto S \cdot (V/g)^2$. In the above expression, S is an alternatively opposite face between the comb-shaped opposite faces 204a1 on the movable electrodes 204, and the first fixed electrodes 205a1, 205a2, the second fixed electrodes 205b1, 205b2, the third fixed electrodes 205c1, 205c2 and the comb-shaped opposite faces 205d1. V is an applying voltage from the driving voltage applying means 209. g is an inter-electrode distance between the comb-shaped opposite faces 204a1 on the movable electrodes 204, and the first fixed electrodes 205a1, 205a2, the second fixed electrodes 205b1, 205b2 and the comb-shaped opposite faces 204d1. In order to adhere the second substrate 207 and the third substrate 208 onto the first substrate 206 of the vibration mirror M7, the opposite face areas (S) of the first fixed electrodes 205a1, 205a2, the second fixed electrodes 205b1, 205b2, the third fixed electrodes 205c1, 205c2 and the comb-shaped opposite faces 205d1 that are alternatively opposite to the comb-shaped opposite faces 204a1 on the movable electrodes 204 can be more larger. Therefore, in the express, the opposite face area S gets more larger, the electrode gape g, which is between the comb-shaped opposite faces 204a1, the first fixed electrodes 205a1, 205a2, the second fixed electrodes 205b1, 205b2, the third fixed electrodes 205c1, 205c2 and the comb-shaped opposite faces 205d1 can become more smaller, and the electrostatic torque Tq can be more larger. FIG. 32 shows an alternative example of the above vibration mirrors M6, M7. A resonant frequency adjustment plate 204b, which is formed with a comb shape and used for adjusting a resonant frequency, can be formed on each movable electrodes 204.

Figure 33:
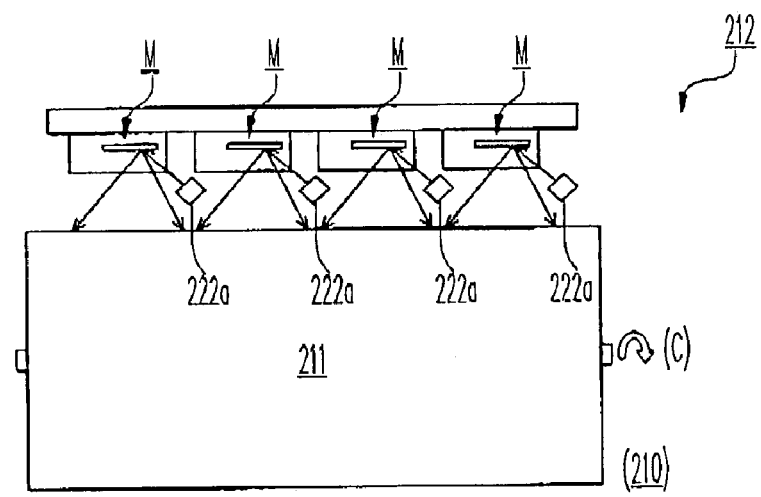
FIG. 33 is a diagram showing main parts of an image forming device with the optical scanning device of another embodiments according to the present invention.
Figure 34:
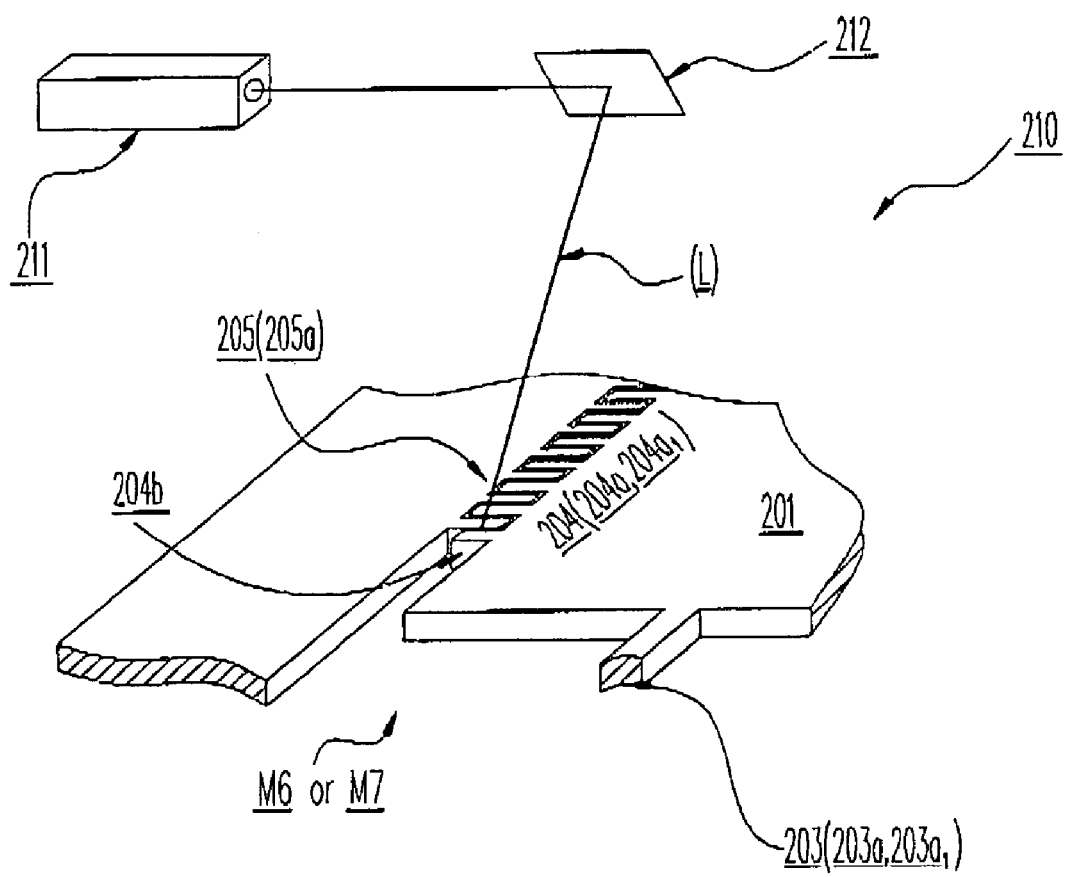
FIG. 34 is a diagram to explain a method to make the optical scanning device of another embodiments according to the present invention.

Referring to FIG. 33, an optical scanning device 222 uses a plurality of vibration mirrors M and these vibration mirrors M are driven by the same driving frequency. The driving frequency uses a resonant frequency f0 of the optical scanning device 222 and the resonant frequency f0 can be expressed by $f0 = \frac{1}{2}\pi(K_\theta/I))^{1/2}$, wherein Kθ is an elastic constant of rod members 203a1, 203a2 of the rods 203a, I is a moment of inertia of the reflection means holding substrate 202 where the reflection mirror 201 is formed thereon. When the vibration mirror M is driven by a frequency deviated from the resonant frequency f0, the vibration angle θ becomes very small. Therefore, it is necessary to adjust plural resonant frequencies f0 to have the same value. In this situation, by cutting the resonant frequency adjustment plate 204b formed on the movable electrode 204, the resonant frequency f0 can be adjusted with a simple structure and method, and therefore, the vibration angle θ can be avoided from becoming small. FIG. 34 shows an example. The resonant frequency adjustment plate 204b for adjusting the resonant frequency, which is a tooth shape and formed together with the movable electrodes 204, is cut by a laser beam L to adjust the resonant frequency f0.

As will be described later, when an image is formed by using a plurality of vibration mirrors M, driving the vibration mirrors M with the same driving frequency is requested. The driving frequency uses the resonant frequency f0 of the vibration mirrors M. The resonant frequency f0 of the vibration mirrors M is expressed by $f0 = \frac{1}{2}\pi \cdot (K_\theta/I))^{1/2}$, wherein $K_\theta$ is an elastic constant of rod members 203a1, 203a2 of t rods 203a1, I is a moment of inertia of the reflection means holding substrate 202 where the reflection mirror 201 is formed thereon. When the vibration mirror M is driven by a frequency deviated from the resonant frequency f0, the vibration angle θ becomes very small. It is necessary to adjust plural resonant frequencies f0 to have the same value. Therefore, by using a resonant frequency adjuster 210, a laser beam from a laser generator 211 is reflected by a reflection mirror 212 to irradiate onto the resonant frequency adjustment plate 204b to cut it with a prescribed amount, so as to adjust the plural resonant frequencies f0 to be the same value.

Figure 35:
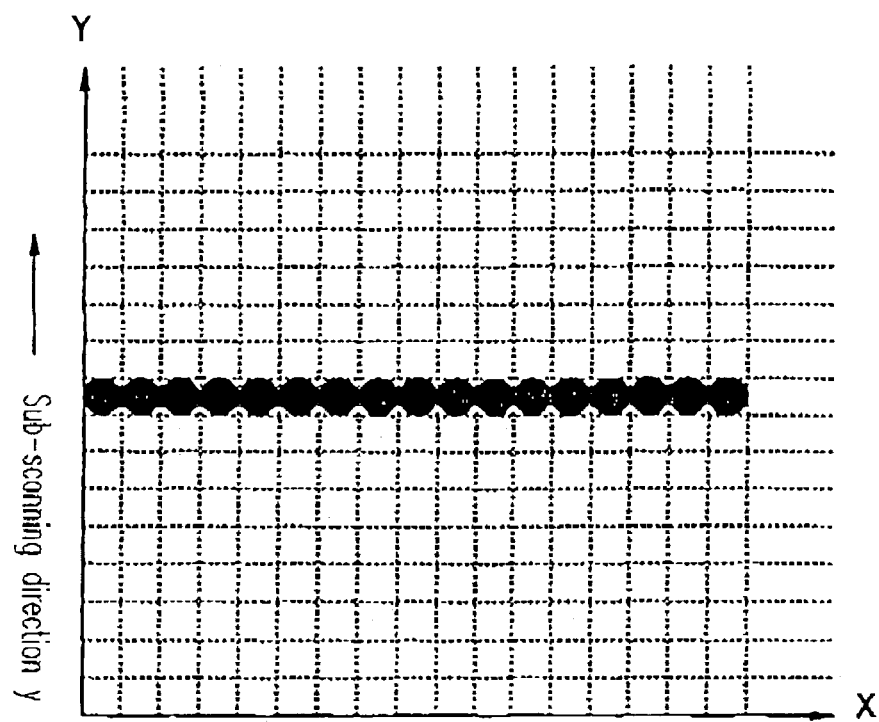
FIG. 35 shows a pattern example of a matrix for dot mapped image data.
Figure 36:
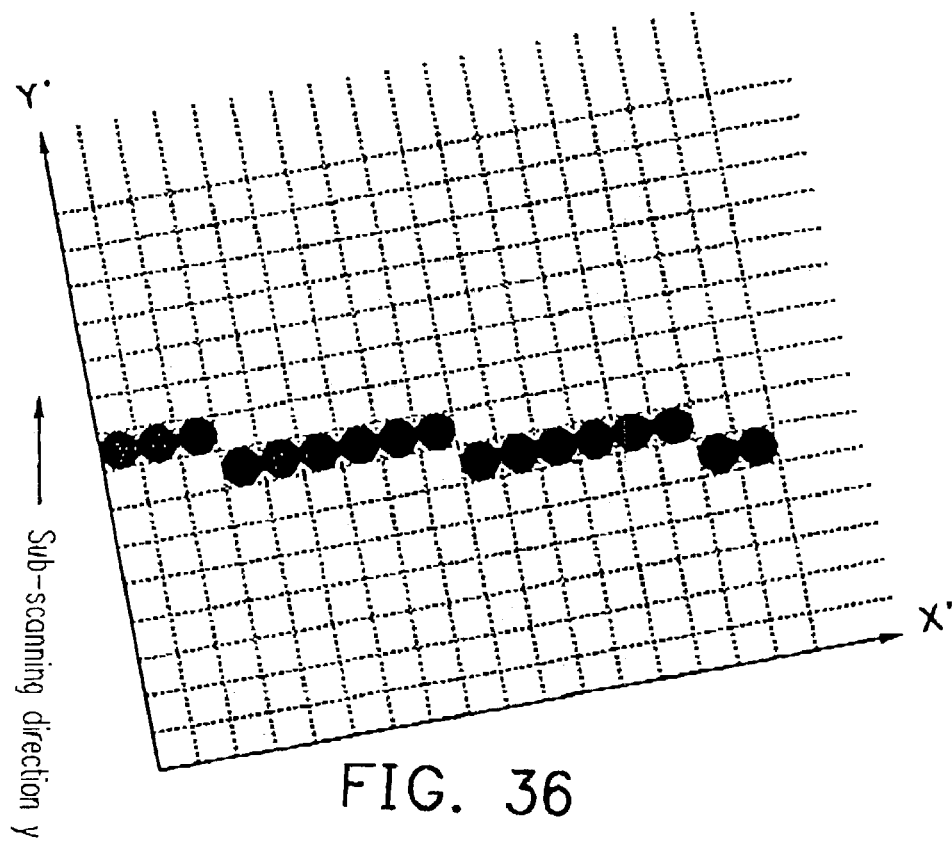
FIG. 36 shows a pattern example of a tilt matrix.

Following embodiment describes a coordinate transformation performed by a scanning control device or a program. By the scanning control device or the program, for example, coordinates of pixels in a matrix capable of forming one line image as shown in FIG. 35 to coordinates of a tilt matrix as shown in FIG. 36. In FIG. 35, a Y-coordinate axis of the matrix is equivalent to a sub-scanning direction y, which is also a surface moving direction of a latent image supporter (not shown). In addition, an X-coordinate axis is equivalent to a direction parallel to a scanned face of the latent image supporter and perpendicular to the sub-scanning direction (simply referring to a direction perpendicular to the sub-scanning direction). As shown in FIG. 35, for conventional image information, x coordinates of pixels is made to correspond to a direction perpendicular to the sub-scanning direction (the Y-axis direction) and then stored. For such image information, the surface of the latent image supporter does not move actually in the sub-scanning direction and only one line region on the surface of the latent image supporter is repeatedly scanned, while a light beam scans in a main scanning direction. In this way, an irradiating pitch of the light beam in the sub-scanning direction (an image pitch in the sub-scanning direction) is completely dependent on a surface moving speed of the latent image supporter. Therefore, as main scanning times per unit time (a scanning frequency) changes due to a driving error of a deflection means (a vibration mirror), an image size error in the sub-scanning direction might occur. In contrast, according to the present invention, a position of each pixel, which is represented by a X-Y coordinate of the matrix in FIG. 35, is transformed to a X'-Y' coordinate of the tilt matrix in FIG. 36. Although the image position in almost case after the transformation is subtly shifted in the sub-scanning direction as compared with the pre-transformation condition, the entire image is almost on the same straight line in the main scanning direction.

Figure 37:
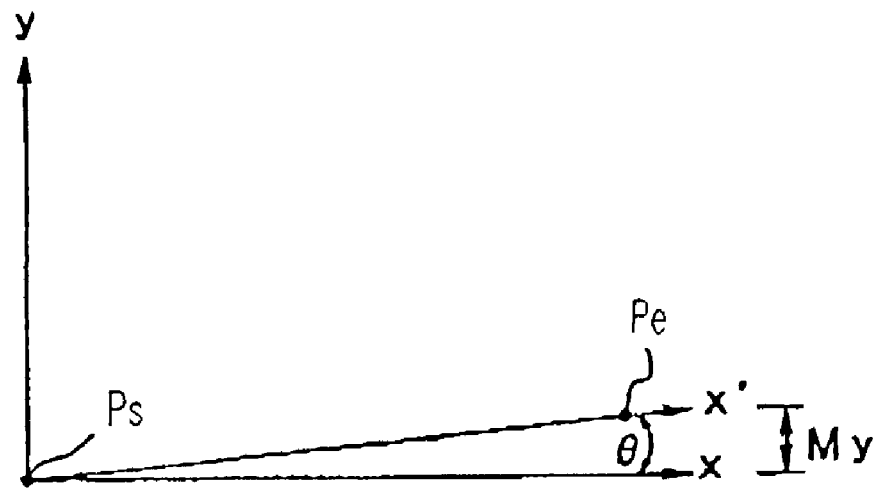
FIG. 37 is a pattern showing a relationship between a main scanning direction x' of an optical scanning device of the present invention, a sub-scanning direction y of an image forming device and a direction x perpendicular to the sub-scanning direction y.

On the other hand, a positioning mechanism for positioning the main scanning direction of the deflection means within a main body of an image forming device positions the main scanning direction to tilt greatly from the direction perpendicular to the sub-scanning direction. For example, FIG. 37 shows a positioning example. As shown in FIG. 37, the direction y indicates the sub-scanning direction and is the same as the surface moving direction of the latent image supporter. In addition, the direction x is perpendicular to the sub-scanning direction. The direction x' is a moving direction of a light beam (deflected by the deflection means of the optical scanning device (not shown) on the latent image supporter, i.e., the main scanning direction of the optical scanning device. The conventional positioning mechanism is generally to position the main scanning direction along the direction x that is perpendicular to the direction y, i.e., the sub-scanning direction. In addition, considering a surface movement of the latent image supporter, to position the main scanning direction to tilt slightly from the direction x is uncommon. However, a tilt angle θ is set to keep a deviation amount My between points Ps, Pe in the direction y to be smaller than one pixel. The points Ps, Pe are respectively a scanning start point and a scanning end point in the direction x. As the deviation amount My between the two points Ps, Pe in the direction y (the sub-scanning direction) is larger than one pixel, a scanning trajectory on the surface of the latent image supporter will tilt to a reverse direction. For example, the surface of the latent image supporter moves in the direction y from the point Ps to the point Pe both are irradiated by a light beam by an optical scanning device. Therefore, as the main scanning direction is the same as the direction x, the scanning trajectory (an irradiating line) on the surface of the latent image supporter is right tilted from the direction x. Considering the tilt fact, the main scanning direction x' is right tilted in advance to set a tilt angle θ in such a manner that the actual scanning trajectory obtained on the surface of the latent image supporter is perpendicular to the direction y. But, as the tilt angle θ is set in a manner that the deviation amount My between the points Ps, Pe in the direction y is larger than one pixel, the scanning trajectory will be tilted to the reverse direction. Therefore, conventionally, the tilt angle θ is set in a manner that the deviation amount My between the points Ps, Pe in the direction y is less than one pixel. However, the positioning mechanism of the present invention positions the main scanning direction of the deflection means with a tilt angle θ so that the deviation amount My is larger than one pixel.

In the above structure, the pixel pitch in the sub-scanning direction, which in the conventional case is completely dependent on the surface moving speed of the latent image supporter, can be also dependent on a scanning timing in the main scanning direction. In this way, the pixel pitch in the sub-scanning direction is subtly adjusted according to a scanning timing in the man scanning direction, and image degradation due to the driving error of the deflection means can be suppressed.

The program can be recorded to a recording medium, such as a CD-ROM, to be widely distributed and obtained by any user. Moreover, information signals of the program can be distributed or obtained, even though transmitted through a communication network, such as a public telephone line, a dedicated line, a wireless communication means, etc., by a prescribed transmission device. During the transmission, at least one portion of information signals of the program can be transmitted on a transmission medium. Therefore, all information signal constituting the program do not need to exist on the transmission medium. If image information whose coordinates are transformed according to the aforementioned program, the image pitch in the sub-scanning direction can also be subtly adjusted even though a conventional optical scanning control device is used.

Figure 38:
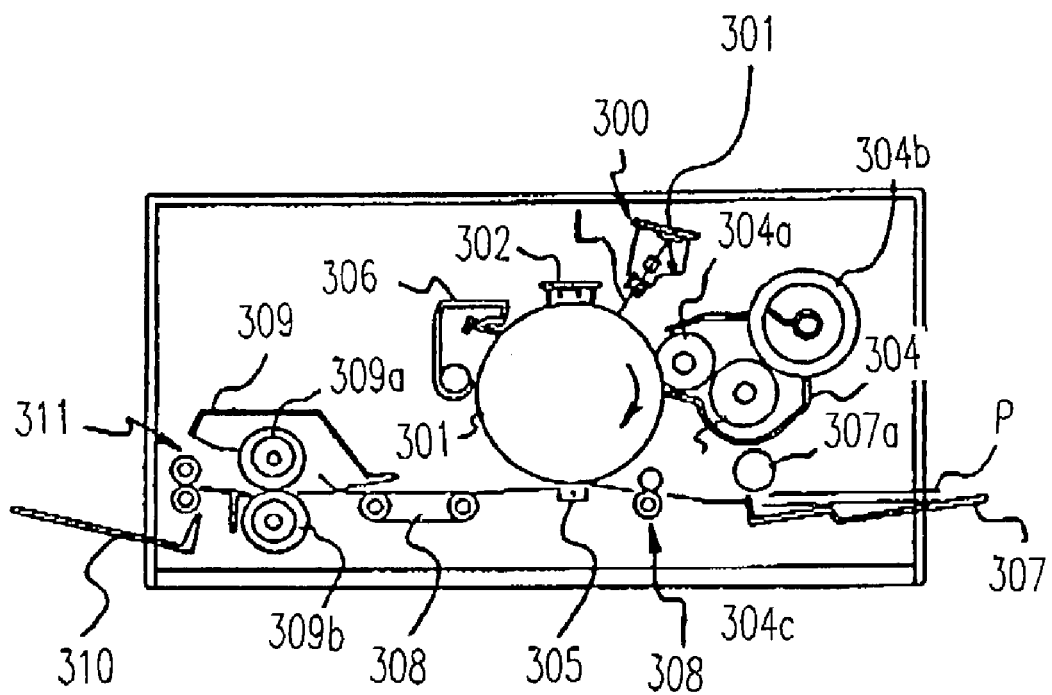
FIG. 38 is a schematic structure showing main parts of a printer.

Next, an embodiment of an image forming device where the above vibration mirror is installed therein is described by using an electrophotographic type laser printer (printer, hereinafter). The basic structure of such a printer is first described. FIG. 38 shows a schematic structure of main parts of the printer. Referring to FIG. 38, a photosensitive drum 301, which is rotated by a driving means (not shown) in a clockwise direction, is arranged at a substantially central position within a printer frame. A charger 302 for charging the photosensitive drum 301, an optical scanning unit 300, a developing device 304, a transfer charger 305, a drum cleaning device 306, etc. are arranged around the photosensitive drum 1, i.e., a latent image supporter. The surface of the rotationally driven photosensitive drum 301 is uniformed charged by the charger 302. The optical scanning unit 300 scans the uniformly charged surface of the photosensitive drum 301 with a laser beam L according to image information sent from a personal computer (not shown), etc. An electrostatic latent image is then written to the surface of the photosensitive drum 301 by an exposure process based on the above scanning. When the written electrostatic latent image passes through a position opposite to the developing device 304 accompanying with the rotation of the surface of the photosensitive drum 301, toner is adhered onto the surface of the photosensitive drum 301 from a developing roller 304a, so that the written electrostatic latent image is developed into a toner image. In the developing device 304, toner in a toner cartridge 304b is supplied to a toner container 304c for containing toner that is to be provided to the developing roller 304a. The developed toner image is then moved to a transfer position opposite to the transfer charger 5 accompanying with the rotation of the surface of the photosensitive drum 301.

A paper-feeding cassette 307 is arranged at a lower side of the developing device 304 as shown in FIG. 38. A plurality of transfer paper P is overlapped and stacked within the paper-feeding cassette 307, and the uppermost transfer paper is in contact with a paper-feeding roller 307a. The paper-feeding roller 307a is rotationally driven with a prescribed timing to send out the uppermost transfer paper P. The sent-out transfer paper P is sandwiched by a nip between a pair of resist rollers 308. The pair of resist rollers sends out the transfer paper P upon determining a timing to overlap with the toner image on the photosensitive drum 301 at the transfer position. A transfer electric field is created under the influence of the transfer charger 305 at the transfer position. The toner image, which is overlapped with the transfer paper P at the transfer position, is thus electrostatically transferred from the surface of the photosensitive drum 301 to the surface of the transfer paper P under the influence of the transfer electric field.

As described above, after passing through a paper transporting device 308, the transfer paper P where the toner image has been transferred thereon is sent to a fixing device 309. Thereafter, the transfer paper P is caught in a fixing nip part formed between a heating roller 309a and a pressure roller 309b, at which a fixing process is performed to the toner image. The transfer paper P where the fixing process has finished passes through a paper ejecting roller pair 311 and then stocked at a paper ejecting tray 310 located outside the printer.

Figure 39:
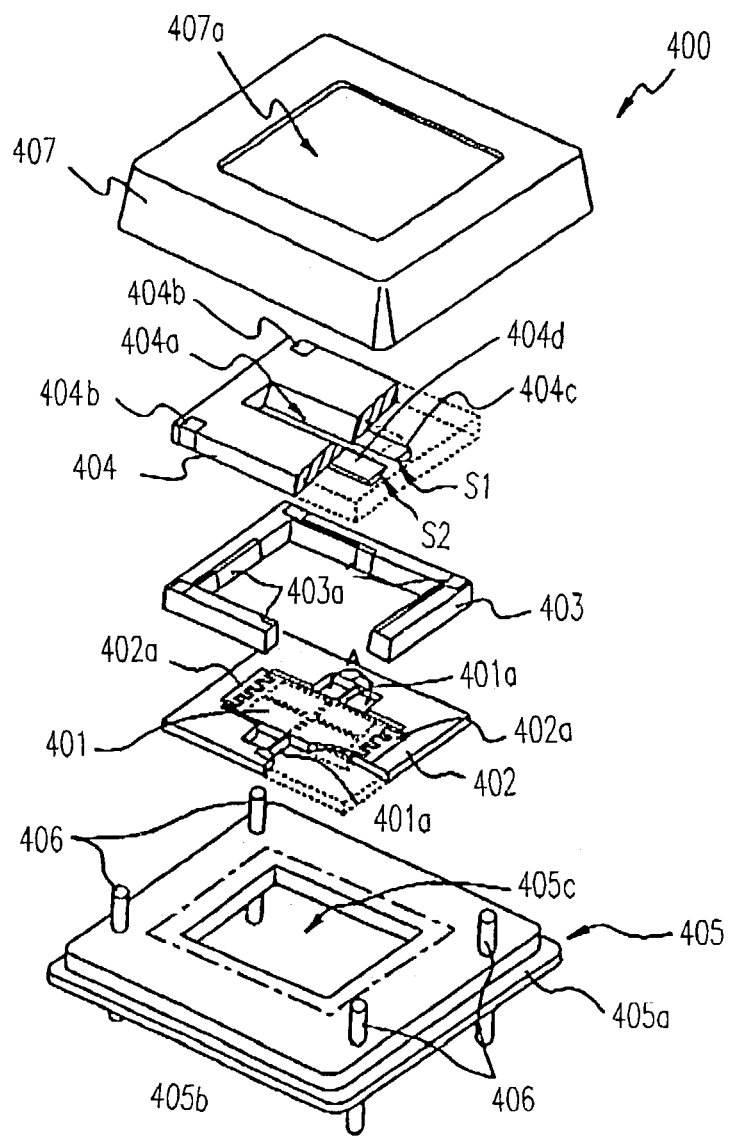
FIG. 39 is an exploded and perspective view showing a vibration mirror module used within the above optical scanning unit of an optical scanning device.

FIG. 39 is an exploded and perspective view showing a vibration mirror module 400 used within the above optical scanning unit 300 of an optical scanning device. The optical scanning device utilizes the resonance of the vibration mirror to deflect a light beam. Referring to FIG. 39, the aforementioned vibration mirror is used on the vibration mirror module 400, i.e., the deflection means.

As described above, the vibration mirror unit comprises a reflection mirror, a mirror substrate 401 where the reflection mirror is formed with film thereon, a first substrate 402 for supporting the mirror substrate 401 by torsional rods 401*a*, and a second substrate 403 adhered onto the first substrate 402. Tooth-shaped movable electrodes, which are opposite to fixed electrodes formed on two opposite sides of the first substrate 402, are respectively formed on two opposite sides of the mirror substrate 401. An opposite mirror substrate 404, which is formed by a silicon substrate with a thickness of 525 μm, is fixed upon an upper side (with respect to FIG. 45) of the second substrate 403. A slender and slit-shaped through opening 404*a* is formed on the opposite mirror substrate 404. The opposite mirror substrate 404 is positioned and aligned in such as manner that a longitudinal part of the through opening 404*a* is opposite to the vibration mirror, and then fixed onto the second substrate 403. A plurality of electrode pads 404*b*, which are wire bonded from each electrode through the second substrate 403, are formed on the opposite mirror substrate 404. In addition, a first mirror chip 404*c* with a reflection plane S1 that is tilted about 26° from a adhesion plane and a second mirror chip 404*d* with a reflection plane S2 that is tilted about 9° are fixed on a back side of the opposite mirror substrate 404 in such a manner that the first and the second mirror chips 404*c*, 404*d* sandwich the through opening 404*b*. The reflection planes S1, S2 of the mirror chips 404*c*, 404*d* are respectively formed by etching and metal films are deposited on a silicon substrate that is formed with slice angles tilted by 26°, 9° from a crystal orientation.

A supporting base 405 is fixed onto a lower side of the first substrate 402. The supporting base 405 comprises a rectangular bottom plate 405*a* and a pedestal 405*b* located above the bottom plate 405*a*, both of which are integrally formed with sintered metal, such as iron (Fe). A four-sided recess 405*c* for receiving vibrating edges of the vibration mirror is formed on the pedestal 405*b*.

In addition, cylindrical terminals 406, which are formed with conductive material, are respectively fixed in the vicinity of the four corners of the supporting base 405 and penetrate through the supporting base 405. But, it is not conductive between the supporting base 405 and the cylindrical terminals 406 because an insulating material (not shown) is formed between the supporting base 405 and the cylindrical terminals 406. One end of each cylindrical terminal 406 is adhered to the electrode pad 404*b* of the opposite mirror substrate 404 by wire bonding. In this way, a voltage is applied to side-face electrodes the fixed electrodes 402*a* through a path from the cylindrical terminal 406, the electrode pad 404, to the second substrate 403.

The supporting base 405 or each member located above the supporting base 405 are fixedly packaged on a circuit board (not shown) by a manner that the lower ends of the cylindrical terminal 406 are inserted into through holes of the circuit board to perform an electric conduction and secured in position by soldering.

A box-like cover 407 whose upper side has a transparent window 407*a* covers the packaged members from its upper side. An inert gas with a low viscous resistance can be sealed into the cover 407, or the vibration mirror can be vibrated with a low loading by reducing an inner pressure of the cover 407.

Figure 40:
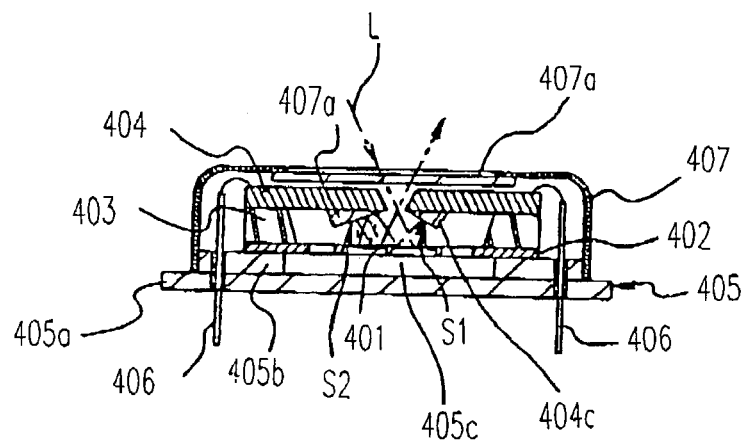
FIG. 40 is a cross-sectional view of the deflection module in FIG. 36.

FIG. 40 is a cross-sectional view of the deflection module in FIG. 39. A light beam L emits toward the vibration mirror module 400 from a light source (not shown), and the light beam L is incident into the vibration mirror module 400 with an incident angle of about 20° tilted from a direction perpendicular to the surface of the transparent window 407*a*. The light beam L passes through the transparent window 407*a* and the through opening 404*a* and then arrives the vibration mirror. Afterwards, the light beam L becomes a reflection light that is reflected by the surface of the vibration mirror. A multiple reflection, which means that the reflected light is reflected by the vibration mirror again after the reflection light is reflected by the reflection planes S1, S2 of the mirror chips 404*c*, 404*d*, processes repeatedly, and then the multiple reflected light passes through a little slit of the through opening 404*a* and then emits out of the vibration mirror module 400. By the multiple reflection, the light direction that emits out of the vibration mirror module 400 changes to move back and forth within a 40° range tilted from the incident light. Therefore, the main scanning of the light beam is conducted by using the change of the light direction. In addition, as shown in FIG. 40, by multiple reflecting the light beam L, even though the vibration angle α of the vibration mirror is smaller, a large scanning angle can be obtained. For example, if the light beam L is totally reflected by the vibration mirror by N times and the vibration angle is α, the scanning angle θ is 2αN. In FIG. 40, a scanning angle 50° is obtained by a vibration angle α=±5°.

Figure 41:
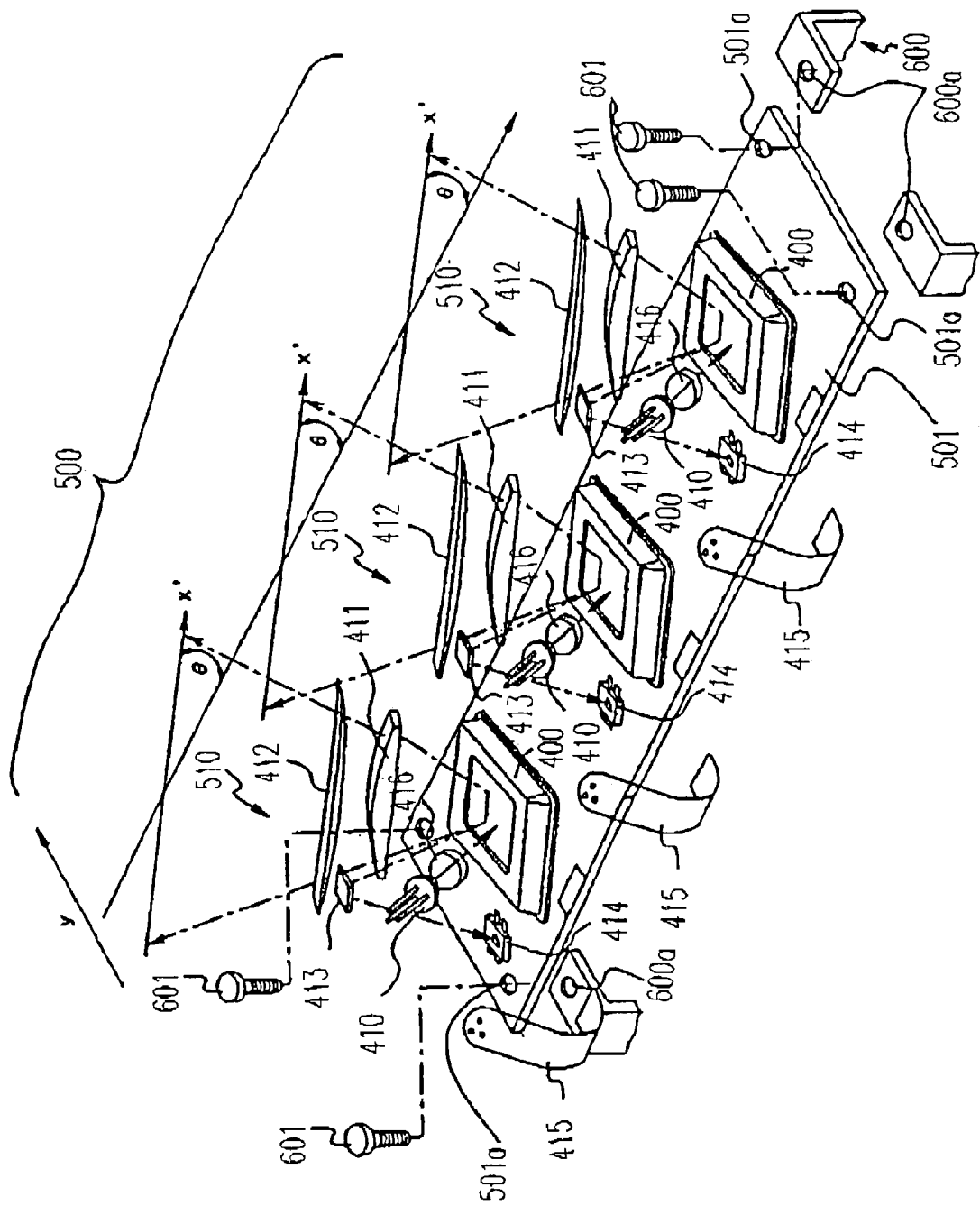
FIG. 41 is a perspective view showing main parts of the aforementioned optical scanning unit.

FIG. 41 is a perspective view showing main parts of the aforementioned optical scanning unit 300. For example, the optical scanning unit 300 comprises three optical scanning devices 510 each of which is unitized. Each optical scanning device 510 comprises the aforementioned deflection module (a vibration mirror module) 400, a semiconductor laser 410, a first lens 411, a second lens 412, etc. In addition, each optical scanning device 510 can further comprise a reference position reflection mirror 413, a reference angle detecting sensor (as a scanning beam detecting means) 414, a flexible cable 415, and a coupling lens 416, etc. The semiconductor laser 410 can be an element for general use, in which a light emitting source and a photodiode for monitor are packaged therein and whose lead terminal are electrically connected to a circuit board 501 by the flexible cable 415. A scanning control unit, which comprises a modulation control unit for the semiconductor 410 and circuits for controlling a driving pulse voltage provided to electrodes of each vibration mirror module 400, etc., is formed on the circuit board 501. The light beam L emitted form the semiconductor laser 410 is focused by the coupling lens 416 that has a first surface (an axially symmetric spherical surface) and a second face a cylindrical surface for providing a curvature in a vertical scanning direction. At this time, the light beam is substantially parallel in a direction perpendicular to the propagation direction and is converged to a focus plane, i.e., the vibration mirror. Thereafter, the light beam emits out of the vibration mirror module 400, while the aforementioned multiple reflection processes repeatedly. The light beam L emitted is to expose a photosensitive drum (not shown) to optically write an electrostatic latent image thereon. As the defection direction of the light beam L out of the vibration mirror module 400 reaches a leftmost position in the drawing, after the light beam out of the vibration mirror module 400 passes through the first lens 411, the light beam reaches not only the second lens 412 but also a synchronous mirror 413 at which the light beam is reflected and then detected by the reference angle detecting sensor 414. The scanning control unit calculates a vibration period (a scanning frequency) and a vibration angle displacement, etc. of the vibration mirror according to a detection timing and a detection period of the reference angle detecting sensor 414. Then, a synchronous signal for synchronizing a timing among the vibration modules. The vibration mirror module 400 of each optical scanning device 510 is fixed on the circuit board 501. The deflection modules 400 are lined up on the circuit board 501 along a moving direction of a photosensitive drum surface (not shown) and a direction x perpendicular to a direction y, i.e., a sub-scanning direction.

Conventionally, an image forming device where a plurality of optical scanning devices is arranged therein is known. For example, Japanese Laid Open Patent Publication No. H03-1617778, No. H09-005655, and No. H10-197812 disclose the structure. According to the conventional image, for example, when the scanning area of the main scanning direction is to be maintained to correspond a width of an A3 size paper, etc., the focus length of the scanning lens has to be fit to the width and increased. In addition, the widths of the polygon mirror and the vibration mirror has to be increased, too. Furthermore, a driving means for driving a mirror with such width also need to be large enough to provide a corresponding and required torque. Unavoidably, the scanning lens, the mirror and the driving means have also to use larger parts. As a result, the degree of freedom for an optical scanning device layout inside the image forming device is greatly limited compelled to become large. In contrast, the present invention provides a plurality of optical scanning devices that is lined up along the x direction perpendicular to the sub-scanning direction y. According to this structure, one image information is divided into plural regions along its X coordinate direction, which is equivalent to the x direction, so as to divide the main scanning region into plural regions. Each main scanning region is respectively scanned by one optical scanning device, and therefore, the optical scanning device can become smaller and more compact. In this way, as compared with using single large scanning device, the main body of the image forming device can be avoided from getting larger. In the printer of the present embodiment, in order to increase the scanning region, the optical scanning unit 300 comprises three optical scanning devices 510.

In the deflection module (vibration mirror module) 400 mentioned above, the vibration times per unit time (the vibration frequency) of the mirror substrate 401 will occur an error due to a mass error and a dimension error that determine the inertia moment of the mirror substrate 401. The error of the vibration times of the mirror substrate 401 will create directly an error in the scanning times per unit time (the scanning frequency) of the vibration mirror module 400. Therefore, a size error in the sub-scanning direction of the image will be created, and as described above, a degradation of the image quality occurs inevitably.

The image quality reduction is created in an image forming device with only one optical scanning device. However, for the image forming device having a plurality of optical scanning devices according to the printer of the present invention, the image quality degradation gets worse. For example, joints between divided images that are divided from an original image into plural image regions in the x direction (the direction perpendicular to the sub-scanning direction) are unnatural.

Figure 42:
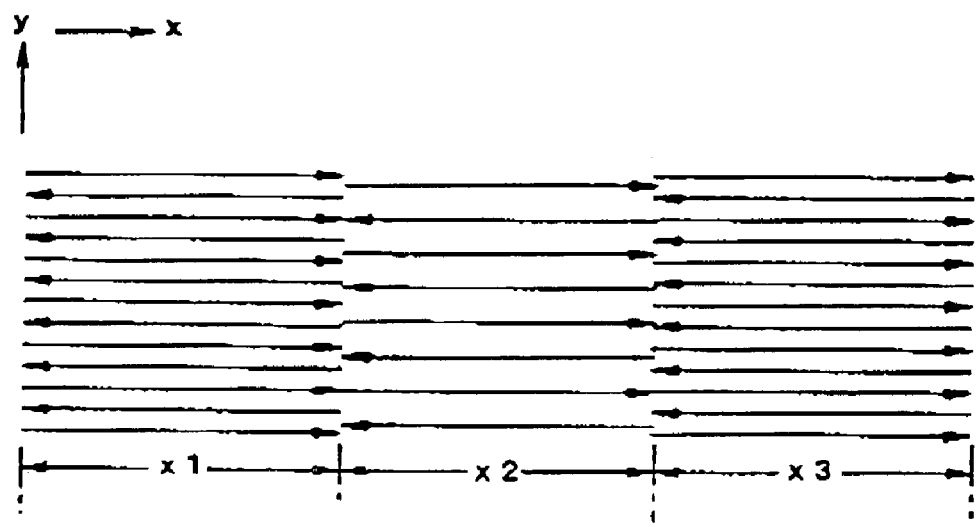
FIG. 42 is a schematic diagram showing a scanning trajectory drawn on a photosensitive drum, scanned by three scanning devices in the conventional image forming device.

FIG. 42 is a pattern diagram showing a scanning trajectory drawn on a photosensitive drum, scanned by three scanning devices in the conventional image forming device. The three optical scanning devices (not shown) are respectively used to scan regions x1, x2 and x3 on the photosensitive drum. Among the optical scanning devices, any one of them has a scanning frequency that is quite different from others, and at least one line of the scanning trajectory of the respective optical scanning device does not continue. In FIG. 42, it shows an example that the scanning frequency of the optical scanning device used to scan the region x2 is obviously lower than those of other optical scanning devices. If the scanning trajectories are not continuous in a line shape, the joints between the divided images are definitely unnatural and the image quality is obviously degraded. In addition, strictly speaking, because the surface of the photosensitive drum also moves during the scanning process, the scanning trajectory on the surface of the photosensitive drum will slightly tilted from the x direction. However, FIG. 45 only depicts the scanning trajectory by ignoring the slight tilt.

The present embodiment of the invention describes an example that dot mapped image data, i.e., image information, is divided into three in the X-axis direction. However, image information can be divided into any number if the dividing number is the same as the number of the optical scanning devices.

Next, a featured structure of the present printer is described. As shown in FIG. 41, screw holes 501a are respectively formed in vicinity of four corners of the circuit board 501. Board support fittings 600 are fixed on a printer main body (not shown). The board support fittings 600 have four screw holes 600a corresponding to the screw holes 501a respectively. Female screw thread is formed on inner faces of the screw holes 600a. Bolts 601 are respectively inserted into the four screw holes 501a on the circuit board 501. The four bolts 601 inserted are screwed into the four screw holes 600a on the board support fittings 600. In this way, the circuit board 501 is fixed within the printer main body and the three deflection modules 400 are respectively positioned. As the three deflection modules 400 are positioned, the main scanning direction is surely positioned. Therefore, for the printer according to the present embodiment, the four screw holes 501a, a positioning mechanism is formed with the board support fittings 600 and the four bolts 601.

The positioning mechanism is used to position the main scanning direction of the three vibration mirror modules 400 according to the following description. Namely, the respective main scanning direction x' is positioned to tilt from the direction x perpendicular to the direction y, i.e., the sub-scanning direction. In detail, the positioning is not only a simple tilt. As shown in FIG. 37, the positioning is to make a tilt angle θ to be sufficiently large in such a manner that a deviation amount, in the direction y from the scanning start point Pa to the scanning end point Pb, is larger than one pixel. The tilt angle θ can be any value if the deviation amount, in the direction y from the scanning start point Pa to the scanning end point Pb, is larger than one pixel.

Figure 43:
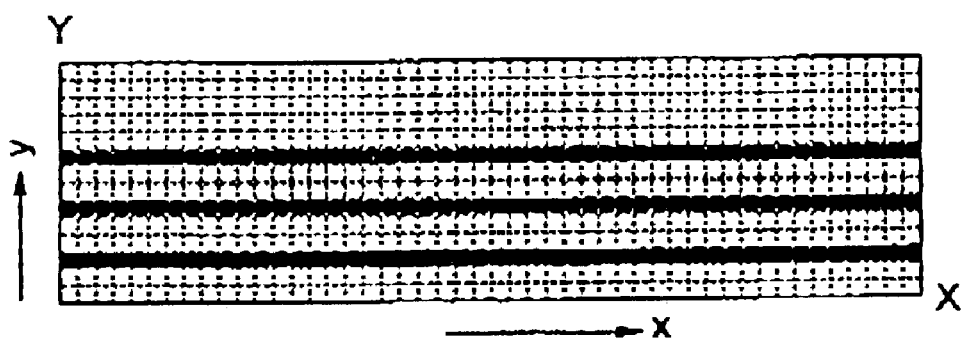
FIG. 43 is a pattern diagram showing a matrix of dot mapped image data.

FIG. 43 is a pattern diagram showing a matrix of dot mapped image data, i.e., image information. As shown, the Y-axis direction of the matrix is equivalent to the y direction, i.e., the sub-scanning direction of the optical writing, and the X-axis direction is equivalent to the x direction perpendicular to the y direction. Referring to FIG. 43 shows an image example, wherein three line images are arranged in parallel in the y direction and each line image extends straightly along the x direction. The relative position of each pixel forming the image is represented by a coordinate system where a plurality of imaginary straight lines are mutually perpendicular to form a grid within the matrix. In addition, about thousands of pixels are actually lined up along the X-axis direction in dot mapped image data, but for convenient description, only about 50 pixels are lined up and depicted along the X-axis direction in FIG. 43.

Figure 45:
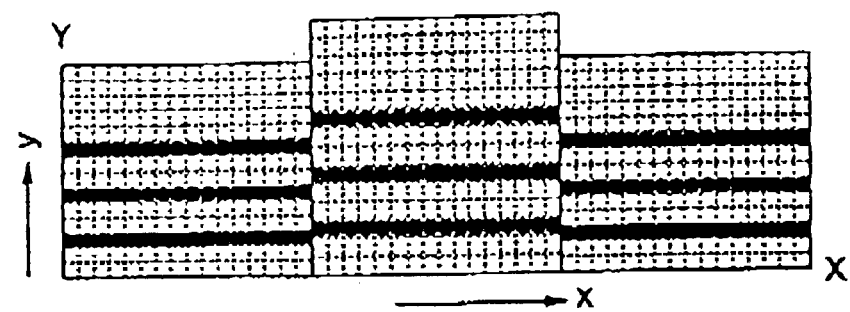
FIG. 45 is a pattern diagram showing three line images that are optically written by a conventional image forming device.
Figure 46:
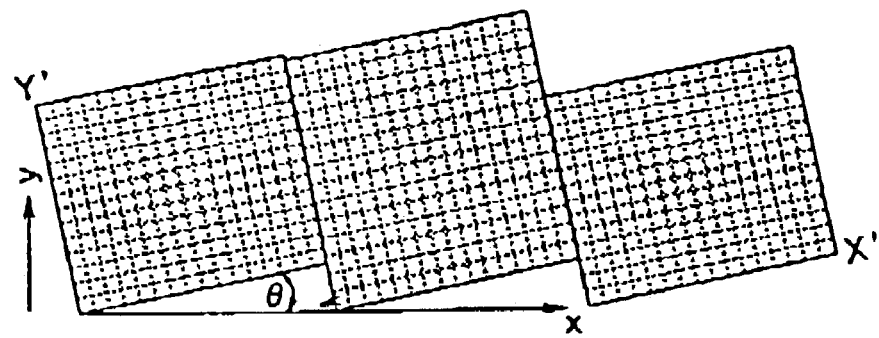
FIG. 46 is a pattern diagram showing a tilt matrix used in a printer according to the embodiment of the present invention.
Figure 47:
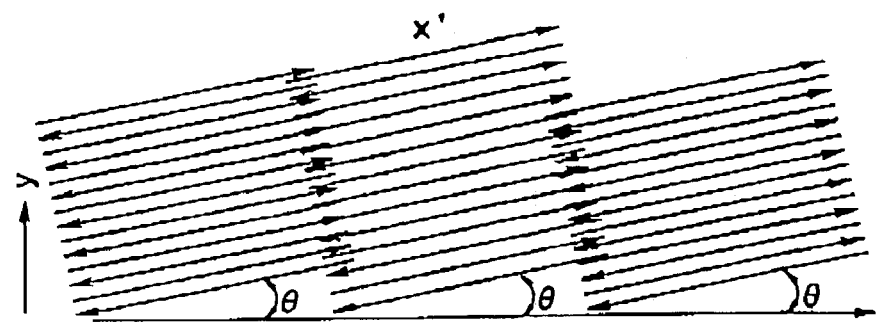
FIG. 47 is a pattern diagram showing a scanning trajectory that is drawn on a photosensitive drum by scanning according to the deflection of the three deflection modules in the printer of the present invention.

In the printer of the present embodiment, the image forming device is used to perform an optical writing with three optical scanning devices, which have different scanning regions respectively in the x direction. First, three divided matrixes are constructed to divide dot mapped image data into three along the X-axis direction. For example, if dot mapped image data in FIG. 46 is used, FIG. 47 shows to construct its three divided matrixes. The mesh of each divided matrix has a theoretical size. If all the scanning frequencies of the three optical scanning devices (the vibration mirrors) are based upon a design rule, the respective mesh is the same as the theoretical size. Therefore, if there exists an optical scanning device (vibration mirror) with a scanning frequency that is obviously different from the design rule, the actual mesh size of the corresponding divided matrix will extend or contract along the Y-axis direction. For example, as shown in FIG. 45, in the divided matrix corresponding to the central region x2, as compared with the theoretical size, its actual mesh size extends greatly along the Y-axis direction. However, the dot size in the mesh does not change and the dot is formed at the mesh center. In the conventional image forming device, each dot is formed as shown in FIG. 45 and the line images at each dividing position are not continuous.

Figure 44:
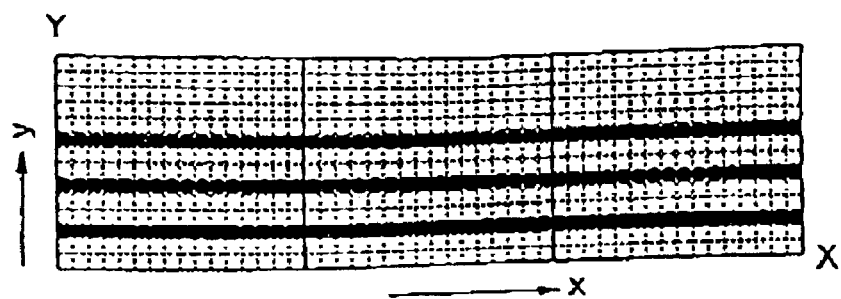
FIG. 44 is a pattern diagram showing divided matrixes constructed based upon the matrix.

The scanning control unit of the present printer calculates the scanning frequencies of the three optical scanning devices 510 respectively, based on an optical detecting period of the reference angle detecting sensor 414. Then, a tilt matrix for a mesh size, which corresponds to the respective scanning frequency, is specified among plural kinds of tilt matrixes that are previously stored in a memory section. The tilt matrix is formed with coordinate axes that are tilted with the above tilt angle $\theta$ from the coordinate axes of the normal matrix. For example, three tilt matrixes in FIG. 46 are specified for the three divided matrixes in FIG. 44. Among the three tilt matrixes, the mesh of the central tilt matrix is larger than others.

FIG. 47 is a pattern diagram showing a scanning trajectory that is drawn on a photosensitive drum by scanning according to the deflection of the three deflection modules 400 in the printer of the present invention. Similar to FIG. 42, the scanning frequency of the central region x2 is obviously lower than those of the other regions. However, the tilt angle $\theta$ is substantially the same as the tilt angle $\theta$ of the vibration mirror module 400. Strictly, for the surface move of the photosensitive drum 301 within one scanning time, the former tilt angle $\theta$ is slightly deviated from the latter tilt angle $\theta$, but this deviation can be ignored for the image quality. The latter tilt angle $\theta$ is an angle where the scanning in the main scanning direction x' is five pixels and a move amount in the sub-scanning direction y is one pixel.

Figure 48:
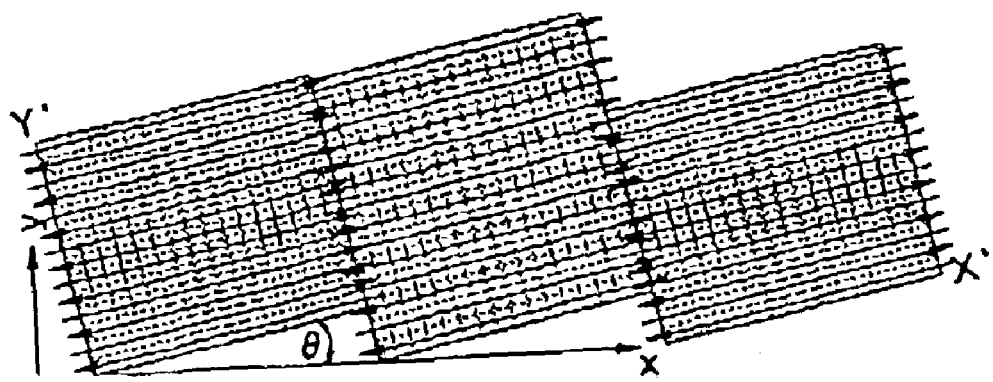
FIG. 48 is a pattern diagram showing an overlapped status of FIG. 47 and FIG. 46.

As shown in FIG. 48, if the pattern diagram in FIG. 47 and the tilt matrix in FIG. 46 are overlapped, it is clear that the position of each scanning trajectory and its corresponding center of the mesh are completely consistent. The center of the mesh of the tilt matrix is located at its corresponding scanning trajectory.

Figure 49:
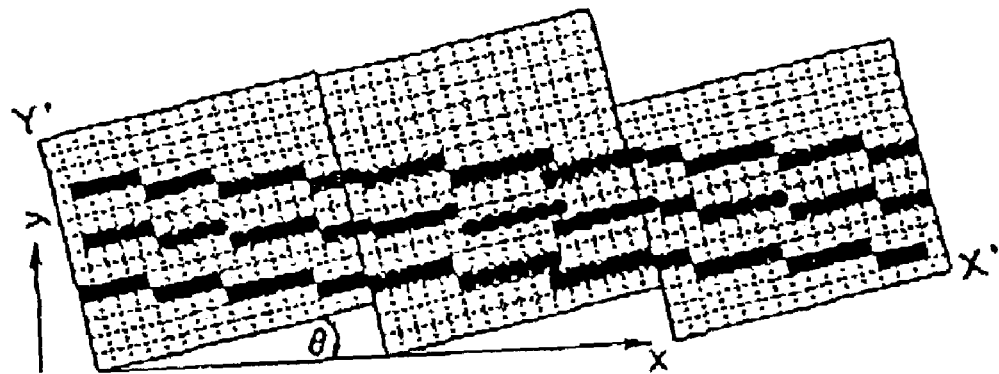
FIG. 49 is a pattern diagram to explain a coordinate transformation performed by a scanning control unit of the printer of the present invention.
Figure 50:
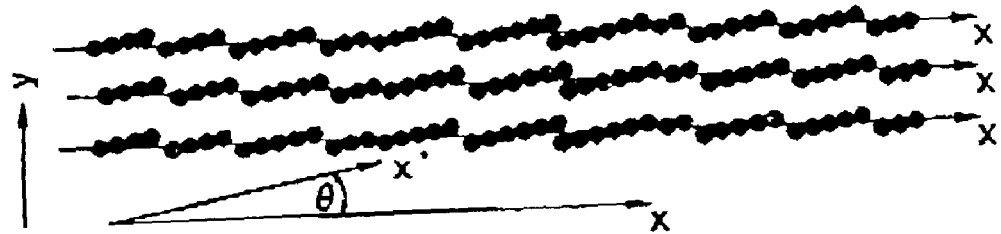
FIG. 50 is a pattern diagram showing an example of a line image that is optically written by the printer of the invention.

The scanning control unit performs the following process according to the three divided matrixes and the three tilt matrixes. In other words, as shown in FIG. 49, each dot coordinate within the divided matrix is transformed to a coordinate of its corresponding tilt matrix (the tilt coordinate, hereinafter). At this time, a tilt coordinate that is nearest to the dot coordinate within the divided matrix is selected, and then the optical writing of each optical scanning device 510 is performed according to coordinate transformation data. As shown in FIG. 41, under a condition where the main scanning direction x' is positioned to tilt from the sub-scanning direction y by a tilt angle $\theta$, the light beam L scans to perform an optical writing to the photosensitive drum 1 (referring to FIG. 38). In this scanning, the pixel pitch in the sub-scanning direction y can be dependent on a scanning timing in the main scanning direction x'. Referring to FIG. 50, using an imaginary line that extends along the direction x as a reference line, dots can be formed around the zigzag pattern along the y direction. If the divided line images of the regions x1, x2, x3 are enlarged, a zigzag pattern will be formed, but the entire image is continuous on a straight line along the x direction. In this way, the obvious degradation of the image quality, caused by unnatural continuity between divided images in the x direction, can be suppressed. Moreover, in the actual image, the amplitude of the zigzag pattern is about several ten micrometers ($\mu$m), and cannot be visualized by the un-aided human eyes. Actually, these zigzag patterns can be ignored.

The scanning frequencies of the three vibration mirror modules 400 (vibration frequencies of the vibration mirrors) are respectively measured in advance, and only the tilt matrix for the mesh length corresponding to the above measurement is stored in the scanning control unit. If done in this way, the respective scanning frequency is calculated according to a detected result (a synchronous signal) from the reference angle detecting sensor 414 and therefore, the complicated process to specify a tilt matrix for mesh length corresponding to the calculated result can be omitted.

In addition, it does not have to execute the coordinate transformation from the divided matrix to the tilt matrix by using the scanning control unit. If a computer for sending image information can do the same optical writing if a driver or a program for controlling and driving the printer can perform the coordinate transformation and then transmit data.

Figure 51:
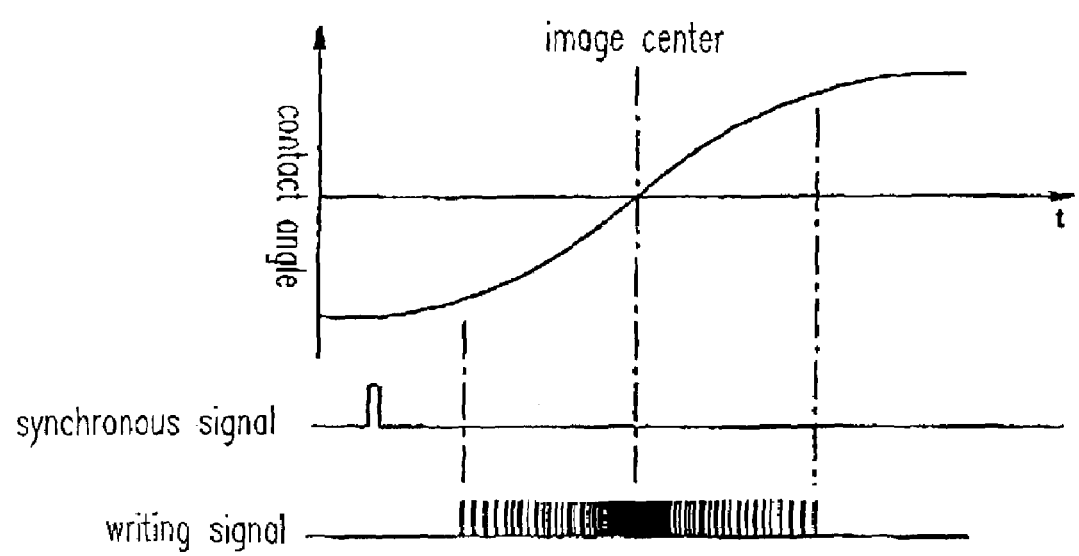
FIG. 51 is a graph showing a relationship among a scanning speed variation, a synchronous signal and a writing signal within one scanning period of the optical scanning device of the printer according to the invention.

In the vibration mirror module 400, the scanning speed within one scanning period in the x direction changes according to a vibration angle of the vibration mirror. For example, as shown in FIG. 51, the vibration angle of the vibration mirror within one scanning period changes sinusoidally. Accordingly, for each vibration mirror (the optical scanning device) 400 within one scanning period, the scanning speed at the central part of the scanning region (x, x, or x3) is faster than those at the vicinity of the two ends of the scanning region. Although the scanning speed changes, the dots in the x' direction (the main scanning direction) cannot be formed with an equal interval when a laser driving period corresponding to each pixel is set an equal interval. The dot interval at the central part is larger than that at the vicinity of the two ends. According to the printer of the present invention, as shown in FIG. 48, the laser driving period is changed within one scanning period according to the vibration angle (a variation of the scanning speed). For example, based on the synchronous signal, the laser driving period is changed by adjusting an occurrence interval of the writing pulse signal that serves as a laser driving signal. In this manner, the laser driving period at the central part of the scanning region is faster than those at the vicinity of the two ends of the scanning region. According to this structure, even though the scanning speed of the optical scanning device 510 changes within one scanning period, the dots in the x' direction (as well as the x direction) can be formed with an equal interval.

Figure 52:
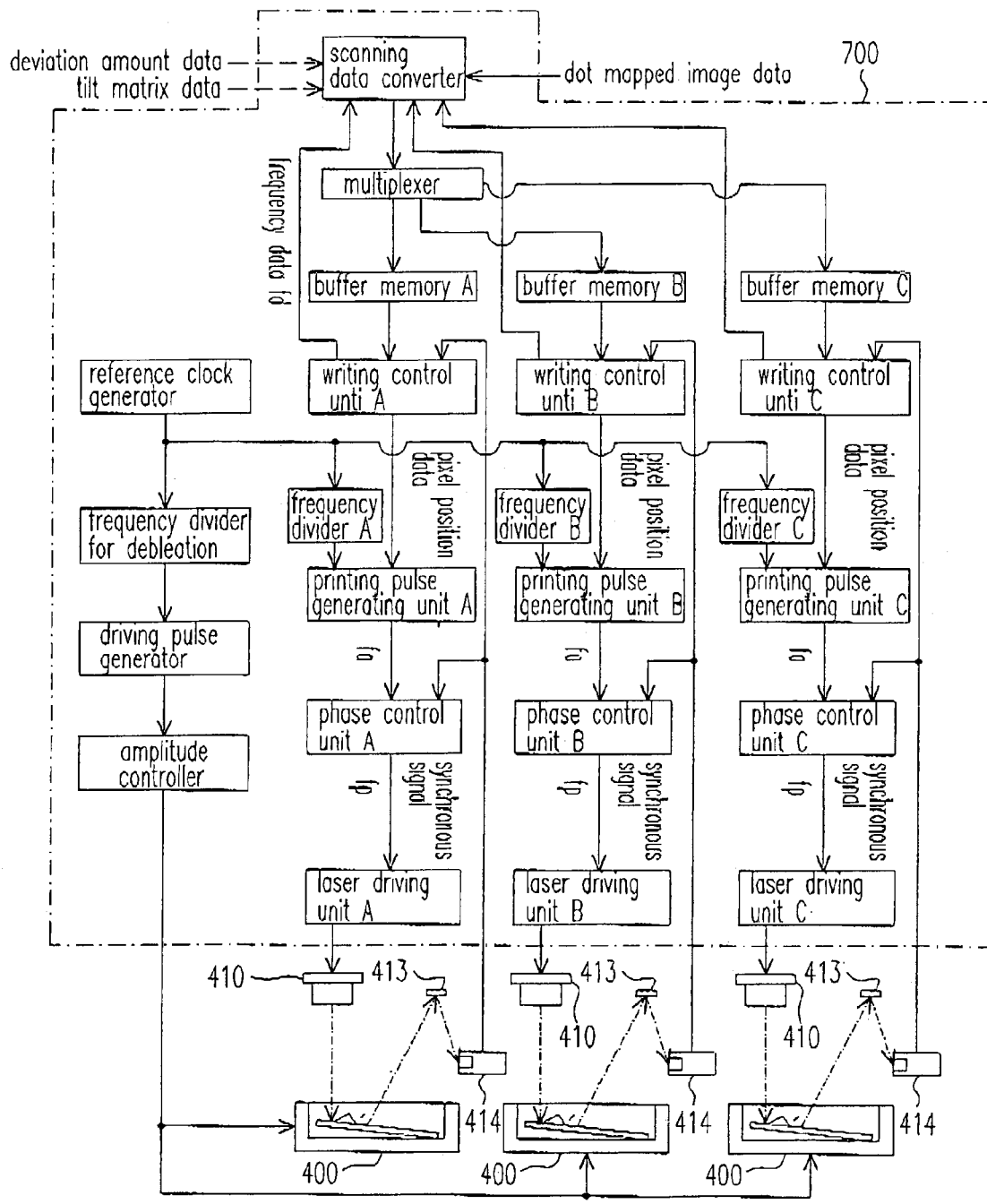
FIG. 52 is a block diagram of the scanning control unit.

FIG. 52 is a block diagram of the scanning control unit. Referring to FIG. 52, the scanning control unit 700 comprises three sub-systems A, B and C each of which further comprises a buffer memory, a writing control unit, a frequency divider, a printing pulse generating unit, a moving control unit and a laser driving unit. The three sub-systems correspond respectively to the three optical scanning devices. Furthermore, the system has common circuits for the sub-systems, and these common circuits comprises a scanning data converter, a multiplexer, a reference clock generator, a frequency divider for deflection, a driving pulse generator and an amplitude controller.

A frequency of a reference pulse signal generated by the reference clock generator is divided by the frequency divider for deflection, and then input to the driving pulse generator. The driving pulse generator generates a pulse with a frequency f corresponding to a design rule for the vibration number of the mirror according to the signal transmitted from the frequency divider for deflection, and then the pulse is sent to the amplitude controller. According to the received pulse with the frequency f, the amplitude controller sends a driving pulse to the vibration mirror of each vibration mirror module 400, so that the vibration mirror is vibrated in its resonant state. However, as described above, in each optical scanning device, the scanning frequency fd, i.e., the resonant frequency, of the vibdration mirror has a slight error away from the frequency f defined by the design rule. The actual scanning frequency fd of each optical scanning device is calculated by the writing control unit A, B C respectively according to the synchronous signal sent from the reference angle detecting sensor 414. The respective calculated result is then sent to the scanning data converter. The scanning data converter stores previously position deviation data in the y direction and tilt matrix data corresponding to a tilt error of the respective scanning line for each optical scanning device. As dot mapped image data is sent from a personal computer (not shown), etc., the three divided matrixes are accordingly constructed and then a coordinate transformation is performed by comparing their corresponding tilt matrixes. At this time, each of the divided matrixes uses the tilt matrix for the mesh length corresponding to scanning frequency data that is respectively sent from the writing control units A, B, C. In addition, according to position deviation data in the x and the y directions, a comparison reference position between the divided matrix and the tilt matrix is shifted. Then, coordinate transformation data obtained for the three divided matrix is respectively transmitted to the memories A, B and C through the multiplexer.

Furthermore, because signal transmission process from the buffer memory to the laser driving unit is the same for the sub-systems A, B and C, only the sub-system A is described. The writing control unit A reads data in the buffer memory A according to the synchronous signal sent from the reference angle detecting sensor 414, which data is served as image position data and sent to the printing pulse generating unit A. The printing pulse generating unit A filters the reference pulse signal sent from the frequency divider A according to image position data mentioned above, and then to generate the printing pulse signal (pulse ON) according to a writing timing. However, this printing pulse signal is generated according to the reference pulse signal that is a pulse ON with an equal interval. If this printing pulse signal is directly used, there might be an error in the dot formation pitch due to the scanning speed variation corresponding to the vibration angle of he vibration mirror. In contrast, according to the present invention, based on synchronous signal sent from the reference angle detecting sensor 414, the moving control unit A performs a phase process to each pulse within the printing pulse signal in such a manner that the dot pitch is equal. In this manner, the printing pulse signal, where the phase process has been processed thereon, is sent to the laser driving unit A to drive the semiconductor laser 410.

Figure 53:
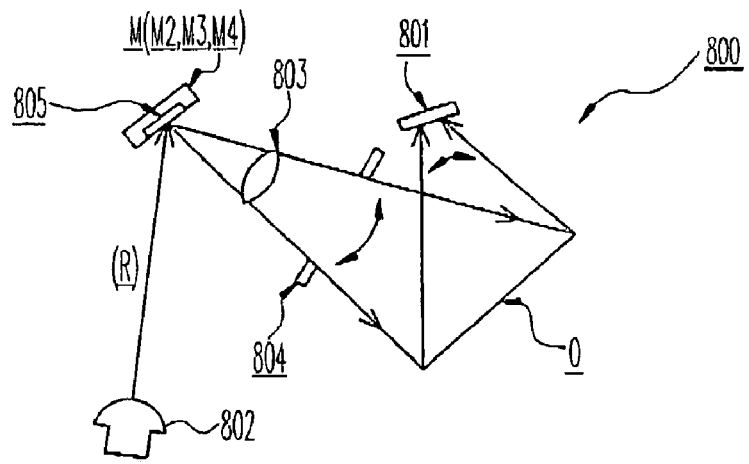
FIG. 53 shows a reading device for performing an optical scanning to read an image.

FIG. 53 shows a reading device 800 for performing an optical scanning to read an image. This reading device can be applied to a bar code reader or a scanner. The vibration mirror M (M2, M3, M4) changes a reflection direction of an incident light beam (R), which performs the optical scanning to read, so as to irradiate a read surface. Optical information of the surface O read by optical scanning of the vibration mirror M is received and read by a optical receiver 801. The light beam (R) from a light source 802 is irradiated to the vibration mirror M, reflected by the reflection mirror 805 of the vibration mirror M, and then projected onto a surface O where an image to be read through a projection lens 803 and a stop 804. Therefore, a reading device with few parts and a small size can be provided.

In summary, According to the invention, a thin region (recess part) for reducing a portion of the inertia moment of the movable mirror of the vibration mirror module can be formed on a surface the same as the surface of the three-layered substrate, and the recess part can be simultaneously formed while etching the fundamental shape of the vibration mirror. In addition, it is easy to form the etching mask for processing the recess part. Therefore, according to the embodiments of the present invention, a vibration mirror with a small torque and a large vibration angle can be achieved, and additionally, the vibration mirror has a structure capable of simplifying a process to form a recess part for reducing weight of the vibration mirror and thereby reduce the overall processing time.

As compared with using additional processes of a substrate penetrating process and a plate thinning process, the present invention can provide a vibration mirror with a large vibration angle in a reduced processing time. Furthermore, an etching start timing for the wafer substrate is adjusted only by a different thickness of the etching mask, and therefore, the through region and the thin plate region can be formed. Additionally, the etching mask can also be simply made of a single material. The etching mask can be also made of two different materials and thus the etching start timing for the wafer substrate can be adjusted with a wide range, so that the degree of freedom for the thickness of the movable mirror is very wide. Moreover, the etching mask with the step part can be formed only by exposing and developing the resist. According to the present invention, because the etching mask uses a thermal oxide film whose etching selection ratio to the silicon is larger than the resist, penetrating a thick substrate and forming a thin plate are possible, so that a large vibration mirror can be formed. According to the method of the invention, step parts of a plurality of wafers can be formed at the same time, and therefore, the process (manufacturing) cost can be reduced. In addition, the edge of the step part of the etching mask can be well controlled to form with a right angle and ends of the wafer substrate around the thin plate that has been etched can also be formed with a right angle, so that the dimension accuracy of the vibration mirror and the characteristic unevenness can be improved. Because the etching stop timing for the region where a portion of the movable mirror is thinned can be confirmed visually, a highly accurate vibration mirror can be made in spite of an uneven etching condition. Furthermore, right after the through etching, the movable mirror can be held by the insulating layer, and therefore, it is hard to cause damages when additional processes are subsequently performed, and therefore, the yield rate for manufacturing the vibration mirror can be improved In addition, according to the structure of the vibration mirror module, an optical scanning device with a simple structure, a large vibration angle for performing a scanning process, a low driving voltage and a low cost can be provided.

Moreover, according to the disclosure of the present invention, the pixel pitch in the sub-scanning direction is subtly adjusted according to the scanning timing in the main scanning direction, an excellent effect can be provided to reduce image degradation due to the driving error of the deflection means (the vibration mirror).

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A vibration mirror, reciprocatively vibrated by an electrostatic force to reflect an incident light beam such that a reflection direction of the reflected light beam is different from an incident direction of the incident light beam, comprising:
    a reflection means for reflecting the incident light beam;
    a reflection means holding substrate for holding the reflection means;
    a torsional rotation shaft comprising rod members rotatably supporting two ends of the reflection means holding substrate;
    movable electrodes formed on side faces of the reflection means holding substrate;
    a first substrate for supporting the reflection means supporting substrate via the torsional rotation shaft;
    first fixed electrodes formed on the first substrate so as to face the movable electrodes;
    a first electrically insulating and separating means formed on the first substrate to electrically insulate and separate the movable electrodes from the first fixed electrodes; and
    a second substrate overlaid on the first substrate with an insulating layer therebetween so as to be electrically insulated from and overlapped to adhere onto the first substrate.

2. The vibration mirror of claim 1, wherein the second substrate further comprises second fixed electrodes, which face the movable electrodes.

3. The vibration mirror of claim 2, further comprising a second electrically insulating and separating means, wherein the second fixed electrodes formed on the second substrate comprises a plurality of regions that are electrically insulated and separated by the second electrically insulating and separating means.

4. The vibration mirror of claim 3, wherein the second electrically insulating and separating means comprises separation slits to insulate electrically the plurality of regions of the second fixed electrodes from each other.

5. The vibration mirror of claim 1, wherein the first electrically insulating means comprises separation slits to separate and electrically insulate the movable electrodes from the first fixed electrodes.

6. The vibration mirror of claim 5, wherein both the movable electrodes and at least one of the first and the second fixed electrodes have a comb shape, and arranged such that convex portions of the movable electrodes face concave portions of the at least one of the first and the second fixed electrodes; and concave portions of the movable electrodes faces convex portions of the at least one of the first and the second fixed electrodes.

7. The vibration mirror of claim 5, wherein a formation of the reflection means holding substrate and the separation slits that separate the movable electrodes from the first fixed electrodes are simultaneously performed by etching.

8. The vibration mirror of claim 1, wherein each of the first and the second substrates is a silicon substrate.

9. The vibration mirror of claim 8, wherein the silicon substrate is a silicon on insulator (SOI) substrate.

10. The vibration mirror of claim 1, wherein the reflection means holding substrate further comprises at least one resonant frequency adjustment plate for adjusting a resonant frequency of the vibration mirror, and wherein the resonant frequency is adjusted by cutting the at least one resonant frequency adjustment plate.

11. An optical scanning device, comprising
    at least one vibration mirror; and
    a means for irradiating the at least one vibration mirror with a light beam that is modulated by image information according to a vibration amplitude of the vibration mirror; and
    a means for focusing the light beam reflected by the reflection means on a surface to be scanned, wherein the at least one vibration mirror is reciprocatively vibrated by an electrostatic force to reflect an incident light beam such that a reflection direction of the reflected light beam is different from an incident direction of the incident light beam, the at least one vibration mirror comprises:
    a reflection means for reflecting the incident light beam;
    a reflection means holding substrate for holding the reflection means;
    a torsional rotation shaft comprising rod members rotatably supporting two ends of the reflection means holding substrate;
    movable electrodes formed on side faces of the reflection means holding substrate;
    a first substrate for supporting the reflection means supporting substrate via the torsional rotation shaft;
    first fixed electrodes formed on the first substrate so as to face the movable electrodes;
    a first electrically insulating and separating means formed on the first substrate to electrically insulate and separate the movable electrodes from the first fixed electrodes; and
    a second substrate overlaid on the first substrate with an insulating layer therebetween so as to be electrically insulated from and overlapped to adhere onto the first substrate.

12. An image forming device, comprising:
    an optical scanning device comprising at least one vibration mirror, a means for irradiating the at least one vibration mirror with a light beam that is modulated by image information according to a vibration amplitude of the vibration mirror; and a means for focusing the light beam reflected by the reflection means on to a scan face; and
    an image supporter moving in a sub-scanning direction and which an electrostatic latent image is formed by scanning the focused light beam in a main scanning direction; and
    a developing means for developing the electrostatic latent image, wherein the at least one vibration mirror wherein the at least one vibration mirror is reciprocatively vibrated by an electrostatic force to reflect an incident light beam such that a reflection direction of the reflected light beam is different from an incident direction of the incident light beam, the at least one vibration mirror comprises:

a reflection means for reflecting the incident light beam;

a reflection means holding substrate for holding the reflection means;

a torsional rotation shaft comprising rod members rotatably supporting two ends of the reflection means holding substrate;

movable electrodes formed on side faces of the reflection means holding substrate;

a first substrate for supporting the reflection means supporting substrate via the torsional rotation shaft;

first fixed electrodes formed on the first substrate so as to face the movable electrodes;

a first electrically insulating and separating means formed on the first substrate to electrically insulate and separate the movable electrodes from the first fixed electrodes; and a second substrate overlaid on the first substrate with an insulating layer therebetween so as to be electrically insulated from and overlapped to adhere onto-the first substrate.

13. The image forming device of claim 12, comprising a plurality of optical scanning devices, wherein the image information is divided into a plurality of divided regions in the main scanning direction, and the electrostatic latent image is recorded by the plurality of optical scanning devices, wherein a number of the plurality of optical scanning devices is the same as that of the divided regions.

14. The image forming device of claim 13, wherein the image information comprises pixels whose position are respectively represented by coordinates of a matrix, and the electrostatic latent image is recorded after coordinate of each of the pixels is transformed into a coordinate of a tilt matrix that is tilted by a prescribed angle from the matrix.

15. The image forming device of claim 14, wherein the scanning direction of the light beam on the vibration mirror is tilted from a direction perpendicular to the sub-scanning direction.

* * * * *